US010736465B2

(12) United States Patent
Dickson, Jr. et al.

(10) Patent No.: US 10,736,465 B2
(45) Date of Patent: Aug. 11, 2020

(54) BLENDING APPARATUS AND METHODS

(71) Applicant: Ideya Labs, LLC, Orem, UT (US)

(72) Inventors: Thomas D. Dickson, Jr., Orem, UT (US); C. David Voorhees, Santaquin, UT (US); Javier E. Jimenez, Provo, UT (US); Tyson D. Triplett, Provo, UT (US)

(73) Assignee: IDEYA LABS, LLC, Orem, UT (US)

( * ) Notice: Subject to any disclaimer, the term of this patent is extended or adjusted under 35 U.S.C. 154(b) by 241 days.

(21) Appl. No.: 15/462,353

(22) Filed: Mar. 17, 2017

(65) Prior Publication Data
US 2017/0209000 A1 Jul. 27, 2017

Related U.S. Application Data

(63) Continuation-in-part of application No. 15/008,308, filed on Jan. 27, 2016.
(Continued)

(51) Int. Cl.
A47J 43/00 (2006.01)
A47J 43/046 (2006.01)
(Continued)

(52) U.S. Cl.
CPC ........... *A47J 43/046* (2013.01); *A47J 43/042* (2013.01); *A47J 43/044* (2013.01);
(Continued)

(58) Field of Classification Search
CPC ...... A47J 43/046; A47J 43/044; A47J 43/042; A47J 43/0727; A47J 2043/04463; A47J 2043/04436
(Continued)

(56) References Cited

U.S. PATENT DOCUMENTS 2,940,738 A 6/1960 Posener et al.
3,704,864 A 12/1972 Lee
(Continued)

FOREIGN PATENT DOCUMENTS

EP 1915933 A1 4/2008
GB 2501499 A 10/2013
(Continued)

OTHER PUBLICATIONS

PCT International Search Report for International Application No. PCT/US17/33922, dated Aug. 15, 2017 (3 pp.).
(Continued)

*Primary Examiner* — Faye Francis
(74) *Attorney, Agent, or Firm* — Dorsey & Whitney LLP

(57) ABSTRACT

Blending devices can be used to blend material in a container such as a reusable container or a disposable liner, such as a paper or plastic cup. In some instances, a reusable container can be coupled to an adapter that includes a blade assembly to blend a food product. The food product can be blended directly within the container when the container is coupled to the adapter. In further instances, the reusable container can selectively couple a liner or multiple different sizes of liners to the adapter. The food product can be blended within the liner without any of the food product coming into contact with an interior of the container.

28 Claims, 50 Drawing Sheets

Related U.S. Application Data

(60) Provisional application No. 62/446,850, filed on Jan. 17, 2017.

(51) Int. Cl.
*A47J 43/07* (2006.01)
*A47J 43/044* (2006.01)
*A47J 43/042* (2006.01)

(52) U.S. Cl.
CPC .. *A47J 43/0727* (2013.01); *A47J 2043/04436* (2013.01); *A47J 2043/04463* (2013.01)

(58) Field of Classification Search
USPC .......................................... 241/282.1, 282.2
See application file for complete search history.

(56) References Cited

U.S. PATENT DOCUMENTS

| | | | |
|---|---|---|---|
| 3,786,999 A | 1/1974 | Cabell | |
| 3,881,705 A | 5/1975 | Greenspan | |
| 3,931,900 A * | 1/1976 | Tiby | A47J 17/18 |
| | | | 241/296 |
| 4,194,697 A * | 3/1980 | Lembeck | A47J 43/06 |
| | | | 222/352 |
| 4,674,690 A * | 6/1987 | Ponikwia | A47J 43/046 |
| | | | 241/282.1 |
| 5,289,760 A * | 3/1994 | Barradas | A47J 37/12 |
| | | | 241/282.2 |
| 5,564,829 A | 10/1996 | Lafond | |
| 5,882,113 A | 3/1999 | Binder | |
| 6,338,569 B1 | 1/2002 | McGill | |
| 6,616,323 B2 | 9/2003 | McGill | |
| 6,676,051 B2 * | 1/2004 | Rebordosa | A47J 43/06 |
| | | | 241/282.1 |
| 6,805,312 B2 | 10/2004 | Capp | |
| 6,971,597 B2 * | 12/2005 | Starr | A47J 43/0716 |
| | | | 241/278.1 |
| 7,159,808 B2 * | 1/2007 | Starr | A47J 43/0716 |
| | | | 241/278.1 |
| 7,185,837 B2 * | 3/2007 | Oliver | A47J 42/40 |
| | | | 241/282.1 |
| 7,530,510 B2 * | 5/2009 | Newman | A47J 43/044 |
| | | | 241/37.5 |
| 7,673,824 B2 * | 3/2010 | Stamper, III | A47J 43/046 |
| | | | 241/282.2 |
| 8,142,068 B2 | 3/2012 | McGill | |
| 8,985,843 B2 * | 3/2015 | Sands | A47J 43/046 |
| | | | 366/197 |
| 9,078,543 B2 | 7/2015 | Oh | |
| 9,775,454 B2 * | 10/2017 | Gonzalez | A61J 9/0623 |
| 10,028,604 B2 * | 7/2018 | Gonzalez | A61J 9/0623 |
| 2003/0193833 A1 | 10/2003 | Wulf et al. | |
| 2006/0176769 A1 | 8/2006 | Baschnagel | |
| 2006/0209627 A1 | 9/2006 | McGill | |
| 2007/0109913 A1 | 5/2007 | McGill | |
| 2007/0137492 A1 | 6/2007 | Stamper, III et al. | |
| 2007/0291583 A1 | 12/2007 | Baschnagel | |
| 2007/0292578 A1 | 12/2007 | Baschnagel | |
| 2008/0037360 A1 | 2/2008 | McGill | |
| 2008/0056062 A1 | 3/2008 | McGill | |
| 2008/0198691 A1 | 8/2008 | Behar et al. | |
| 2009/0109793 A1 | 4/2009 | Xue | |
| 2009/0186141 A1 | 7/2009 | Almblad et al. | |
| 2012/0152131 A1 | 6/2012 | Sands | |
| 2013/0048771 A1 | 2/2013 | Oh | |
| 2014/0154387 A1 | 6/2014 | Almblad et al. | |
| 2014/0246531 A1 | 9/2014 | Mcbean | |
| 2014/0263784 A1 | 9/2014 | Nernberger et al. | |
| 2014/0286123 A1 | 9/2014 | Arnett et al. | |
| 2015/0059289 A1 | 3/2015 | Cody | |
| 2015/0069157 A1 * | 3/2015 | Wulf | A47J 43/06 |
| | | | 241/46.17 |
| 2015/0098299 A1 | 4/2015 | Sapire | |
| 2015/0250360 A1 | 9/2015 | Hyp | |
| 2016/0045074 A1 | 2/2016 | McGill | |
| 2016/0206151 A1 | 7/2016 | Heit et al. | |
| 2018/0008098 A1 * | 1/2018 | Koscak | A47J 43/046 |

FOREIGN PATENT DOCUMENTS

| | | |
|---|---|---|
| JP | 2007501645 A | 2/2007 |
| WO | 2005070271 A2 | 8/2005 |
| WO | 2006086018 A2 | 8/2006 |
| WO | 2009091565 A1 | 7/2009 |
| WO | 2012030168 A2 | 3/2012 |
| WO | 2016007997 A1 | 1/2016 |
| WO | 2018136107 A1 | 7/2018 |

OTHER PUBLICATIONS

Extended European Search Report for European Application No. 16888570.5, dated Jun. 13, 2019 (11 pages).

International Preliminary Report on Patentability dated Aug. 1, 2019 for International Application No. PCT/US2017/033922 (13 pages).

* cited by examiner though of a blending jar into the smaller-mouthed serving cup in a single large blob. To avoid spills, workers commonly hammer on the blending jar with the palm of their hand to break up and loosen the blob so that it is easier to pour. Hammering jars in this manner over time can develop into wrist joint problems for workers and can lead to liability for shop owners.

BLENDING APPARATUS AND METHODS

CROSS REFERENCE TO RELATED APPLICATIONS

The present application is a continuation-in-part of, and claims priority to, U.S. patent application Ser. No. 15/008,308, filed 27 Jan. 2016, now U.S. Pat. No. 10,470,612. The present application also claims priority to U.S. Provisional Patent Application No. 62/446,850, filed 17 Jan. 2017. The disclosures of both of the above-identified applications are hereby incorporated by reference in their entireties.

TECHNICAL FIELD

The present disclosure generally relates to blending apparatuses and methods used for blending and smoothing food products.

BACKGROUND

Commercially-available liquid food products are delivered to customers in disposable containers such as paper, plastic, or foam cups. The disposable containers are then taken by the customer or discarded when they finish with the product. Both the producer and the consumer benefit from the convenience and cost-effectiveness of this arrangement. Similar arrangements are found in the domestic context, as consumers generally do not consume a blended food product directly from a blender jar, but rather, distribute the contents of the blender jar into one or more additional containers, whether of a reusable or disposable variety, after blending.

Smoothies and other blended drinks are some of the most popular beverages served this way. Consumers have widely recognized the benefits, in both taste and nutrition, that come from blended drinks, and they are now served ubiquitously in disposable cups in the commercial context. Blenders that prepare blended drinks cannot, however, effectively and reliably prepare the drinks within the disposable cups. The raw ingredients, especially large and frozen ingredients such as ice or frozen fruit chunks, cannot be properly sheared in the disposable cups because they are so violently agitated and pulverized by a blending blade or other rotor/stator apparatus. The pressure differentials and forces generated during blending are too large for the relatively thin and weak walls of the cups to handle without bursting or blowing off of the blending device. Accordingly, blended drinks are prepared in reinforced and rigid jars that attach to the blender, and the product is poured from the jars after being blended.

Blending in one vessel and then serving in another is an inefficient process. Because of the thick nature of the pureed drink, extra product must be produced to account for thick smoothie clinging to the sides of the blending jar after dispensing. A person preparing the beverage would not want to fall short of filling a customer's cup, for example, so he or she often will make extra product that is subsequently discarded. The wasted product is a financial loss in material costs, but it also accrues additional costs. Fruit juices are inherently acidic, and pouring significant quantities of fruit smoothies into sewer systems can have a negative impact on water treatment processes. Many smoothie producers are therefor charged extra utility fees for the acidic impact of their waste on the water system.

The thickness of a smoothie product also makes it difficult to transfer it from a blending jar to a separate serving cup. The thick puree may have a tendency to slide out of the wide Accordingly, there is a need for improvements to blending equipment used for preparing and serving blended beverages, whether in the commercial or domestic context.

SUMMARY

One aspect of the present disclosure relates to a blending apparatus for blending food products in a disposable container. The apparatus may comprise a base portion, a motor housed in the base portion, with the motor having a motor drive shaft, and a container portion extending from the base portion. The container portion may have an internal chamber having a top end and a bottom end, with the top end having a top opening, the top opening having a top opening inner diameter, and the bottom end having a bottom surface. A sidewall surface may extend between the top and bottom ends of the internal chamber, with the sidewall surface having a sidewall inner diameter and the sidewall inner diameter being greater than the top opening inner diameter. A blade may be positioned in the blending chamber and may be driven by the motor drive shaft, with the blade being rotatable to blend contents of the blending chamber beneath the top opening. A sealing surface may extend externally and circumferentially around the base portion or the container portion, with the sealing surface being configured to contact a disposable container placed over the container portion.

The blending apparatus may further comprise a disposable container placed in contact with the sealing surface. A shelf portion may be positioned at the top end of the internal chamber, with the top opening being formed in a center of the shelf portion and the shelf portion extending to a position vertically over the bottom surface of the internal chamber. The shelf portion may have a sloped top surface and/or bottom surface. The shelf portion may comprise a plurality of circumferentially spaced-apart vents which may connect to the top opening. A wall may extend from the shelf portion around the top opening, with the wall extending in a vertical direction relative to the shelf portion. The wall may comprise a plurality of circumferentially spaced-apart vents as well. The wall may be configured to be internally offset from an inner surface of the disposable container. The sealing surface may be configured to contact a sidewall of the disposable container portion placed over the apparatus. A removable collar may be positioned around the container portion at a position radially external to the sealing surface.

In another aspect of the disclosure, a blending jar for blending food products, when connected to a disposable container and to a motor, is set forth. The blending jar may comprise a bottom wall configured to receive or retain a blending blade assembly, a sidewall extending upward relative to the bottom wall, with the sidewall having a bottom end and a top end, and a connection portion connected to the bottom wall, with the connection portion being configured to mount the blending jar to a blender base. A shelf portion may extend inward from the top end of the sidewall, with the shelf portion overhanging the bottom wall. A central aperture may extend through the shelf portion, and a sealing structure may be positioned radially external to the sidewall.

A wall portion may be connected to the shelf portion and extend upward relative to the shelf portion. The wall portion may comprise at least one vent. A wall portion may be connected to the shelf portion and extend downward relative to the shelf portion as well. The wall portion may be configured to separate downward flow from upward flow of fluid around the wall portion during blending. A blending blade may be positioned radially internal to the wall portion. The shelf portion may comprise at least one vent, and the at least one vent may extend circumferentially around the central aperture. The at least one vent may have a perimeter connected to the central aperture.

In yet another aspect of the disclosure, a method of producing a blended food product is disclosed, wherein the method may comprise providing a blending adapter having a blending blade within an internal chamber, with the internal chamber having at least one baffle. The method may also include positioning a food product ingredient within a disposable container having an internal space and positioning the blending adapter within the disposable container with the at least one baffle separating a portion of the internal space from the internal chamber, wherein the portion of the internal space may contain at least a portion of the food product ingredient. The method may also include blending the food product ingredient using the blending blade assembly, wherein the at least one baffle blocks movement of the food product ingredient from the internal chamber to the portion of the internal space of the disposable container.

The at least one baffle may comprise at least one vent, and the method may further comprise passing the food product ingredient from the portion of the internal space of the disposable container to the internal chamber of the blending adapter through the vent. The method may also further comprise inverting the disposable container after positioning the blending adapter within the disposable container. In some embodiments, the method may include sealing the disposable container by moving a seal on an exterior surface of blending adapter into contact with an inner surface of the disposable container. The at least one baffle may comprise a wall portion and may be spaced apart from an inner surface of the disposable container, wherein the wall portion blocks movement of the food product ingredient from the internal chamber into an inner surface of the disposable container. In the method, blending the food product ingredient may further comprise generating flow around the at least one baffle by generating a high pressure region above the blending blade assembly and generating a low pressure region below the blending blade assembly during blending. The high and low pressure regions may be separated by the at least one baffle.

Another aspect of the disclosure relates to a blending apparatus for blending food products in a disposable container. The blending apparatus may comprise a base portion, a motor housed in the base portion, with the motor having a motor drive shaft, and a blender adapter connected to the base portion. The blender adapter may comprise a bottom wall, a connection portion connected to the bottom wall and configured to mount the blender adapter to the base portion, a blending blade assembly extending through the bottom wall and configured to connect to the motor drive shaft, and a plurality of vanes extending upward relative to the base portion, with the plurality of vanes being circumferentially spaced apart around the bottom wall. A disposable container having an internal space and an internal surface may also be included, with the internal space receiving the plurality of vanes and the plurality of vanes extending inward relative to the internal surface.

In some embodiments the plurality of vanes extend inward relative to the internal surface in a helical pattern, and in some embodiments they extend linearly inward relative to the internal surface. The blender adapter may further comprise a sidewall extending peripherally around the blending blade assembly. Spaces may also be positioned circumferentially between vanes of the plurality of vanes, radially external to the blade assembly, and radially internal to the sidewall. The blender adapter may comprise a clearance distance based on at least two projectile trajectories extending in parallel relative to each other from a leading edge of a blade of the blending blade assembly and between vanes of the plurality of vanes. The clearance distance may be about 10 millimeters wide or less.

Another aspect of the disclosure relates to a blending apparatus that includes an adapter configured to be coupled with a blender base that comprises a motor. The adapter comprises a blade assembly configured to interface with the motor so as to be actuated thereby when the adapter is coupled with the blender base, and further comprises a connection interface. The blending apparatus further includes a sealing member and a container comprising a connection interface configured to cooperate with the connection interface of the adapter to couple the container to the adapter. The container further comprises an interior surface that defines a chamber. The blending apparatus is configured to operate in either a direct blending mode or a lined blending mode. In the direct blending mode, a food product is positioned within the chamber of the container, the container is pressed against the sealing member to form a liquid-tight seal, and the food product comes into contact with the interior surface of the container as the food product is blended via the blade assembly. In the lined blending mode, a disposable liner is positioned within the chamber of the container, the container presses the liner against the sealing member to form a liquid-tight seal, and the liquid-tight seal prevents the food product from coming into contact with the interior surface of the container as the food product is blended via the blade assembly.

In some embodiments, the blending system may further comprise an alternate disposable liner that has a different internal volume than the disposable liner.

Another aspect of the disclosure relates to a kit comprising a disposable liner. The kit further comprises one or more of instructions for using the disposable liner with a blending apparatus or directions for accessing instructions for using the disposable liner with the blending apparatus. The blending apparatus comprises an adapter configured to be coupled with a blender base that comprises a motor. The adapter comprises a blade assembly configured to interface with the motor so as to be actuated thereby when the adapter is coupled with the blender base, and further comprises a connection interface. The blending apparatus further comprises a sealing member and a container defining a chamber within which the disposable liner is received. The container comprises a connection interface configured to cooperate with the connection interface of the adapter to couple both the container and the disposable liner to the adapter. The disposable liner forms a liquid-tight seal against the sealing member when the disposable liner is coupled to the adapter.

The kit may further comprise an alternate disposable liner, wherein the alternate disposable liner may have a different internal volume than the disposable liner. One or more of the instructions or directions may comprise instructions for using the alternate disposable liner with the blending apparatus or directions for accessing instructions for using the alternate disposable liner with the blending apparatus. In some embodiments, the disposable liner and the alternate disposable liner may be both configured to cooperate with the connection interface of the adapter to selectively couple the disposable liner or the alternate disposable liner to the adapter.

Another aspect of the disclosure relates to a kit comprising a disposable liner, a blender base that comprises a motor, and an adapter configured to be coupled with the blender base. The adapter comprises a blade assembly configured to interface with the motor so as to be actuated thereby when the adapter is coupled with the blender base and a connection interface. The kit further comprises a sealing member and a container comprising a connection interface configured to cooperate with the connection interface of the adapter to couple the container to the adapter. The container further comprises an interior surface that defines a chamber. The kit further comprises one or more of instructions for (i) selectively using one of the container or the container in combination with the liner to blend a food product or (ii) directions for accessing instructions for selectively using one of the container or the container in combination with the liner to blend the food product. The instructions comprise directions to, if using the container to blend the food product, position the food product within the chamber of the container and engage the connection interfaces of the container and the adapter to form a liquid-tight seal between the container and the sealing member. The instructions further comprise directions to, if using the container in combination with the liner to blend the food product, engage the connection interfaces of the container and the adapter to form a liquid-tight seal between the liner and the sealing member.

The kit may also further comprise an alternate disposable liner that has a different internal volume than the disposable liner. In that case, the instructions may further comprise (i) directions for selectively using the container in combination with the alternate disposable liner to blend a food product or (ii) directions for accessing instructions for selectively using the container in combination with the alternate disposable liner to blend a food product. The instructions may further comprise directions to engage the connection interfaces of the container and the adapter to form a liquid tight seal between the alternate disposable liner and the sealing member if using the container in combination with the alternate disposable liner.

Another aspect of the disclosure relates to a method of blending a food product. The method comprises inserting a liner into a container, the liner comprising an exterior surface and the container comprising an interior surface. The method further comprises coupling the container and the liner to an adapter that comprises a blade assembly, wherein the liner includes the food product therein when coupled with the adapter. The method also comprises forcing the liner against a sealing member via the container to form a fluid-tight seal to prevent fluid communication between a region between the exterior surface of the liner and the interior surface of the container. The method further comprises actuating the blade assembly to blend the food product without introducing any portion of the food product into the region between the exterior surface of the liner and the interior surface of the container.

The above summary of the present disclosure is not intended to describe each embodiment or every implementation of the claimed invention. The Figures and the detailed description that follow more particularly exemplify one or more preferred embodiments.

BRIEF DESCRIPTION OF THE DRAWINGS

The accompanying drawings and figures illustrate a number of illustrative embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
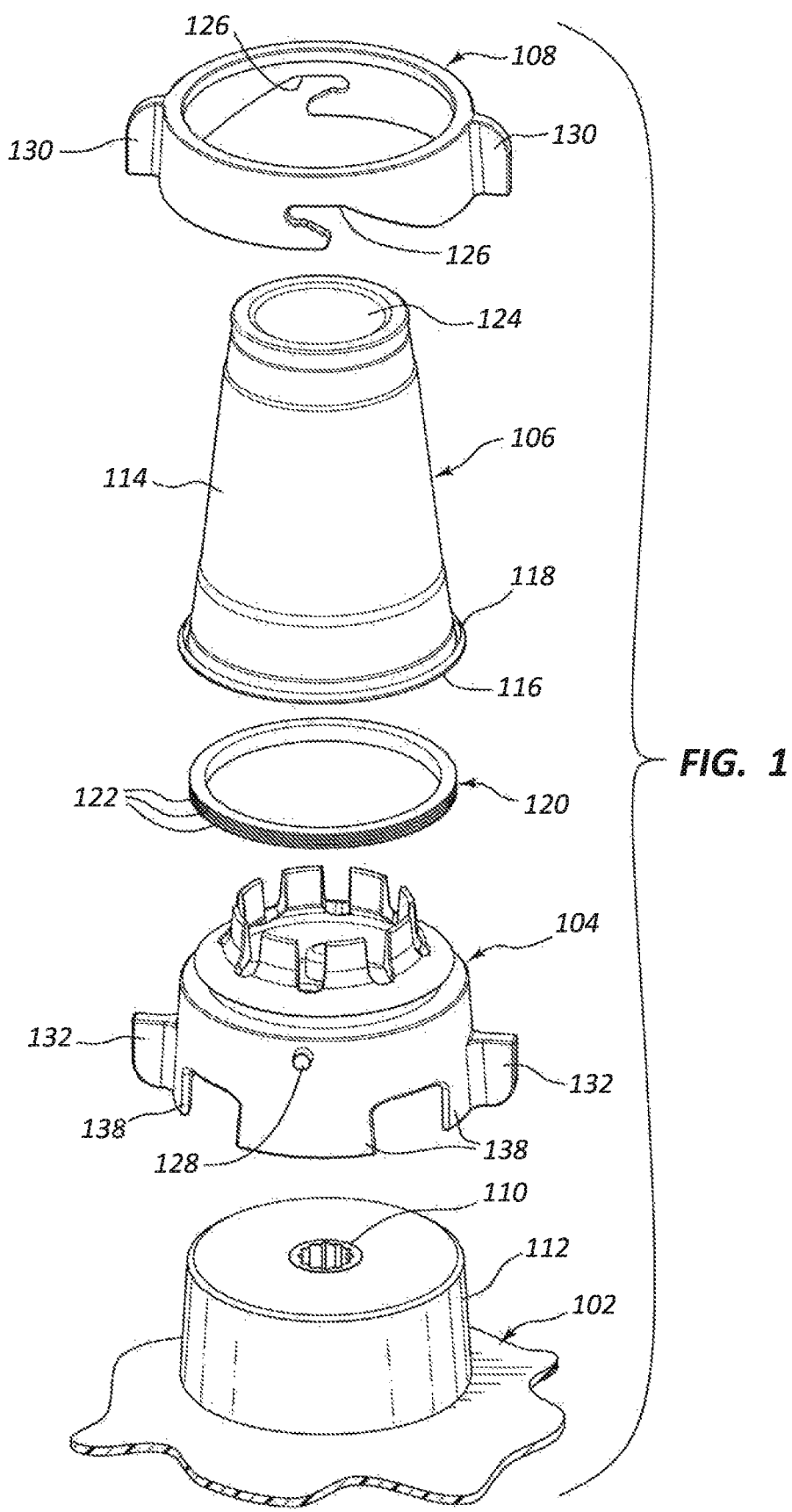
FIG. 1 is an exploded view of a blending apparatus according to the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to apparatuses, devices, and methods used to blend food products in a standalone container devoid of mixing apparatus, such as a reusable cup, a disposable cup or other reusable or disposable container. Existing methods and apparatuses for blending in a disposable container are unreliable and are likely to destroy the container or push it from the blending device when high blade speeds and heavy and hard ingredients are used.

Embodiments of the present disclosure may reduce failure rates, improve blended consistency and capability, eliminate waste product, and may be more user-friendly and cost-effective than existing solutions. Further embodiments of the present disclosure permit the selective use of either a disposable or a reusable container with a blending system.

An example embodiment includes a specialty blending jar or adapter device designed to couple with a disposable container. As used herein, a "container" may refer to a vessel such as a cup, jar, bottle, cylinder, or other similar receptacle that may be used to contain a volume of food products, particularly blended food products such as smoothies. A container is "disposable" when it is designed to be inexpensive and easily discarded or destroyed after consumption of its contents. A disposable container may be a single-use container, meaning it is designed to be used for a single use rather than being frequently used and reused, or a container provided from a producer to a consumer to hold a single serving or single order of a customer's beverage. Disposable containers are typically made of thin plastic, foam, and/or paper products and are typically significantly less expensive to purchase and distribute than the blended food products served within them. Disposable containers may also be easily crushable or may have walls that are bendable or breakable by hand. An example disposable container is a cup or cylinder having a paper or plastic construction that has a sidewall thickness of less than about 1 millimeter, and preferably a sidewall thickness of about 0.6 millimeters or less. Another example disposable container is a cup having a polystyrene construction and having a sidewall thickness of about 2 millimeters or less.

In an example embodiment, food products may be placed in the disposable container while the mouth of the container is facing upward. Thus, the food products may be contained by the disposable container. The adapter device is inserted into the upward-opening mouth of the container the device seals the edge of the mouth or seals the inner perimeter of the end of the disposable container or an inner sidewall surface of the container. A collar may be placed around the container and adapter to help preserve the seal and to keep the adapter from disconnecting from the container. More generally, the collar may be referred to as a lock, a locking member, a connector, or securement member. The collar may be formed as a standalone device or more be incorporated into another device, such as a container. The adapter device may then be mounted to a blender base, while connected to the disposable container and with the mouth of the container facing down, and the motor of the blender base may drive a blade within the adapter device to blend and crush the food products in the container and adapter device. After blending is complete, the adapter device and container may be removed from the base and inverted, and the adapter device may be removed from the container. This leaves the blended product held within the container and ready for consumption without needing to be transferred to another container.

The adapter device may be alternatively referred to as a container portion of a blending apparatus, a blending jar, or a blending adapter. The adapter device may comprise a connection portion configured to mount to the blender base or may be integrated with the blender base as a single unit or single piece. The adapter device may include a solid and reinforced internal chamber having a top opening through which food products may enter the internal chamber when the disposable container is turned upside down over the internal chamber. The bottom of the internal chamber may include a blending blade assembly. The inner diameter of the top opening may be narrower than the diameter of an inner diameter of the sidewall of the internal chamber. Thus, food particles internal to the sidewall may have to pass through the narrower top opening to move out of the internal chamber and back up into the disposable container during blending. In this way, the internal chamber may contain high-velocity food products that are acted upon by the blending blade assembly and therefore may protect the relatively fragile inner surface of the disposable container from being impacted by high velocity food particles. Accordingly, the disposable container may be subject to less stress and strain and may remain sealed to the adapter more reliably than would be possible with existing solutions.

In some embodiments, the opening in the top of the internal chamber is formed through the center of a shelf portion. The shelf portion may separate ingredients that are in the internal chamber from ingredients above the internal chamber that are housed by the disposable container. Particles or chunks of ingredients in the container and chamber may impact the shelf portion rather than the sides of the container when blending takes place.

The underside of the shelf portion that faces internal to the internal chamber may be a reverse draft surface. This surface may have an abrupt return angle and may be positioned above and close to the blade in order to contain and deflect particles in the internal chamber. The central opening in the shelf portion may also have at least one vertical shielding wall that extends vertically upward relative to the central opening and internal chamber. This wall may further inhibit high velocity material from deflecting out of the internal chamber and into the disposable container.

A plurality of vents such as slots or apertures may be formed in the shelf portion and/or shielding wall. The vents may allow material above the shelf and external to the shielding wall to circulate into the internal chamber. The increased circulation may improve blending efficiency and reduce blockages or accumulation of unblended material above the shelf.

In some embodiments, the adapter device may comprise a vent passage that extends through the adapter device from a position below the blending blade to a position separated from the blending blade. The vent passage may facilitate circulation of material around the blade due to a high pressure zone being formed above the blade and a low pressure zone being formed beneath the blade, wherein the vent passage allows circulation from the low pressure zone to the high pressure zone without passing through the blade. A wall may extend downward from a shelf portion into the internal chamber to form part of a vent passage.

Other embodiments have a top opening of a blending chamber that is not narrower than the sidewalls of the chamber. For example, a plurality of helical baffles or stators may be formed around the blending chamber that block movement of material into contact with the interior of the disposable container. In other embodiments, a ducted flow system helps circulate material into contact with the blending blade and helps prevent blockages or stagnation of viscous ingredients.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments. Orientation indicators (e.g., top, down, upward, downward, above, below, etc.) may be used for convenience herein to indicate relative positioning of various features in the figures. These orientation indicators may, however, be reversible (e.g., upward may be downward) depending on the orientation of the devices and their orientations depicted in the figures. For example, the "bottom surface" of the lip 118 of cup 106 may be on the bottom of the lip 118 when the mouth 116 of the cup 106 opens upward, but the "bottom surface" of the lip 118 may face upward when the cup 106 is inverted.

Turning now to the figures in detail, FIG. 1 shows an exploded view of an embodiment of a blending apparatus 100 according to the present disclosure. The blending apparatus 100 may comprise a blender base 102, a blender adapter 104, a disposable container (e.g., cup 106), and a collar 108. The blending apparatus 100 may be an apparatus used to blend commercial food products. In some embodiments, the blending apparatus 100 may be used in residential, industrial, or other production settings. The blender base 102 and blender adapter 104 may be separate parts as shown in the figures or, in some embodiments, may be constructed together as a single integral component. The blender base 102 may be a standard blender base configured to receive a conventional blending jar. Thus, it may comprise a housing and may contain a motor, control electronics, and switches. The motor may be connected to a driveshaft 110 that extends through the top of the housing to interface with a jar or blender adapter 104. The top of the housing may also comprise a mounting portion 112 configured to interface with and hold the bottom of a jar or blender adapter 104 stationary.

The cup 106 represents one embodiment of a disposable container or liner that may be used in conjunction with the teachings of the present disclosure. The cup 106 shown is a standard 16-fluid-ounce SOLO®-brand plastic cup, but other types, sizes, brands, materials, etc, may be selected by the user. The cup 106 may have a sidewall 114 and an open end or open mouth 116. The mouth 116 may have a lip 118 around its edge. The cup 106 may have a tapered inner diameter, wherein the bottom (at 124) of the cup 106 has a narrower inner diameter than the mouth 116. See FIG. 4. In other arrangements, the cup 106 may have a consistent inner diameter throughout its depth. The interior or inner surface of the cup 106 near the mouth 116 and lip 118 may be smooth and generally cylindrical or frusto-conical in shape in order to facilitate effective sealing when the cup 106 is mounted to the blender adapter 104.

The inner surface of the cup 106 may engage an outer sealing surface of a sealing member or gasket 120 (e.g., O-ring) that extends around the blender adapter 104. See also FIG. 4 and relevant description below. The gasket 120 may comprise a flexible and/or compressible material such as, for example, a rubber, silicone, or comparable material. When the cup 106 is pressed onto the blender adapter 104, the gasket 120 may therefore make a fluid-tight seal (i.e., a liquid-tight and/or airtight seal) around an inner perimeter of the cup 106. The gasket 120 may comprise a plurality of outer ridges 122 that are flexible and able to conform individually to an inner surface of the cup 106 that has a variable or narrowing diameter. The plurality of outer ridges 122 may also provide a plurality of separate seals for the cup 106 so that if one of the outer ridges 122 develops a leak, the remaining ridges 122 may still keep the interface sealed. The small ridges 122 may also deform under less force than a single larger ridge or seal. Other configurations for the gasket 120 are also contemplated, as further discussed below.

The seal between the cup 106 and the gasket 120 may be a radial seal, meaning the pressure between the cup 106 and the gasket 120 is applied in a lateral/radial direction around the gasket 120. An internal surface of the cup 106 that faces radially internal to the outer surface of the cup 106 interfaces with a radially-outward facing surface of the gasket 120. This configuration may be beneficial since end-sealed cups, such as cups that have their end surface pressed downward against a vertically-facing sealing surface, have more difficulty maintaining the seal when the cup is subjected to vertical forces (e.g., when material in the cup is blended and applies forces that thrust the cup upward). A radial seal between a cup 106 and gasket 120 may be more difficult to disrupt and unseal due to relative vibration between the cup and gasket in a vertical direction, and horizontal/radially-directed vibration between the cup and gasket may be dampened or compensated for by the seal with less leaking.

Figure 2A:
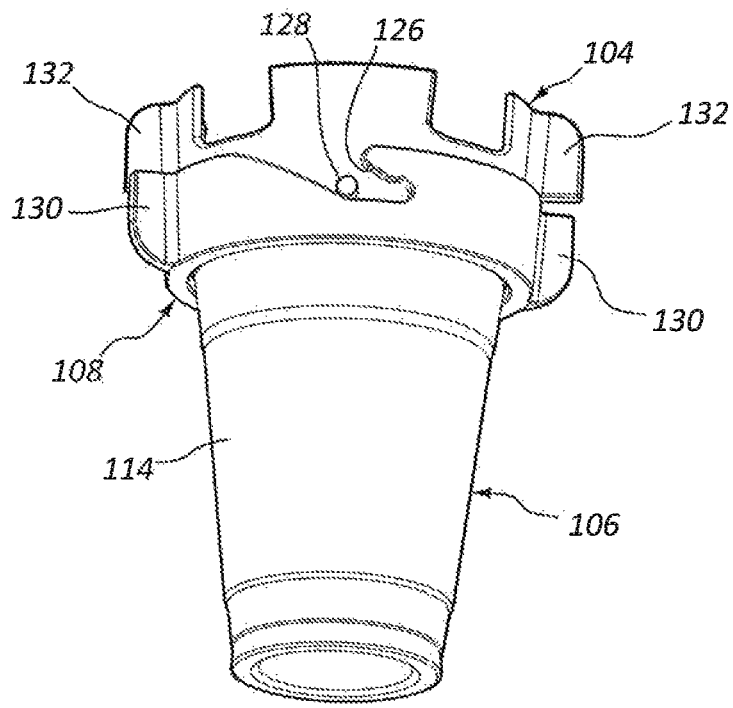
FIGS. 2A-2B show how portions of the blending apparatus may be assembled.
Figure 2B:
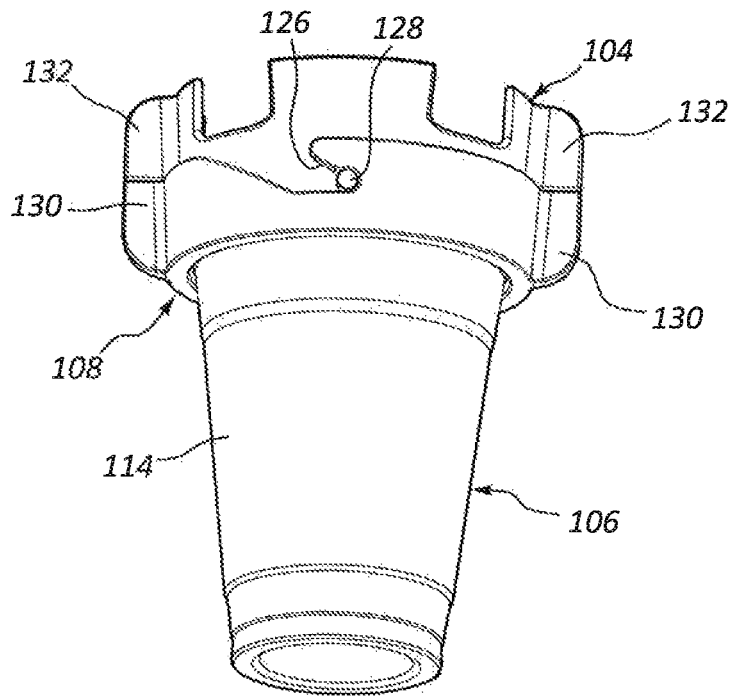

The collar 108 may be fitted around the cup 106 to help keep the cup 106 in place when the cup 106 is sealed to the blender adapter 104. Once the cup 106 is pressed over and around the gasket 120, the collar 108 may be advanced past the bottom surface 124 of the cup 106 and around the sidewall 114 of the cup 106 until it contacts the lip 118 of the cup on the bottom side of the lip 118. See FIGS. 2A, 2B, and 4. At least one slot 126 on the collar 108 may be moved to a position where at least one peg 128 on the blender adapter 104 is moved into the at least one slot 126, as shown in FIGS. 2A-2B. FIG. 2A shows the collar 108 in a first position wherein the at least one peg 128 is partially inserted into at least one slot 126, and FIG. 2B shows the collar 108 in a second position wherein the at least one peg 128 is seated in the at least one slot 126 after rotation of the collar 108 relative to the blender adapter 104. Thus, the collar 108 may be rotatable to a position where it is vertically immovable relative to the blender adapter 104 while it is around the cup 106. Because it is held in place relative to the blender adapter 104 and it contacts the bottom surface of the lip 118 of the cup 106, the cup 106 is prevented from being vertically removed from the blender adapter 104 due to interference with the collar 108. The collar 108 may, however, still be rotatable relative to the blender adapter 104 to facilitate removal of the collar 108 after blending is complete. The collar 108 may not entirely prevent all vertical movement of the cup 106 relative to the adapter 104, but the cup 106 may still remain sealed due to the radial seal of the gasket 120. Each of the peg 128 and the slot 126 is an example of a connection interface. In particular, the peg 128 is a connection interface of the adapter 104 and the slot 126 is a connection interface of the collar 108. In other embodiments, the peg 128 and the slot 126 may be reversed. In general, the connection interfaces cooperate with each other to couple the collar 108 to the adapter 104. Any other suitable set of connection interface for achieving such coupling is contemplated, such as the connection interfaces discussed below (e.g., complementary threading).

The collar 108 and blender adapter 104 may each comprise at least one handle 130, 132. The handles 130, 132 may provide a position for the user to grasp or push the collar 108 or adapter 104 to help ease their relative rotation. Additionally, the handles 130, 132 may align when the collar 108 is vertically locked to the blender adapter 104 to provide easy visual indication of the locked position. Compare FIGS. 2A and 2B, wherein FIG. 2B indicates the locked position.

Figure 3A:
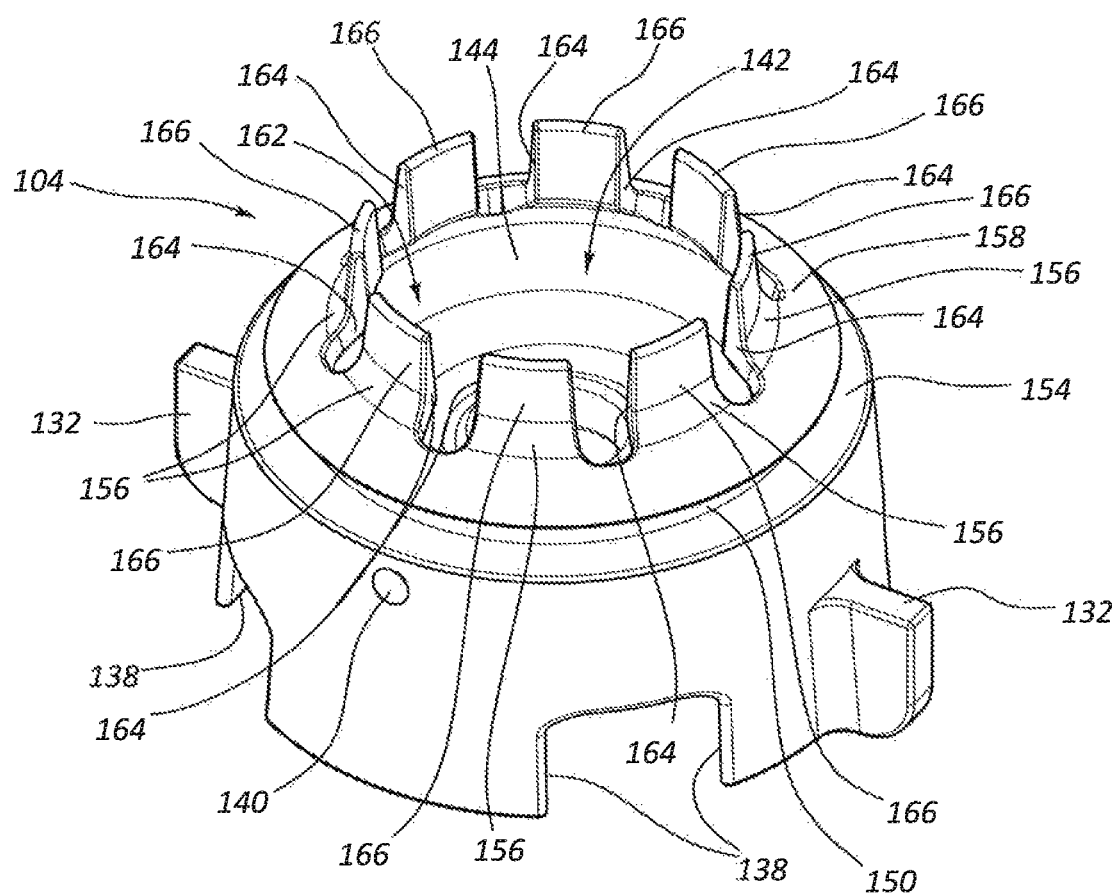
FIGS. 3A-3C show an embodiment of a blender adapter.
Figure 3B:
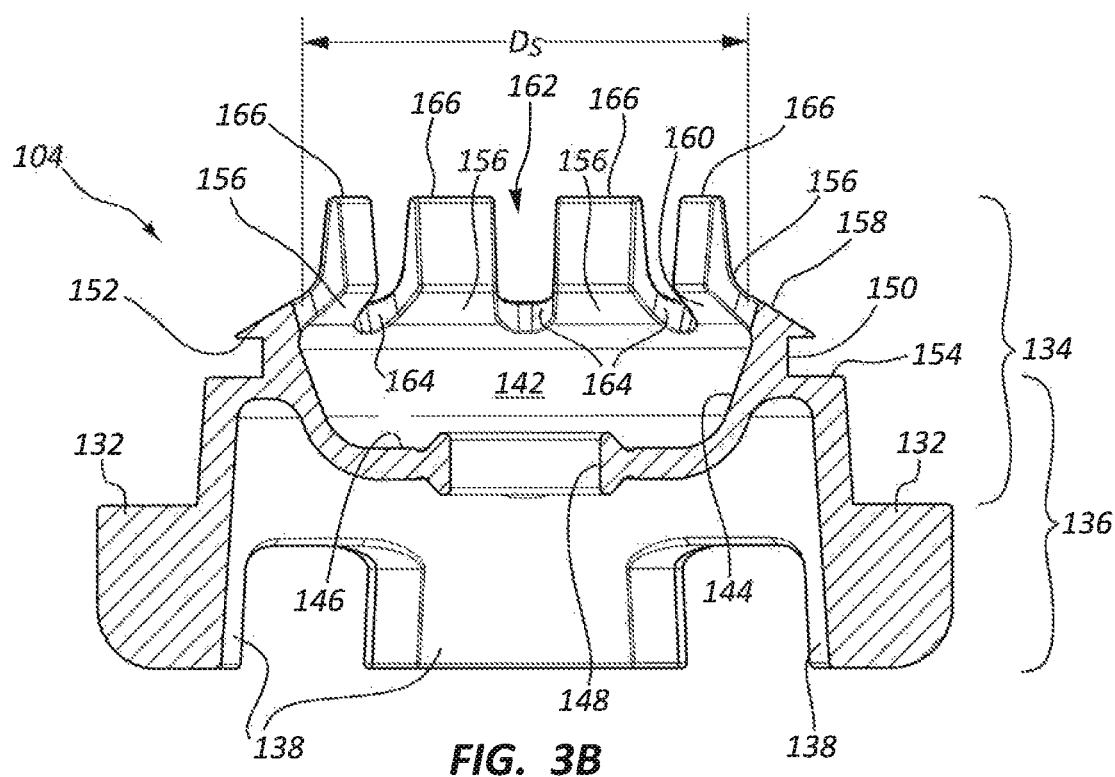
Figure 3C:
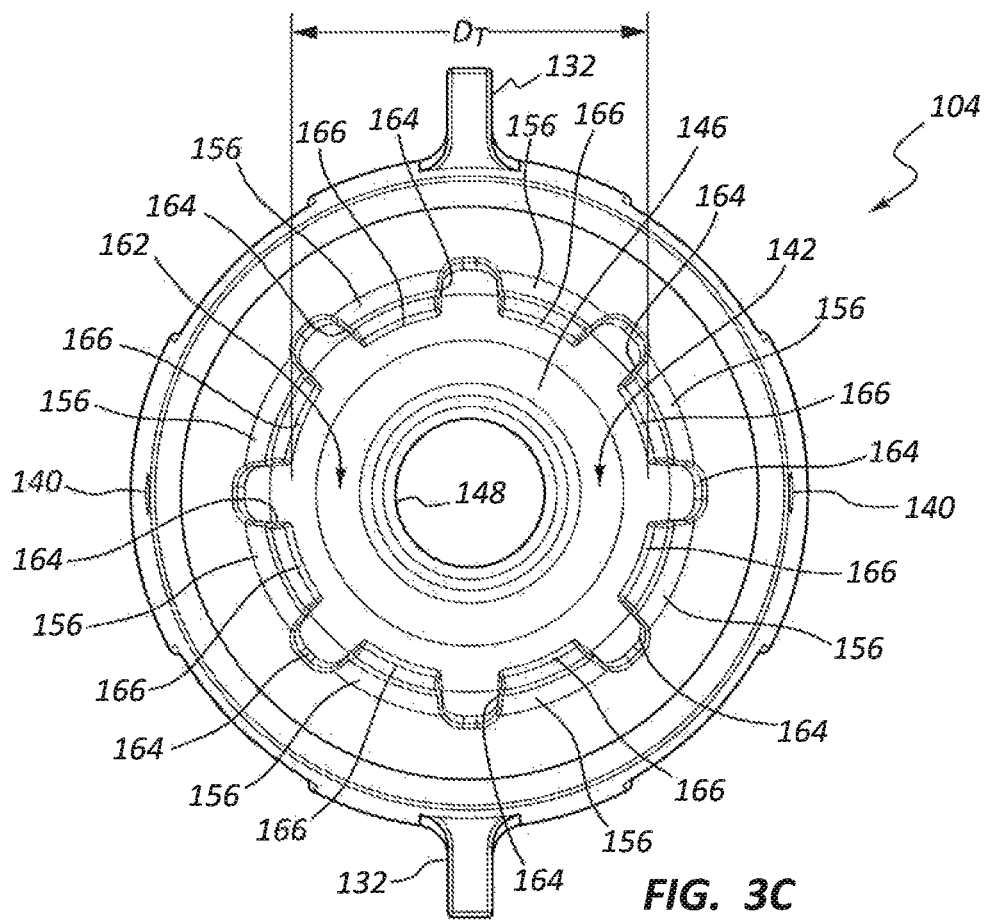

FIGS. 3A-3C respectively show isometric, side section, and top views of an embodiment of a blender adapter 104. The blender adapter 104 may comprise a container portion 134 and a base portion 136. The base portion 136 may alternatively be referred to as the base or mounting portion of the blender adapter 104. The base portion 136 may extend downward from the sides or bottom of the container portion 134 and may include the handles 132 and mounting features 138 usable to mount the blender adapter 104 to the blender base 102. The mounting features 138 may alternatively be referred to as a connection portion. The mounting features 138 may be connected to the bottom wall 146 of the container portion 134 and/or may extend vertically downward relative to the bottom wall 146. The base portion 136 may also connect to at least one peg 128, such as by including apertures or recesses 140 for at least one peg 128.

The container portion 134 may have an internal chamber 142. A blender adapter may therefore be referred to as a blending jar since it may contain material to be blended in the internal chamber 142. The internal chamber 142 may comprise a sidewall 144 and a bottom wall 146. The bottom wall 146 may comprise a central opening 148 configured to receive a blending blade assembly 168 (shown in FIG. 4). The bottom wall 146 may have a generally flat top surface that gradually transitions to the internal surface of the sidewall 144 from a generally horizontal surface at the bottom wall 146 to a generally frusto-conical surface at the sidewall 144. Thus, the bottom of the internal chamber 142 may form a cup or bowl shape with the blending blade assembly centrally positioned through the bottom of the cup shape. The blending blade may extend into the internal chamber 142, and a driveshaft of the blending blade assembly 168 may extend downward from the bottom wall 146 to connect to a driveshaft of the blender base 102.

Figure 4:
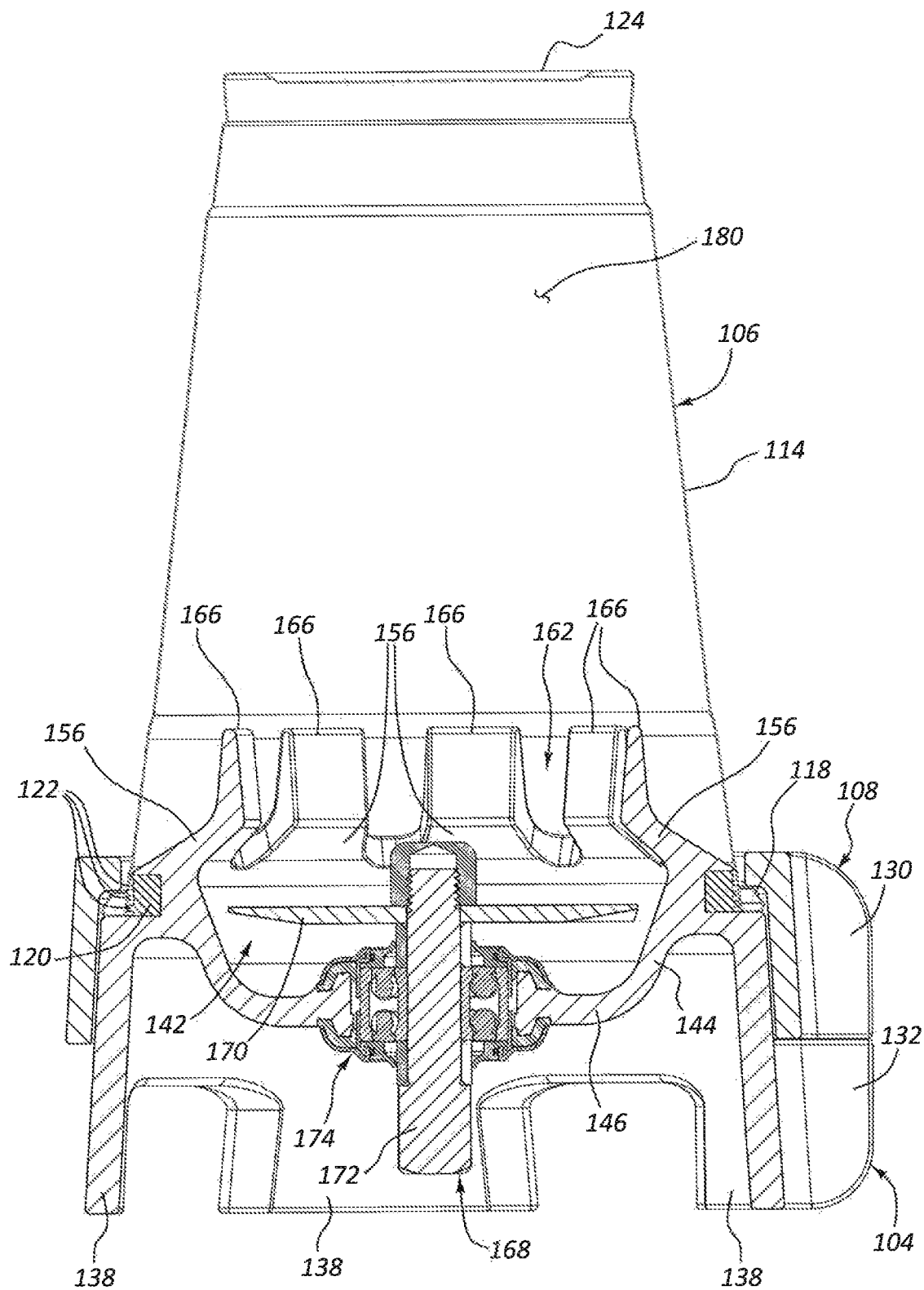
FIG. 4 shows a side section view of the blending apparatus of FIG. 1 that is fully assembled.

A gasket (or O-ring) seat 150 may extend around the container portion 134 and/or base portion 136. The gasket 120 may be positioned in the seat 150, as shown in FIG. 4. The seat 150 may comprise an upper edge 152 (see FIG. 3B) configured to prevent the gasket 120 from being pulled vertically from the blender adapter 104 when a cup 106 is removed from the adapter 104. A container resting surface 154 is positioned radially external to and adjacent to the seat 150. The seat 150 may also be radially external to the sidewall 144, meaning it may be positioned at a greater radial distance from a vertical longitudinal axis running through the container portion 134 than the sidewall 144. The seat 150 may be higher or lower than the sidewall 144 relative to the longitudinal axis. (Note, for example, FIG. 24B wherein the seat 2450 is above the sidewall 2444.) When the cup 106 is placed around the gasket 120, the mouth 116 of the cup may have its top edge in contact with the container resting surface 154. Also, the collar 108 may hold the bottom surface of the lip 118 of the cup 106 while the cup 106 contacts the container resting surface 154 in order to prevent vertical movement of the cup 106. Thus, upward movement of the cup 106 is restricted by the collar 108 and downward movement is restricted by the resting surface 154.

The bottom wall 146 of the container portion 134 may have a top surface that is below the container resting surface 154. Thus, the internal chamber 142 may receive material that falls out of the cup 106 when the cup 106 is facing down over the adapter 104, and the cup 106 may be filled with air that rises from the internal chamber 142 when the blender adapter 104 and cup 106 are inverted and connected to each other. In some arrangements, the bottom wall 146 may have a top surface that is level or co-planar with the container resting surface 154.

The container portion 134 may also comprise at least one shelf portion 156. The shelf portion 156 may alternatively be referred to as a baffle, overhang, or horizontal projection. The shelf portion 156 may have a top surface 158 and a bottom surface 160. In blender adapter 104, a plurality of shelf portions 156 extend circumferentially around a top opening 162 of the internal chamber 142 and each of the shelf portions 156 are separated by vent slots 164. Other embodiments, such as adapter 2400 of FIG. 24A, may only have one continuous shelf portion 2456.

Top surface 158 may be sloped outward toward the gasket seat 150. The top surface 158 may be configured to extend into contact with the inner surface of the cup 106 above or near the gasket 120. Thus, material that is blended in the cup 106 may rest on the top surface 158 of the shelf portion 156 adjacent to the sidewall 114 of the cup 106. The top surface 158 may alternatively be flat or sloped in a manner funneling material toward the center of the container portion 134.

The bottom surface 160 of each shelf portion 156 may also be sloped. Thus, the bottom surface 160 may extend radially inward and upward relative to the sidewall 144 of the internal chamber 142. The bottom surface 160 may overhang the blade of the blade assembly or may simply extend to a position vertically higher than, but radially external to, the blade. The bottom surface 160 may overhang the bottom wall 146 and sidewall 144 of the internal chamber 142. The bottom surface 160 may have a reverse draft angle of less than 90 degrees and greater than 0 degrees. The bottom surface 160 may intercept high-speed particles thrown from the blade assembly before they can come into contact with the sidewall 114 of the cup 106, so the shelf portion 156 may limit impacts to the cup 106. Thus, the shelf portion 156 may be used to reduce or eliminate breakage of the cup 106 caused by internal impacts of hard blended materials against the sidewall 114 during blending.

The top opening 162 allows material in the cup 106 to vertically enter the internal chamber 142 from above. The top opening 162 may be formed centrally within the shelf portion 156 and may be defined by an inner diameter (e.g., the innermost diameter) of the shelf portion 156. The top opening 162 may have an inner diameter DT. See FIG. 3C. The sidewall 144 of the internal chamber 142 may have a maximum inner diameter DS. See FIG. 3B. In various embodiments, the inner diameter DS may be measured at the base of the shelf portion 156, at the maximum diameter of the sidewall 144, or at the base of the sidewall 144 where it transitions to the bottom wall 146. The inner diameter DT of the top opening may be smaller than the inner diameter DS of the internal chamber 142. The shelf portion 156 may overhang the bottom wall 146 due to the top opening diameter DT being smaller than the inner diameter DS of the sidewall 144, The vent slots 164 may extend around the top opening 162. In blender adapter 104, the vent slots 164 extend from the top opening 162 and share a perimeter with the top opening 162. The vent slots 164 are defined between the inner ends of the shelf portions 156 and separate the inner ends of the shelf portions 156. The vent slots 164 allow material higher than the top surface 158 of the shelf portions 156 to flow downward into the internal chamber 142 for blending. The vent slots 164 may be sized to allow a predetermined particle size pass into the internal chamber 142. For example, the vent slots 164 may be sized to allow passage into the internal chamber 142 of an average-sized quarter-sliced or half-sliced strawberry or a predetermined size of ice cube. The vent slots 164 may also be sized in a manner preventing larger particles in the internal chamber 142 from being forcefully ejected from the internal chamber 142 through the vent slots 164 and into contact with the sidewall 114 of the cup 106. In this way, the vent slots 164 may facilitate a more thorough blend of the contents of the cup 106, and unblended material is not trapped and left unblended between the sidewall 114 and the shelf portions 156 and/or the wall portions 166 that extend from the shelf portions 156. The vent slots 164 may not be so large as to significantly increase cup breakage due to eliminating protection of the sidewall 114. In various embodiments, examples of which are described below, the vent slots 164 may alternatively be formed as apertures (i.e., through-holes that do not share a perimeter with the top opening 162, e.g.,
vent openings 1102), circumferential slots (i.e., straight or crescent shaped holes extending circumferentially around the top opening 162 which may or may not be connected to the top opening 162, e.g., vent slots 764, vents 802, or slots 1210), or slits that do not share a perimeter with the top opening 162 (e.g., apertures 1410).

At least one wall portion 166 may extend around the top opening 162 in a vertical direction. The at least one wall portion 166 may also extend in a vertical direction from the shelf portions 156, even if it does not share an inner diameter with the top opening 162. See FIGS. 10A-10B. The at least one wall portion 166 may extend circumferentially around the top opening 162 and may at least partially define the passage through the top opening 162. The inner and/or outer surfaces of the wall portions 166 may have a steeper reverse draft angle than the shelf portions 156, such as a reverse draft angle that is greater than zero up to about 90 degrees. In some embodiments, the reverse draft angle of the wall portions 166 may be equal to the reverse draft angle of the sidewall 114 of the cup 106 so as to internally follow the shape of the internal sidewall surface of the cup 106 parallel with the interior of the cup 106.

The wall portions 166 define a passage extending vertically upward from the top opening 162 defined by the shelf portions 156. The passage, along with the shelf portions 156, may intercept particles deflected toward the cup 106 from the blade assembly at an upward angle measured upward from a horizontal from the blade level of the driveshaft. The wall portions 166 increase the range of these angles that are likely to result in interception of a particle by the shelf and wall portions 156, 166. Thus, increasing the height of the wall portions 166 and/or narrowing the passage offers more cup protection. However, these modifications may reduce blending speed and efficiency. An end user may need to select dimensions and configurations that best suit them based on the materials being blended, blade size, shape, and speed, cup shape and material, and other related factors.

The wall portions 166 may be spaced apart from and extend generally parallel to the internal surface of the sidewall 114 of the cup 106. See FIG. 4. Thus, one or more of the wall portions 166 may define an internal wall that is spaced from the sidewall 114. The separation of the wall portions 166 from the sidewall 114 may help limit forces and movement (e.g., vibration) of the wall portions 166 from being transferred to the sidewall 114. This may further help preserve cup integrity during blending.

FIG. 4 shows a side section view of the blending apparatus 100 including the blender adapter 104, the cup 106, and the collar 108. Once the collar 108 is attached to the blender adapter 104 as shown in FIGS. 2A-2B, the assembly of the adapter 104, cup 106, and collar 108 may be inverted into the position shown in FIG. 4 for mounting to the blender base 102. Thus, at least some of the material in the cup 106 may fall into and around the internal chamber 142 of the blender adapter 104 through the top opening 162.

FIG. 4 shows a blending blade assembly 168 positioned in the bottom wall 146 of the blender adapter 104. The blending blade assembly 168 includes a blade 170, a driveshaft 172, and a seal and bearing assembly 174. The blade 170 may be configured to turn within the internal chamber 142 of the adapter 104 when driven by the driveshaft 172.

FIG. 4 also shows the interface between the internal surface of the sidewall 114 of the cup 106 and the gasket 120. The gasket 120 may be partially deformed and compressed as it seals the surface of the cup 106. The lip 118 may be radially external to the gasket 120 when the mouth 116 of the cup 106 is against the resting surface 154 of the adapter 104. The lip 118 may be held down by the collar 108.

In the position shown in FIG. 4, a space 180 within the cup 106 may be defined above the adapter 104. That space 180 may contain material and air that is outside the adapter 104 and outside the internal chamber 142 of the adapter 104. Material in the cup space 180 may slow or otherwise restrict movement of particles deflected from the blade 170 in addition to the shelf and wall portions 156, 166. A portion of the cup space 180 may extend around the shelf and/or wall portions 156, 166 within the sidewall 114. Material in the cup space 180 may pass into the internal chamber 142 via the top opening 162 and the spaces between the shelf and wall portions 156, 166.

Various additional embodiments of blender adapters are shown in FIGS. 5-26C. Each of the blender adapters has a different blending efficiency depending on the type and amount of materials being blended. Features and elements of individual blender adapters shown herein may be combined and incorporated into other embodiments or modified to fit the needs of the user within the scope of knowledge of one having ordinary skill in the art.

Figure 5:
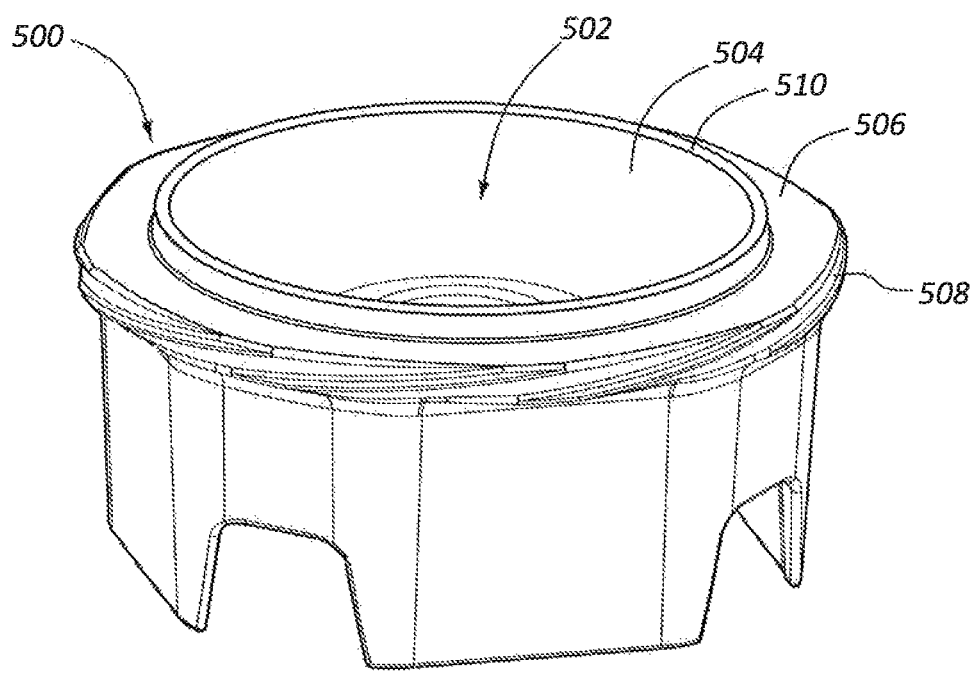
FIG. 5 shows another embodiment of a blender adapter.

FIG. 5 shows a perspective view of a blender adapter 500 having an internal chamber 502 having a sidewall 504. A cup may be placed with its mouth in contact with a sealing surface 506 radially external to the sidewall 504. A collar may be placed over and around the lip of the cup. The collar may be tightened down by being threaded onto external threads 508 that are below the sealing surface 506. In this embodiment, the mouth of the cup is vertically sealed against the sealing surface 506 by downward pressure applied by the collar. The sidewall 504 forms a circular/cylindrical ridge 510 that helps keep the cup properly laterally positioned relative to the adapter 500. The ridge 510 also may be formed to contact the inner surface of the cup to provide some radial sealing.

Figure 6:
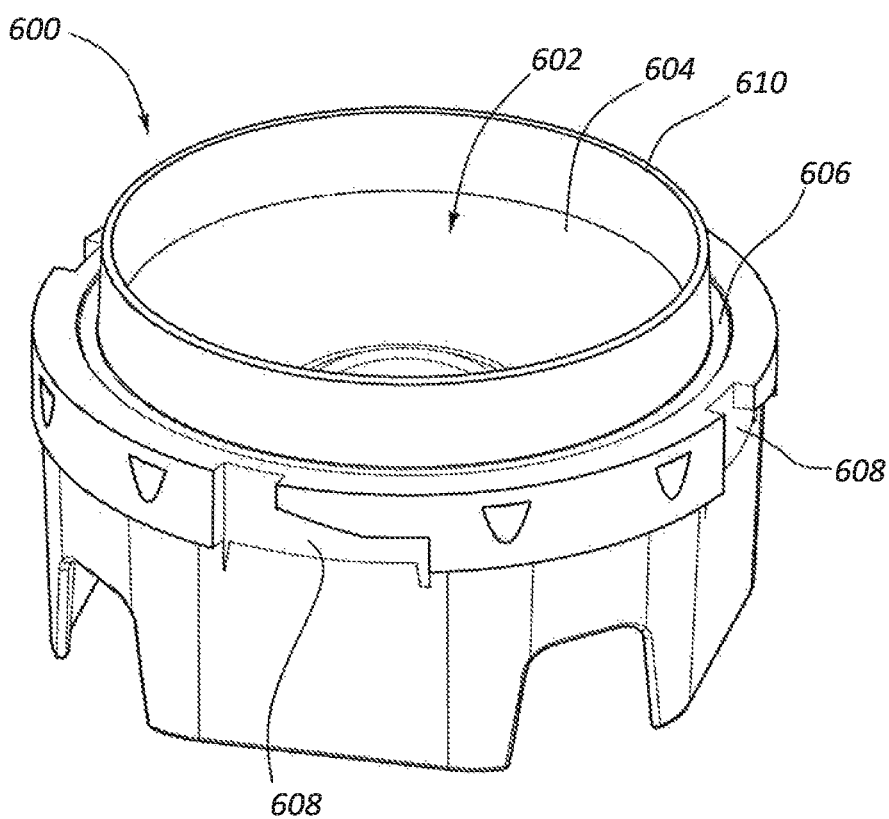
FIG. 6 shows another embodiment of a blender adapter.

FIG. 6 shows a perspective view of another blender adapter 600 having an internal chamber 602 having a sidewall 604. A cup may be placed with its mouth in contact with a sealing surface 606 radially external to the sidewall 604. The sealing surface 606 is a recess in a top surface of the adapter 600 and therefore may provide additional sealing laterally around the mouth of the cup. A collar may interlock with locking grooves 608 external to the sealing surface 606 to hold the cup in place. The locking grooves 608 may advance the collar vertically downward as the collar is connected to the adapter 600 so that it vertically clamps down the cup against the adapter 600. The locking grooves 608 may make the adapter 600 easier to clean than adapter 500 due to having a smaller surface area and fewer hard-to-reach crevices than the threads 508. The cup may be vertically sealed against the sealing surface 606 by downward pressure applied by the collar. The sidewall 604 also forms a ridge 610 that helps seal the cup and helps to keep it properly laterally positioned. The ridge 610 extends further up the internal surface of the cup and may provide improved protection to the cup walls as compared to adapter 500.

Figure 7A:
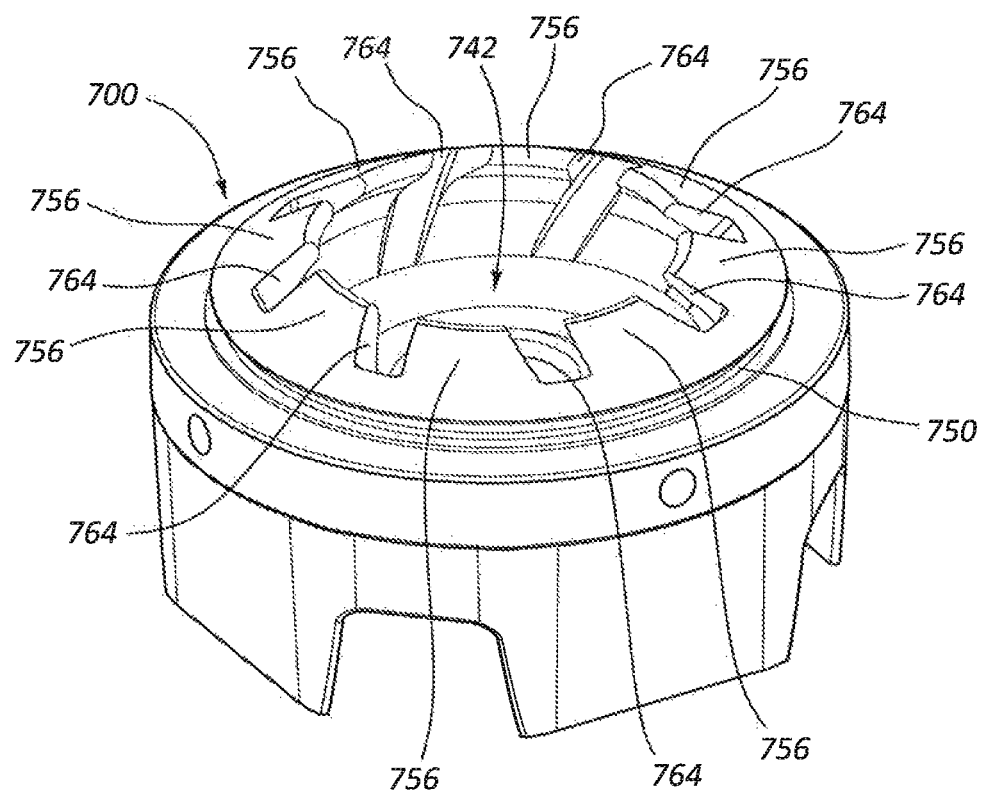
FIGS. 7A-7C show another embodiment of a blender adapter.
Figure 7B:
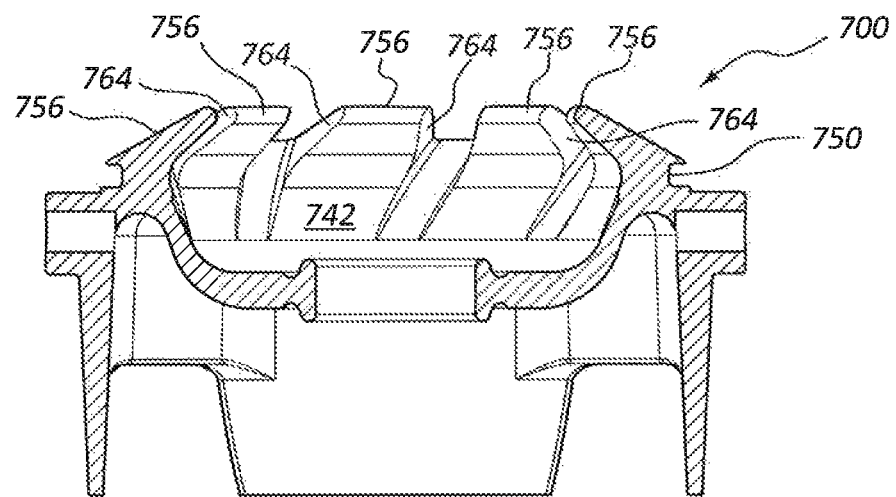
Figure 7C:
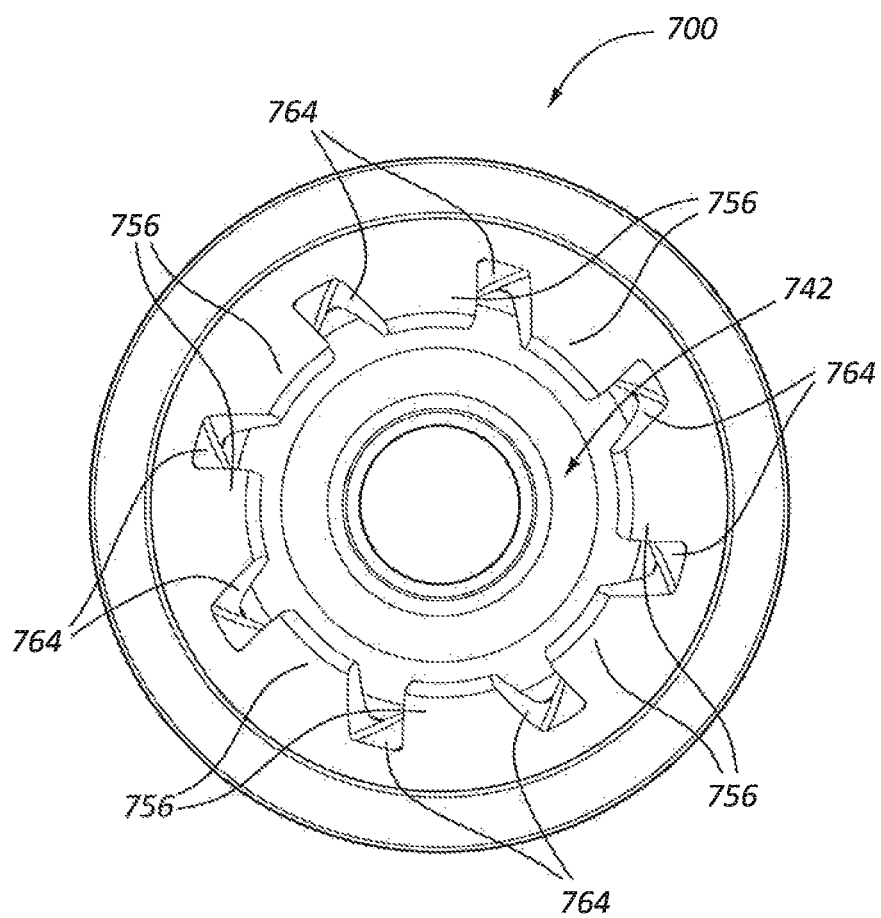

FIGS. 7A-7C show another blender adapter 700. The adapter 700 has a plurality of shelf portions 756 that overhang an internal chamber 742. There is also a plurality of vent slots 764 that are positioned between the shelf portions 756. The plurality of shelf portions 756 lack additional wall portions (e.g., 166), so there is no extended-height passage that vertically leads to the opening between the shelf portions 756. Accordingly, there is more freedom of movement of particles into and out of the internal chamber 742. The vent slots 764 have a helical or spiral shape formation (see FIG. 7C) that extends circumferentially around the top opening. The helical or spiral shape may induce or encourage flow in one direction around to the central vertical axis of the adapter 700. A rate of flow in the other direction may thereby also be reduced. The vent slots 764 may allow some of the blended material in the chamber 742 to circulate upward to help incorporate blending the whole contents of the cup. The shelf portions 756 direct high-velocity blending particles away from the sides of the cup and redirect it back into engagement with a blending blade in the chamber 742. This may reduce strain on the cup. The adapter 700 also uses a radial sealing gasket that may be placed in a seat 750 similar to adapter 104. The radial seal may be easier to couple and decouple than the vertical seal of adapters 500 and 600 while also providing a more reliable seal.

Figure 8A:
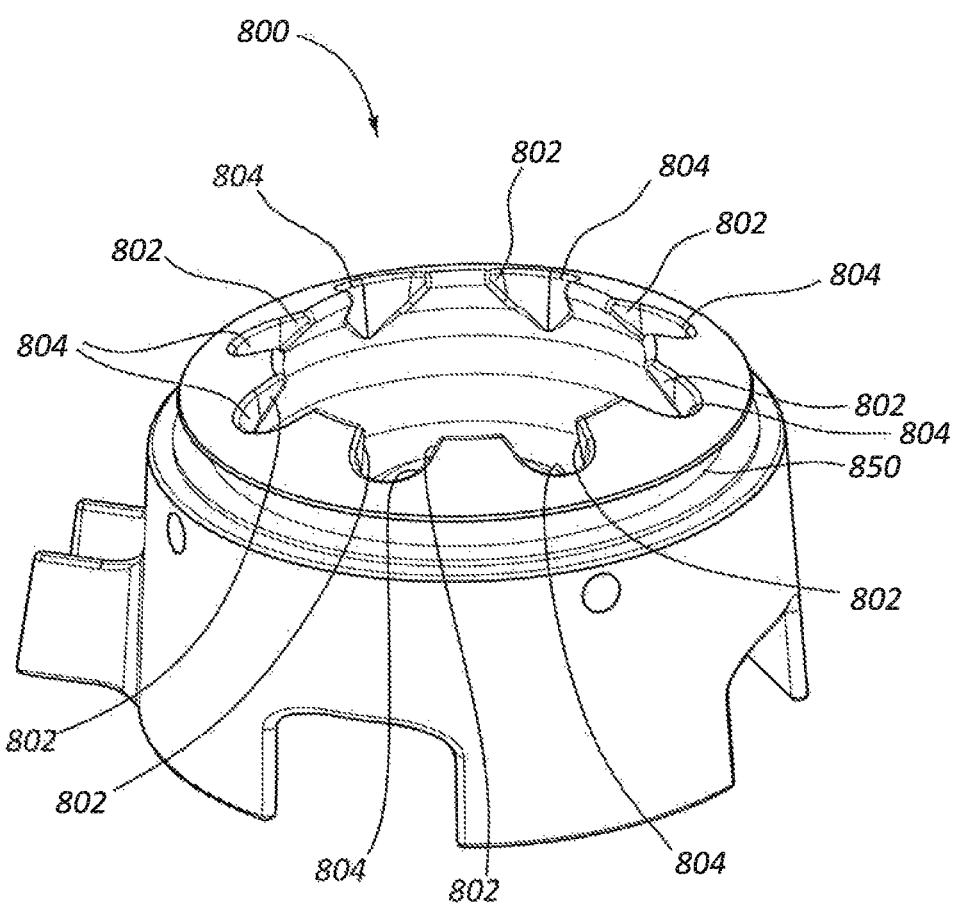
FIGS. 8A-8C show another embodiment of a blender adapter.
Figure 8B:
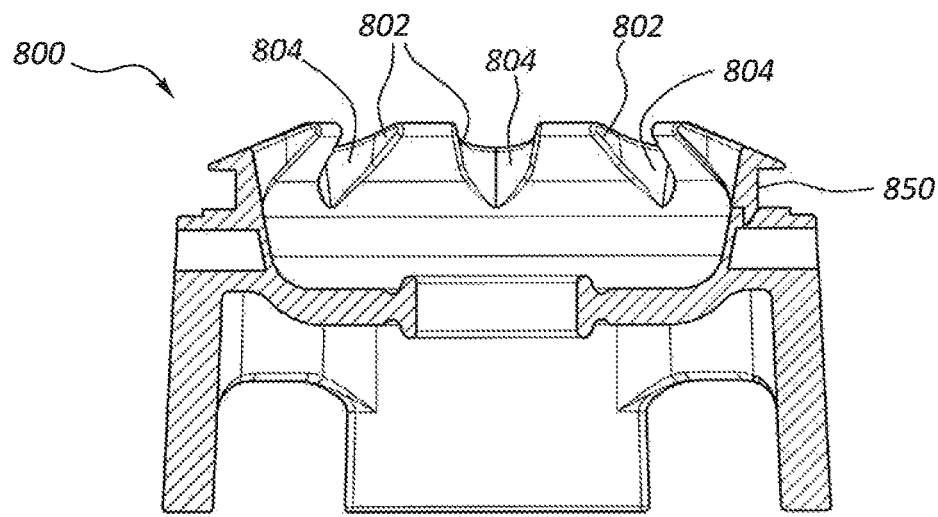
Figure 8C:
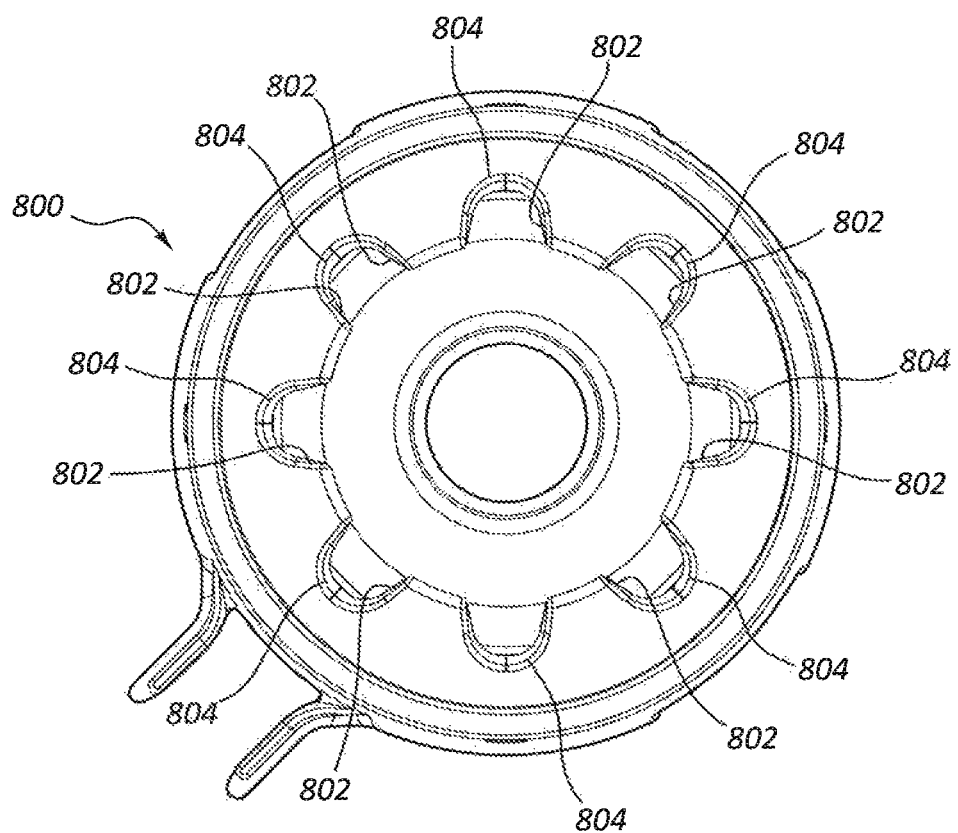

FIGS. 8A-8C show a blending adapter 800 that has vents 802 that are straight slots, vent roots 804 that are rounded, a larger gasket seat 850, and changed external surface geometries as compared to adapter 700. The straight slot vents 802 may be easier to manufacture and clean than helical slots, the vent roots 804 may be easier to clean than square roots, and the larger gasket seat 850 may provide an improved sealing surface that has increased surface area. The external surface geometries have improved aesthetic appeal and clean-ability. The shape of the vents 802 may be referred to as being flower petal-shaped or crescent-shaped when viewed from above, such as in the view of FIG. 8C.

Figure 9A:
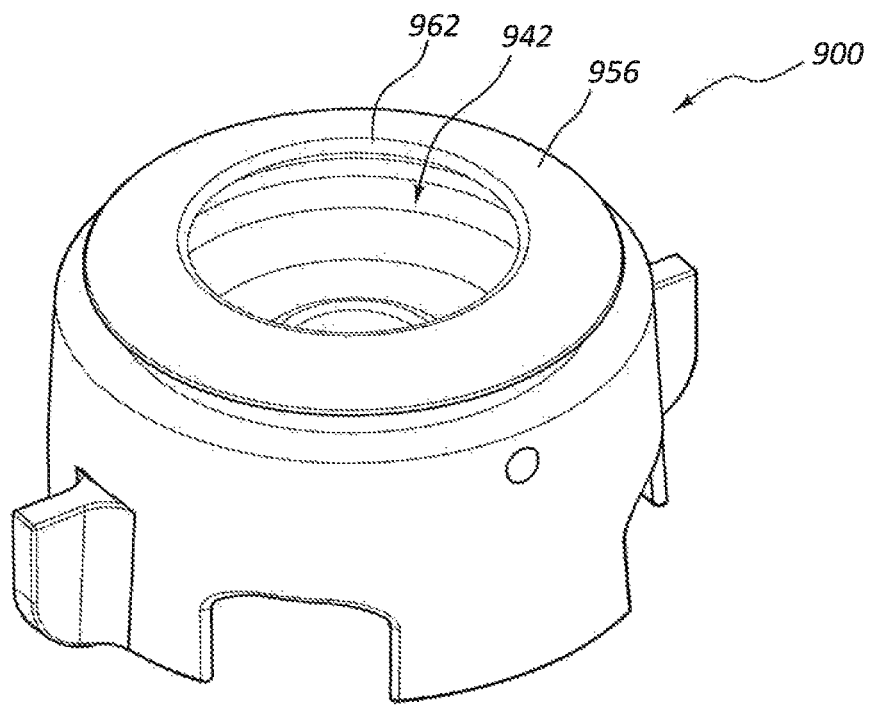
FIGS. 9A-9B show another embodiment of a blender adapter.
Figure 9B:
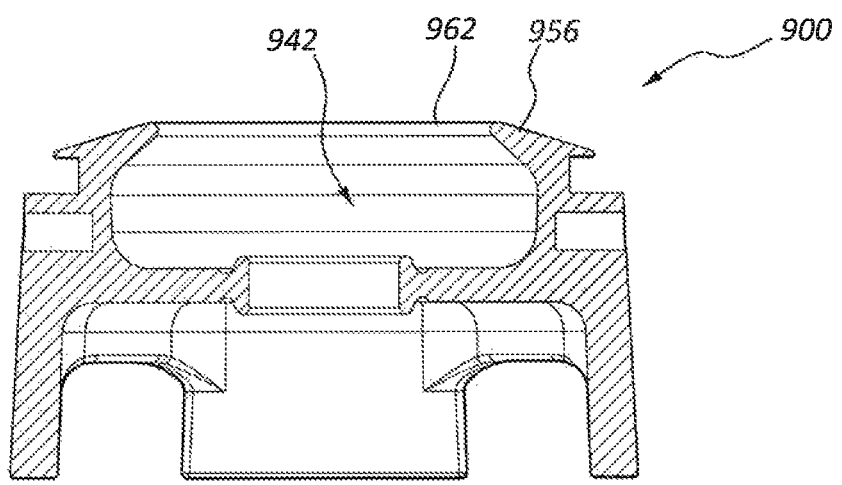

FIGS. 9A-9B respectively show perspective and side section views of another blending adapter 900. The blending adapter 900 may comprise a single continuous shelf portion 956 that does not have vent slots or apertures extending through it. The top opening 962 of the adapter 900 is completely circular. The absence of the vent slots or apertures may reduce the amount of material that impacts the inside of the cup when it is deflected from the blade in the internal chamber 942 since it cannot pass through the shelf portion 956 to reach the cup without going vertically upward through the top opening 962. This means that blending may be gentler on the cup and that material must flow around the shelf portion 956 in order to enter the internal chamber 942.

Figure 10A:
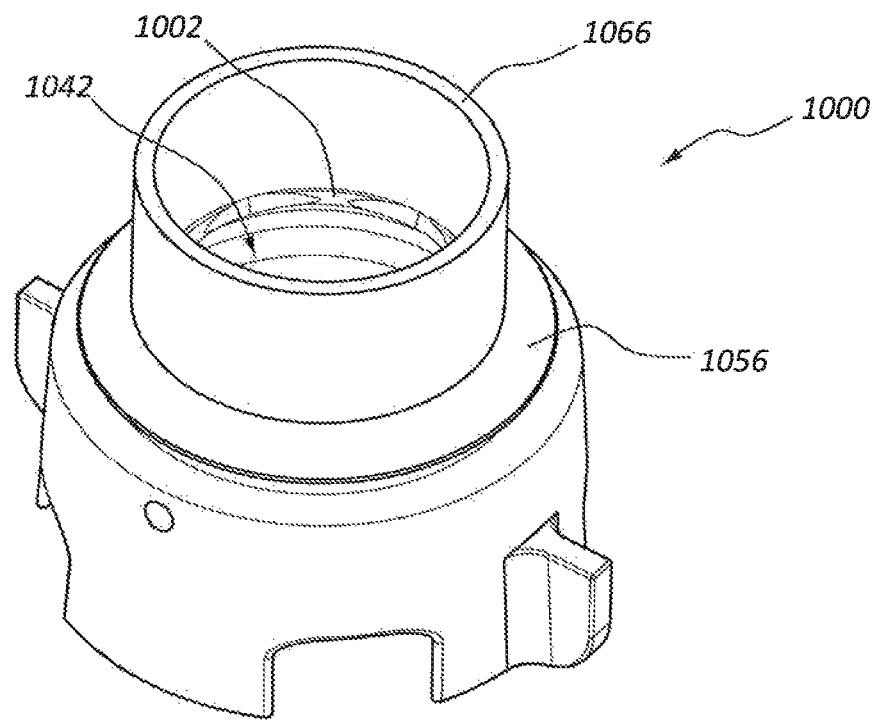
FIGS. 10A-10B show another embodiment of a blender adapter.
Figure 10B:
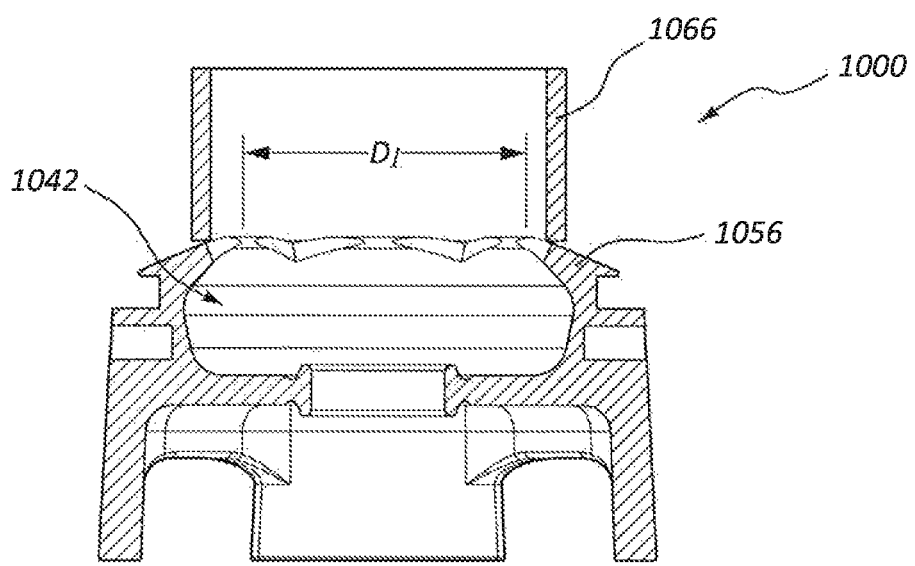

FIGS. 10A-10B respectively show perspective and side views of another blending adapter 1000. The blending adapter 1000 has a continuous and circular shelf portion 1056 and also includes a wall portion 1066 that extends vertically upward from the shelf portion 1056. This configuration makes it even more unlikely for material to impact the sidewalls of the cup during blending because it must travel nearly completely vertically upward to exit the passage created by the wall portion 1066 (and through the flow of other materials being blended in the adapter 1000).

The shelf portion 1056 has a central rim 1002 that has a diameter DI that is smaller than the inner diameter of the wall portion 1066. Thus, material passing downward through the wall portion 1066 must pass through a smaller opening to enter the internal chamber 1042 of the adapter 1000. This allows more material to be held within the wall portion 1066 and means there is less space for material to collect on top of the shelf portion 1056 external to the wall portion 1066.

Figure 11:
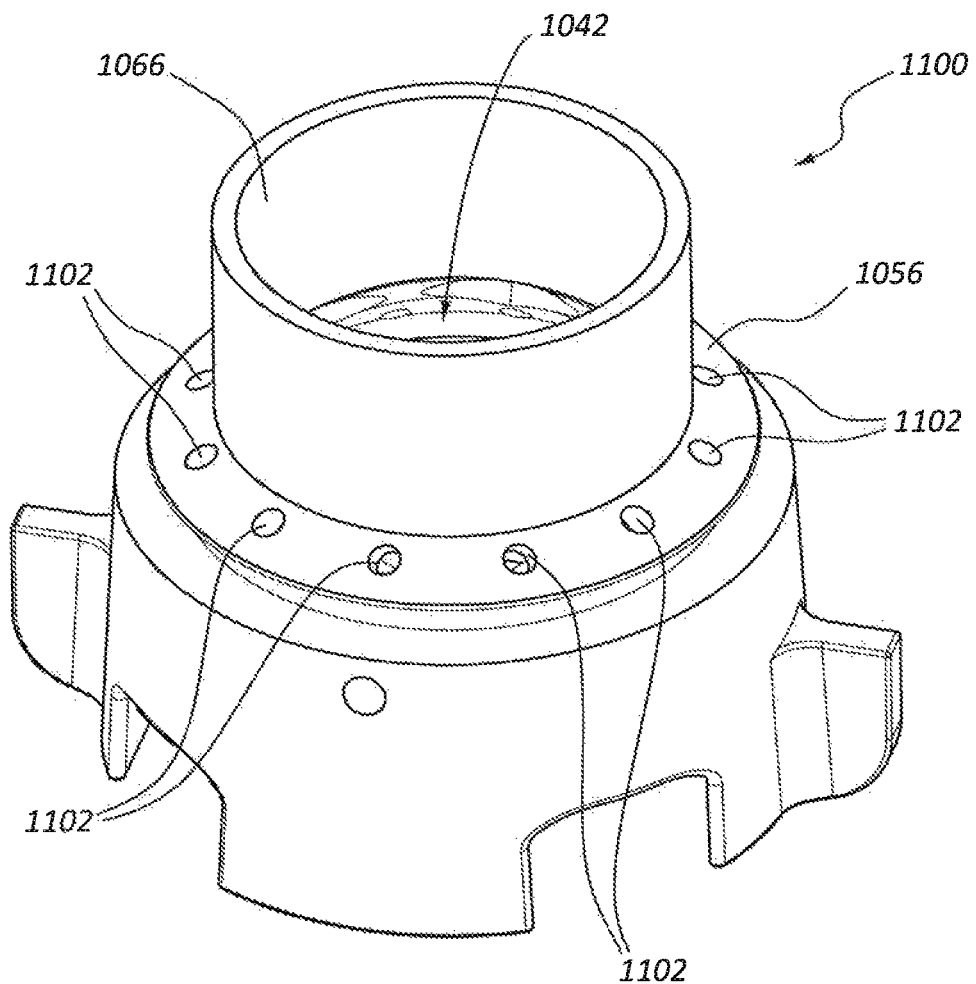
FIG. 11 shows another embodiment of a blender adapter.
Figure 12:
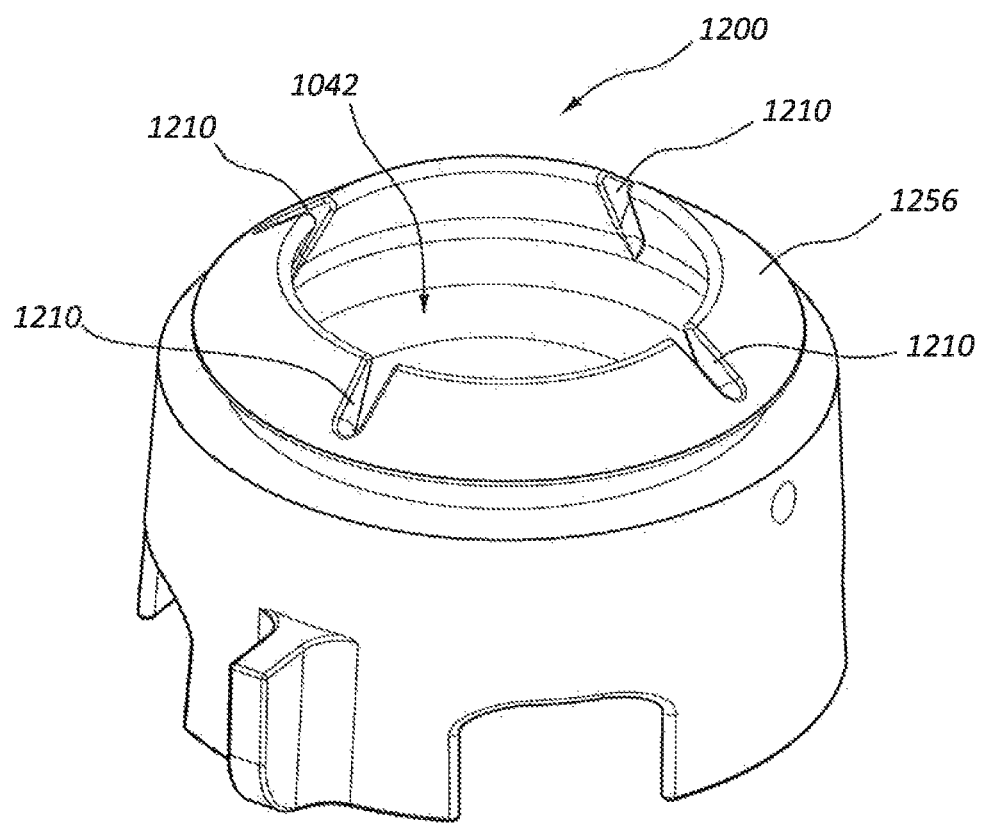
FIG. 12 shows another embodiment of a blender adapter.
Figure 13A:
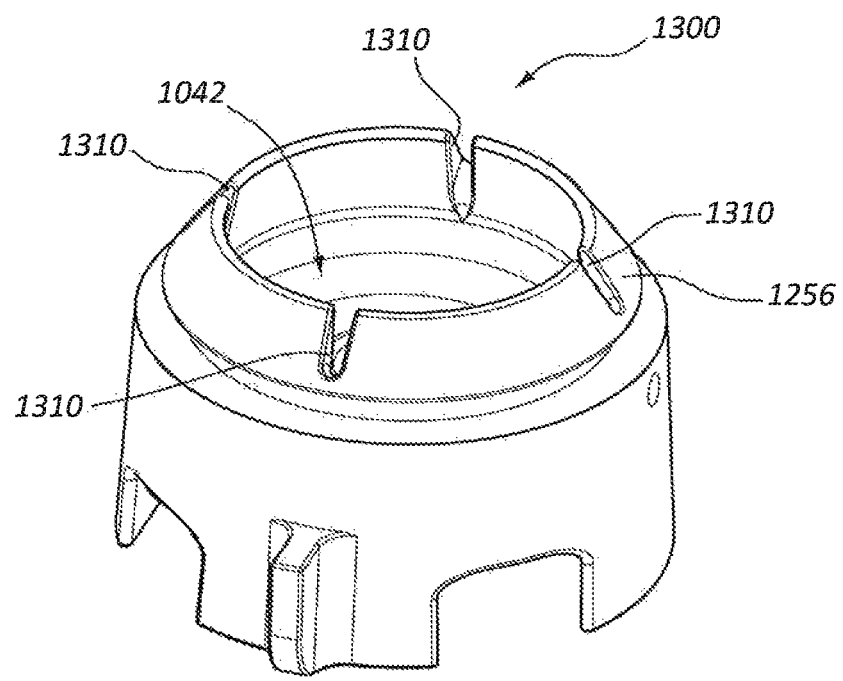
FIGS. 13A-13B show another embodiment of a blender adapter.
Figure 13B:
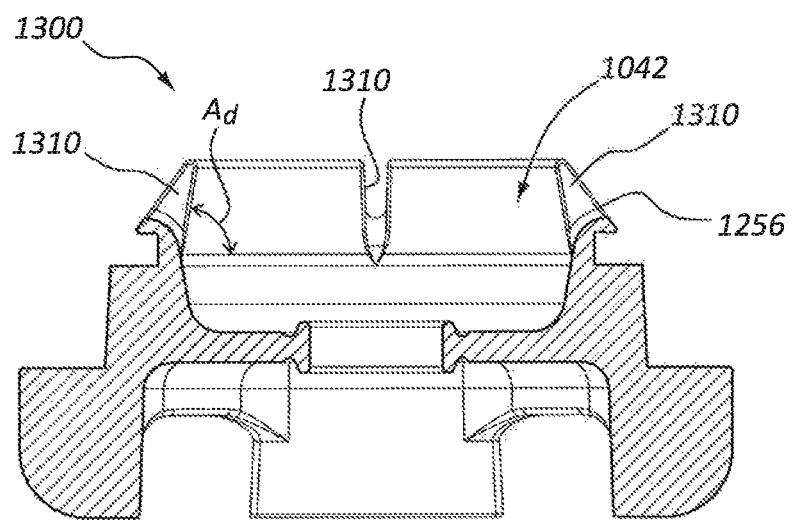
Figure 14A:
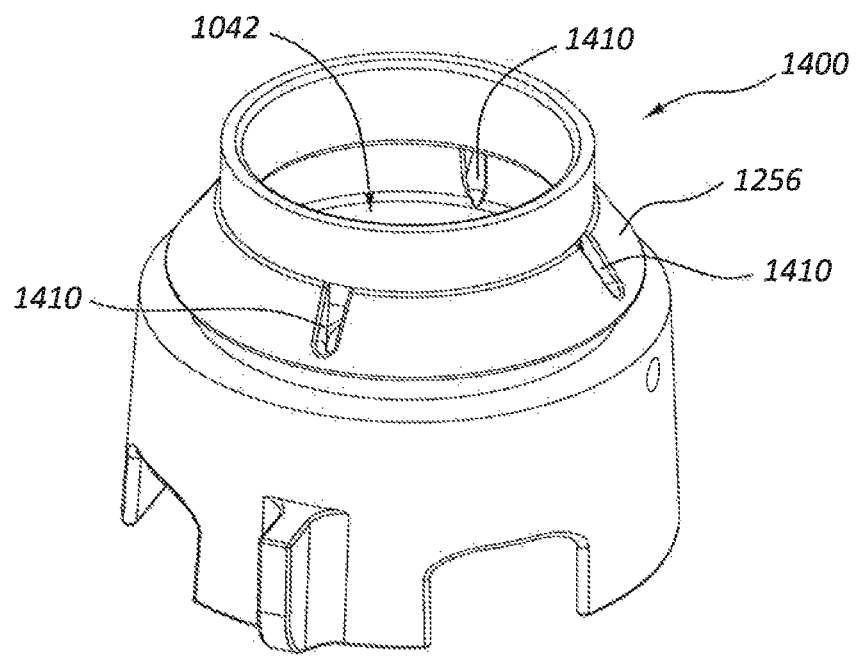
FIGS. 14A-14B show another embodiment of a blender adapter.
Figure 14B:
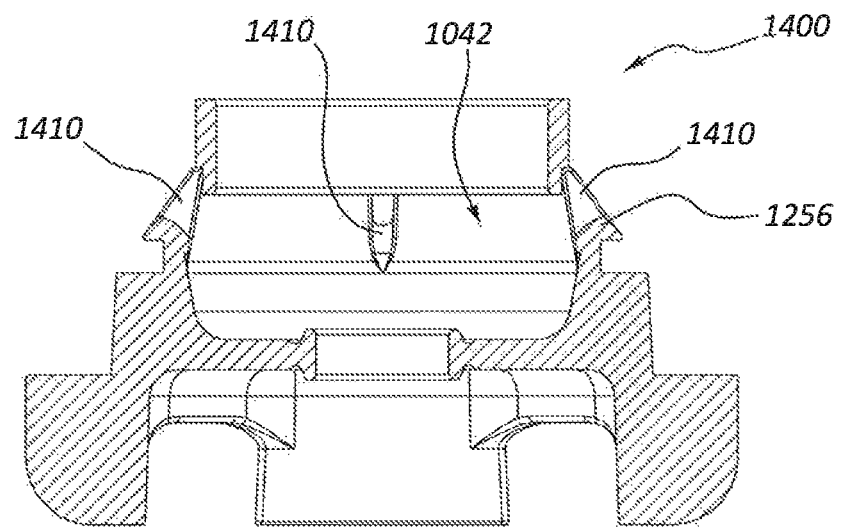
Figure 15A:
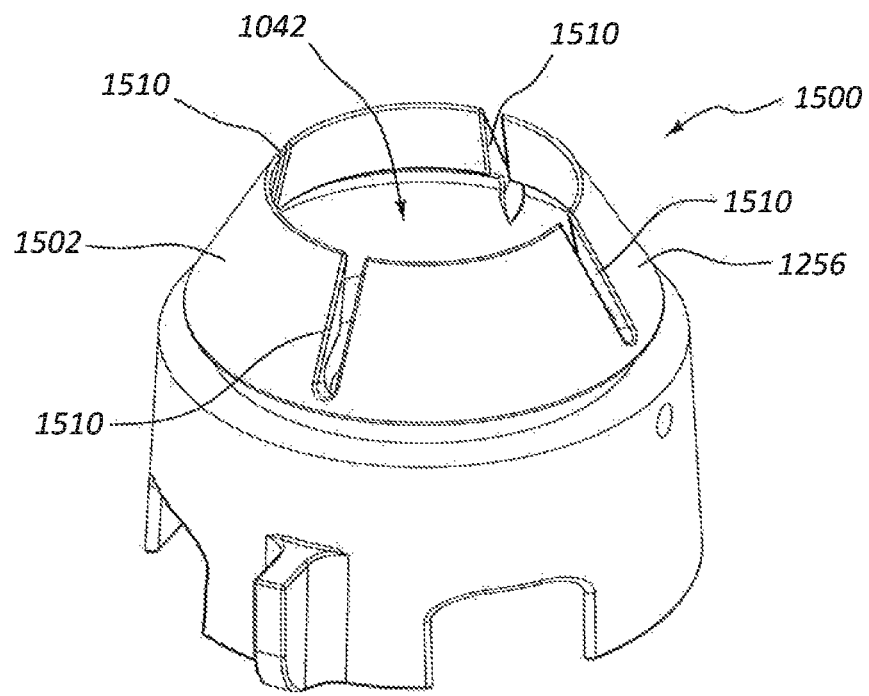
FIGS. 15A-15B show another embodiment of a blender adapter.
Figure 15B:
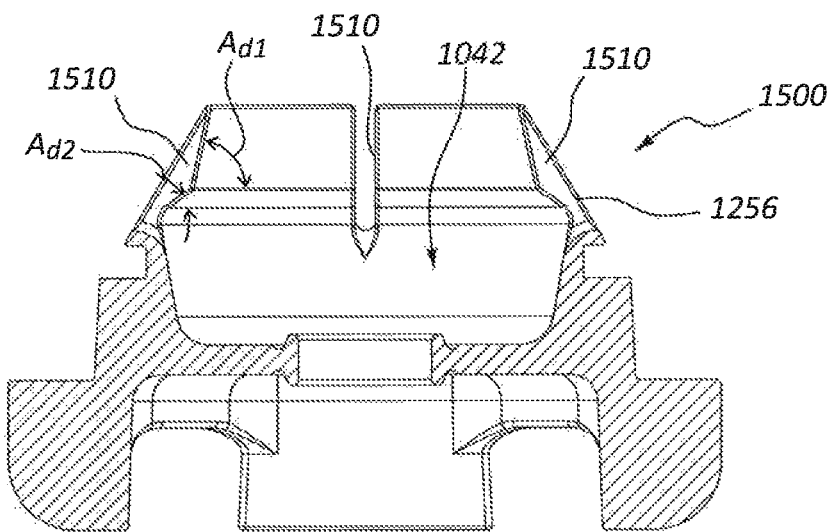
Figure 16A:
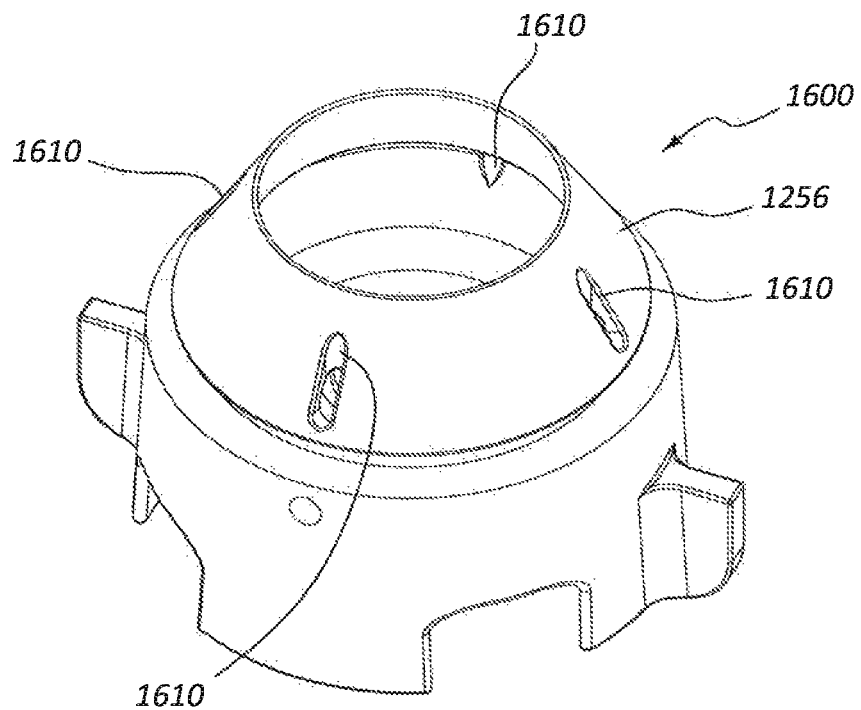
FIGS. 16A-16B show another embodiment of a blender adapter.
Figure 16B:
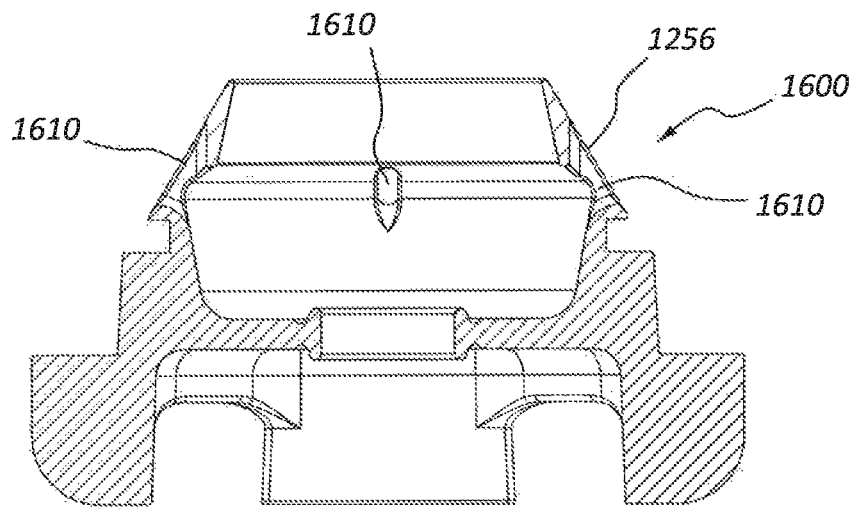
Figure 17A:
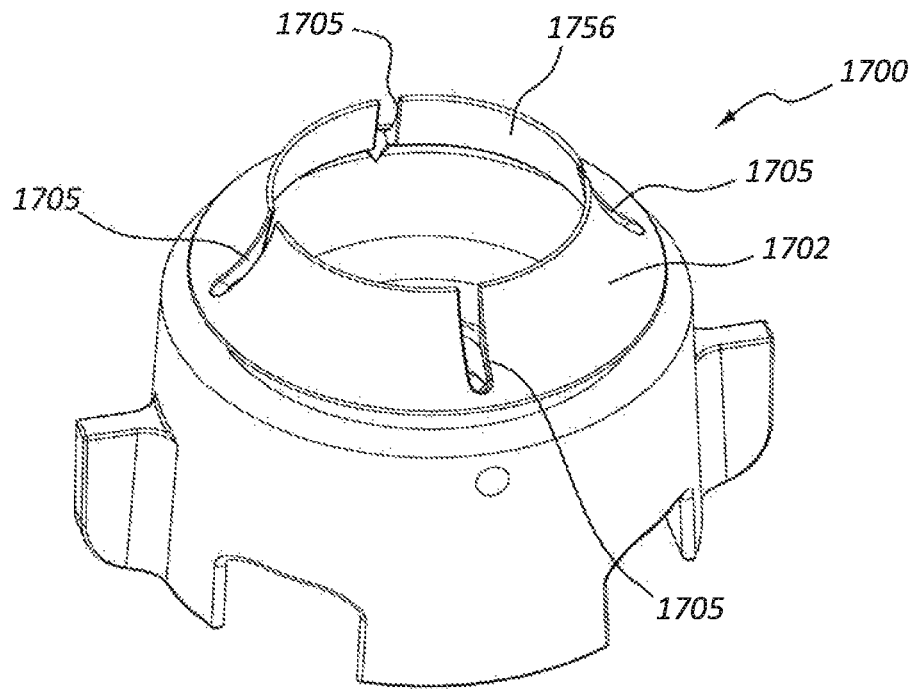
FIGS. 17A-17B show another embodiment of a blender adapter.
Figure 17B:
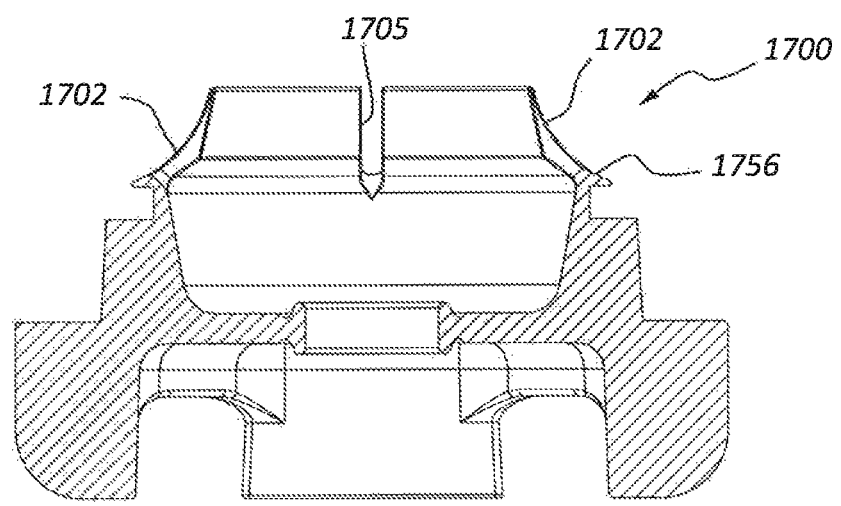
Figure 18A:
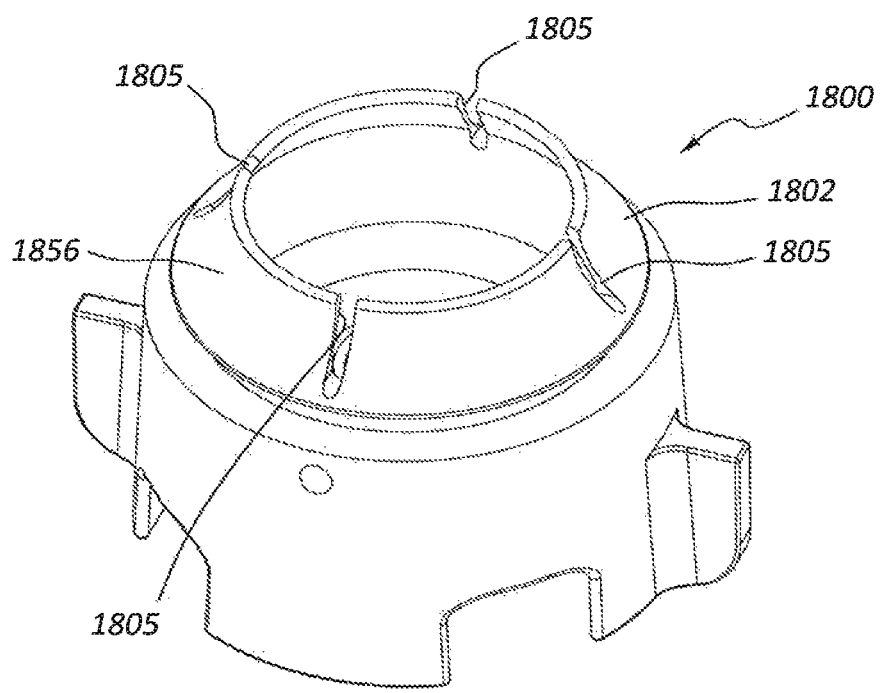
FIGS. 18A-18B show another embodiment of a blender adapter.
Figure 18B:
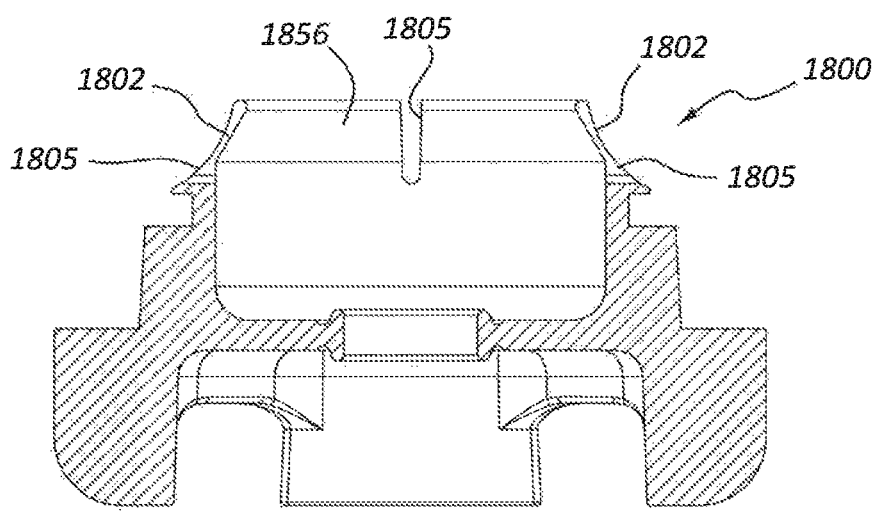

FIG. 11 shows a blending adapter 1100 that is the same as blending adapter 1000 but with additional vent openings 1102 positioned circumferentially around the shelf portion 1056. The vent openings 1102 are circular in shape and are evenly spaced around the circumference of the shelf portion 1056 at positions external to the wall portion 1066. The vent openings 1102 may allow material positioned external to the wall portion 1066 to pass into the internal chamber 1042 during blending. The vent openings 1102 may therefore allow a smoother and more consistent blending of all material in a cup due to the increased circulation of the material during blending.

FIGS. 12-16B show another series of blending adapters 1200, 1300, 1400, 1500, 1600 according to the present disclosure. Compared to blending adapters 700 through 1100 described above, these blending adapters 1200, 1300, 1400, 1500, 1600 have an increased reverse draft angle for their shelf portions 1256. FIG. 13B shows an example position of the reverse draft angle Ad. The increased reverse draft angle Ad may allow the blending chamber to be more open, so the particles blended in the blending adapters may be larger and flow may circulate in and out of the blending chamber more freely. Blending adapter 1200 has a reverse draft angle that is less than the reverse draft angle Ad of adapters 1300 and 1400. A smaller reverse draft angle may make it more difficult for material to be deflected out of the internal chamber 1242 of the adapter. These reverse draft angles Ad may each be less than about 90 degrees.

Adapters 1500 and 1600 use a plurality of reverse draft angles Ad1 and Ad2, wherein one of the reverse draft angles (Ad1) is greater than the other (Ad2). See FIG. 15B. In these embodiments, a first reverse draft angle Ad1 may be positioned on a wall portion and a second reverse draft angle Ad2 may be positioned on a shelf portion. Alternatively, the first and second reverse draft angles Ad1, Ad2 may both be positioned on a single shelf portion 1256. A shelf portion 1256 may be differentiated from a wall portion by whether the upper surface of the shelf portion 1502 comprises a continuous curve or line above the gasket seat. If the outer surface is a continuous line or curve, as shown, for example, in FIGS. 13B, 15B, and 16B, the entire portion of the adapter 1500, 1600 may be referred to as a shelf portion 1256, and if the outer surface is discontinuous, as shown, for example, in FIGS. 10B and 14B, the more vertical portion may be referred to as a wall portion (e.g., 1066) and the lower portion may be referred to as a shelf portion (e.g., 1056).

The adapters of FIGS. 12-16B may also comprise vent openings. Adapters 1200, 1300, and 1500 comprise vent openings that are slots 1210, 1310, 1510, and adapters 1400 and 1600 comprise vent openings that are apertures 1410, 1610. The slots 1210, 1310, 1510 (i.e., open slots) may extend radially outward from a central opening of the internal chamber and may share a perimeter with (i.e., radially extend the shape of) the central opening. The apertures 1410, 1610 (i.e., closed slots) may be formed through a shelf portion or wall portion without sharing a perimeter with the central opening of the wall or shelf portion over the blending blade assembly. The apertures 1410, 1610 are more protective of the cup (e.g., 106) during blending, but they also restrict more circulation of material in the cup during blending and may be more difficult to clean. Apertures 1410, 1610 may be referred to as elongated oval shaped apertures or slit apertures since they have an elongated shape as compared to circular apertures (e.g., 1102). The increased aperture lengths resist clogging and allow more material to pass through them at once, yet the elongated shape restricts the particle size better than an enlarged circular aperture.

FIGS. 17A-19B depict another set of embodiments of blending adapters 1700, 1800, 1900. These adapters 1700, 1800, 1900 are similar to adapter 1500 but have shelf portions 1756, 1856, 1956 with curved outer surfaces 1702, 1802, 1902. These surfaces 1702, 1802, 1902 may be easier to manufacture than discontinuous outer surfaces of other embodiments herein (e.g., 1100 or 1400). Each of the adapters 1700, 1800, 1900 also have different types of vent openings 1705, 1805, 1905. Additional features of adapter 1900 are set forth below.

FIGS. 20A-22B depict yet another set of embodiments of blending adapters 2000, 2100, 2200. Here, the adapters 2000, 2100, 2200 each comprise an internal chamber 2042, 2142, 2242 that has a sidewall 2044, 2144, 2244 with a substantially constant inner sidewall diameter DS from its top opening downward to the bottom walls 2046, 2146, 2246. Thus, they lack a shelf portion that extends over the surface of their bottom walls 2046, 2146, 2246. They comprise curved top surfaces 2050, 2150, 2250 that have vent openings 2005, 2105, 2205 to assist in circulation of material from the edges of the adapters 2000, 2100, 2200 back into the internal chambers 2042, 2142, 2242.

The vent openings 2005 extend horizontally through the sides of the blender adapter 2000. See FIG. 20B. Vent openings 2105 and 2205 extend at an angle or diagonally through the sides of their respective adapters 2100, 2200. See FIGS. 21B and 22B. Vent openings 2105, 2205 extend diagonally into the internal chamber 2142 through the shelf portions 2150, 2250, thereby forming grooves in the sidewalls 2144, 2244. Each of these configurations may facilitate different directions of flow during blending. For example, vent openings 2105, 2205 may allow more vertical flow in an radially outward and upward direction from the bottom of the internal chambers 2142, 2242 than vent openings 2005.

Figure 19A:
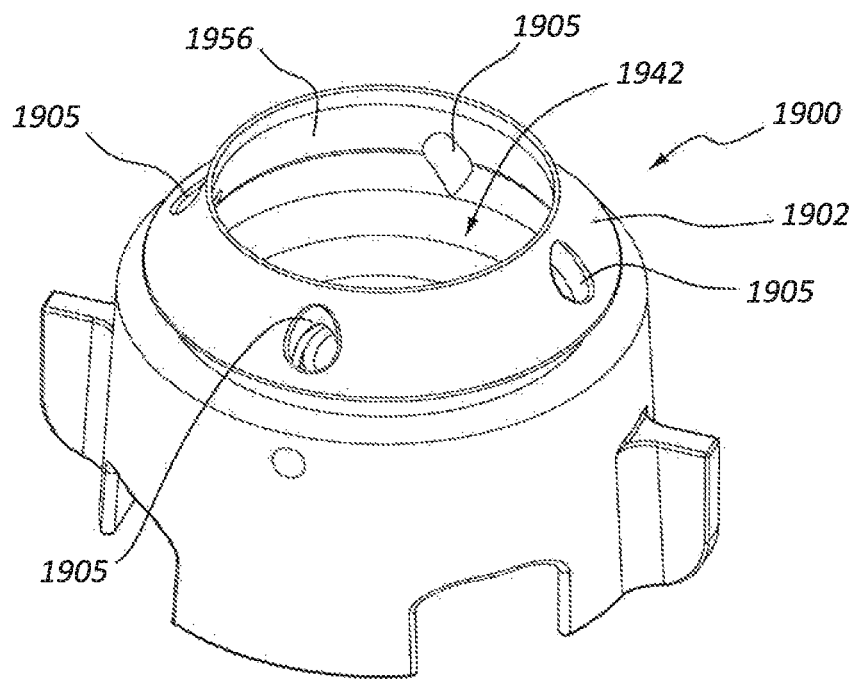
FIGS. 19A-19B show another embodiment of a blender adapter.
Figure 19B:
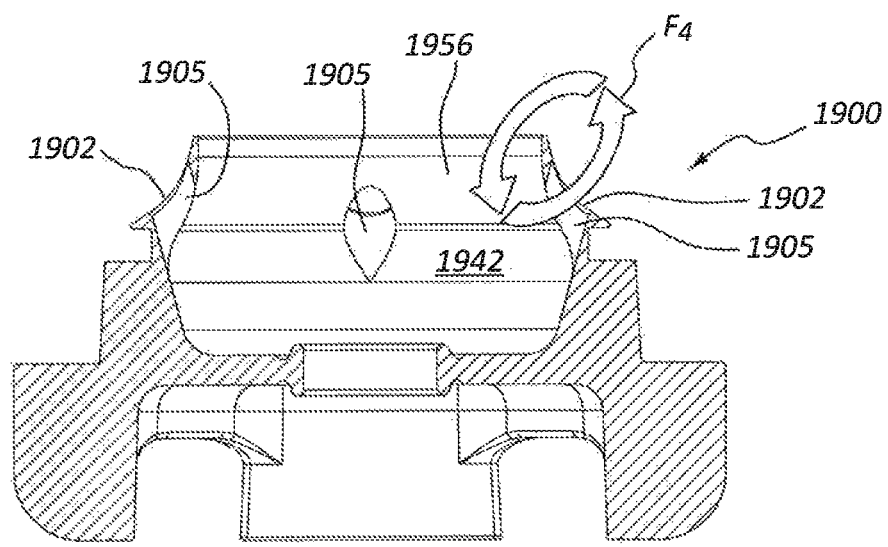
Figure 20A:
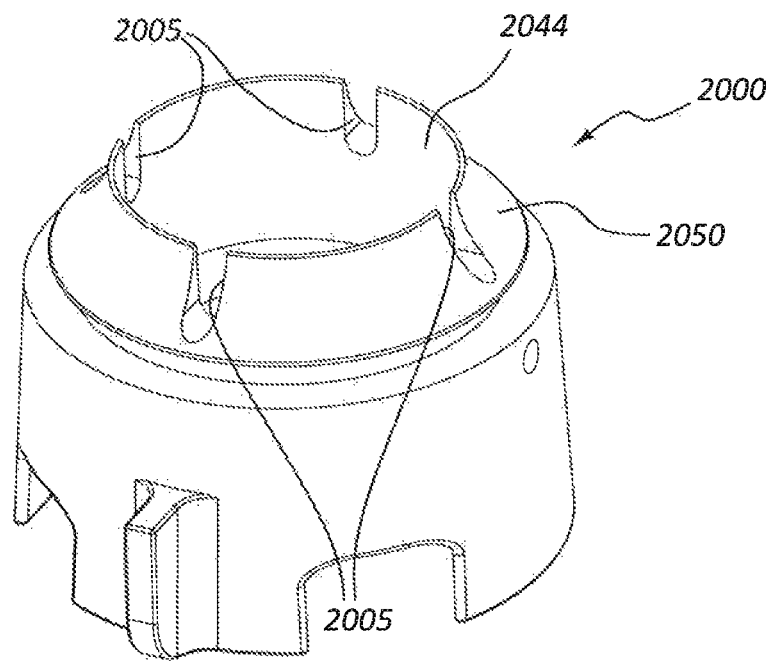
FIGS. 20A-20B show another embodiment of a blender adapter.
Figure 20B:
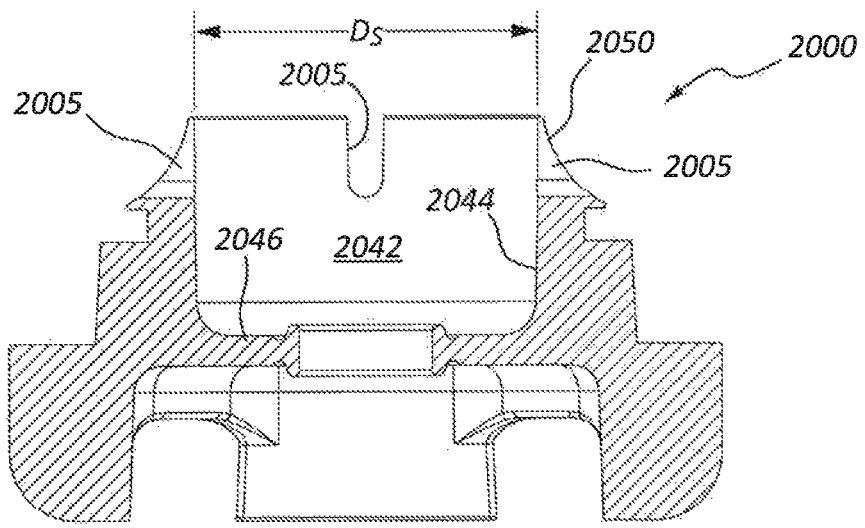
Figure 21A:
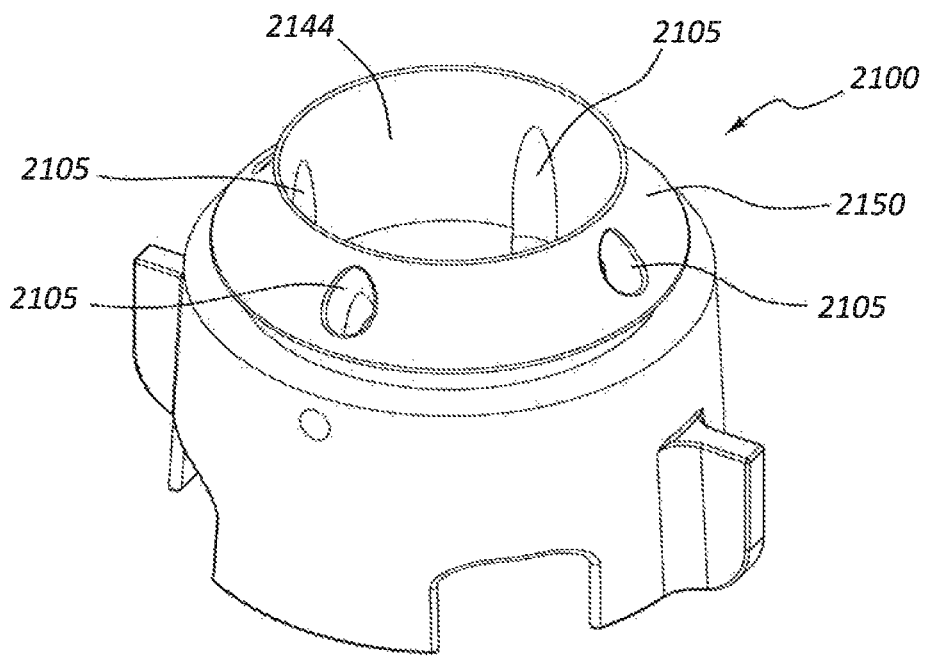
FIGS. 21A-21B show another embodiment of a blender adapter.
Figure 21B:
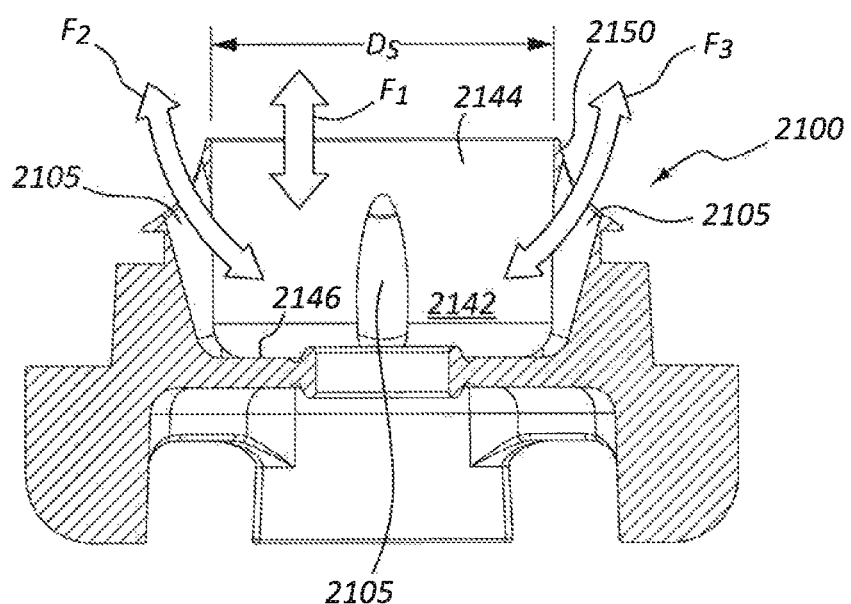
Figure 22A:
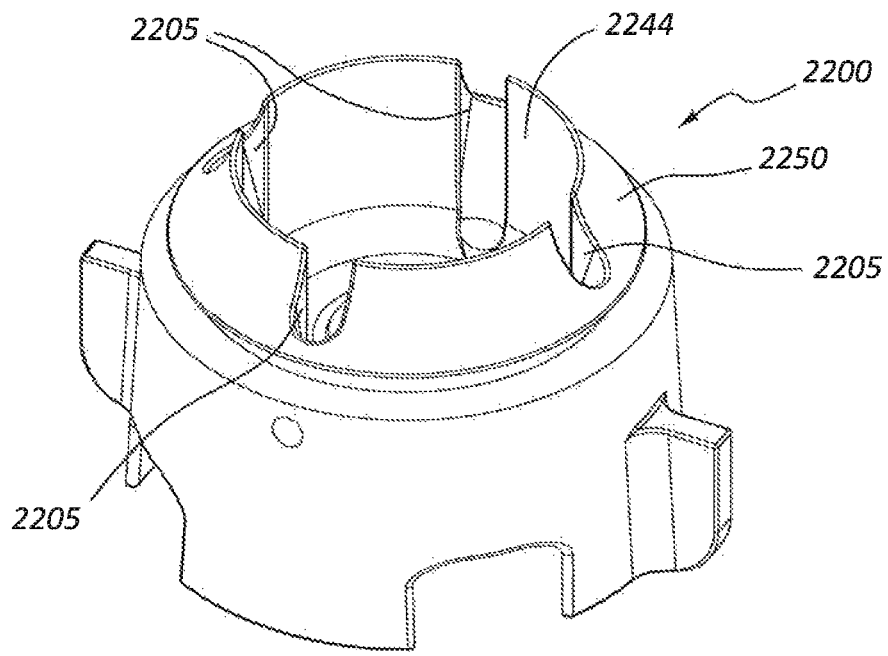
FIGS. 22A-22B show another embodiment of a blender adapter.
Figure 22B:
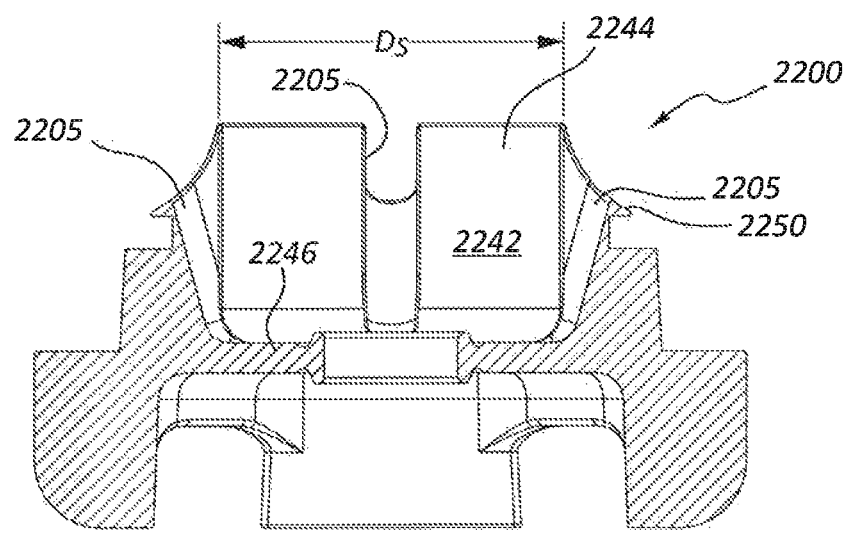

In blender adapters 1900 and 2100, the topmost edges of the blender adapters 1900, 2100 are continuous, but the vent openings 1905, 2105 all provide alternate paths for material to flow into and out of their internal chambers 1942, 2142. Thus, a first flow path F1 into or out of the internal chambers may be defined extending vertically through the top of the blender adapter, and additional flow paths F2, F3 may be defined extending through the sides of the blender adapter. See FIG. 21B. Material entering an internal chamber from one flow path (e.g., F1) may take one of the other flow paths (e.g., F2) to circulate upward within the cup and adapter assembly in a manner that may improve the circulation of material into and out of the internal chamber by allowing more-blended material to flow out of the way of less-blended material during blending. In some embodiments, this feature may be referred to as a circular flow path, such as, for example, a flow path F4 that extends cyclically around an upper edge of the blender adapter, as shown in FIG. 19B).

Figure 23A:
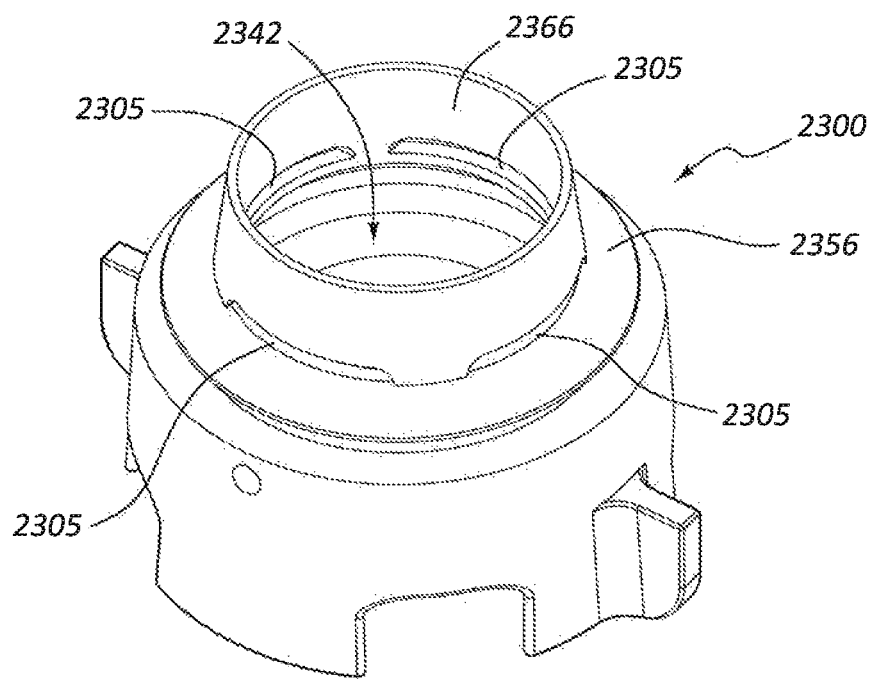
FIGS. 23A-23B show another embodiment of a blender adapter.
Figure 23B:
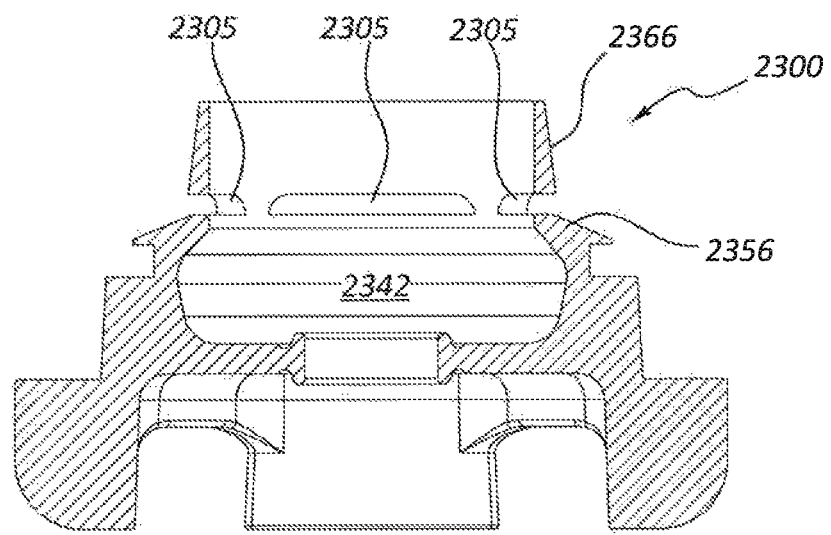

FIGS. 23A-23B show another embodiment of a blender adapter 2300 which is comparable to blender adapter 900 but with a wall portion 2366 extending vertically upward from a shelf portion 2356. A plurality of vent openings 2305 extend horizontally through the wall portion 2366 and perpendicular to the axis of rotation of a blending blade assembly. In this manner, a path of circulation into or out of the internal chamber 2342 may be at least partially defined horizontally through a side of the internal chamber 2342.

Figure 24A:
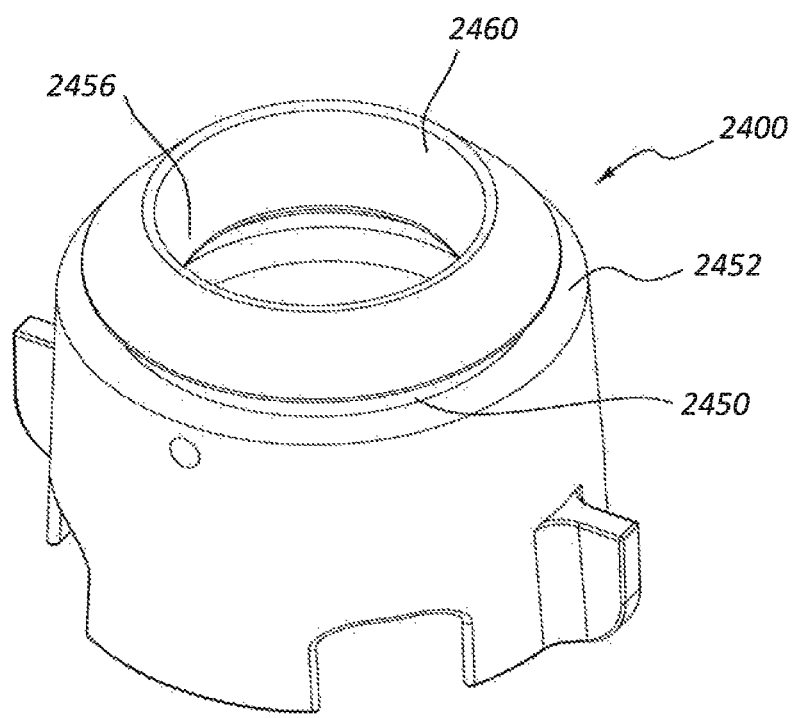
FIGS. 24A-24B show another embodiment of a blender adapter.
Figure 24B:
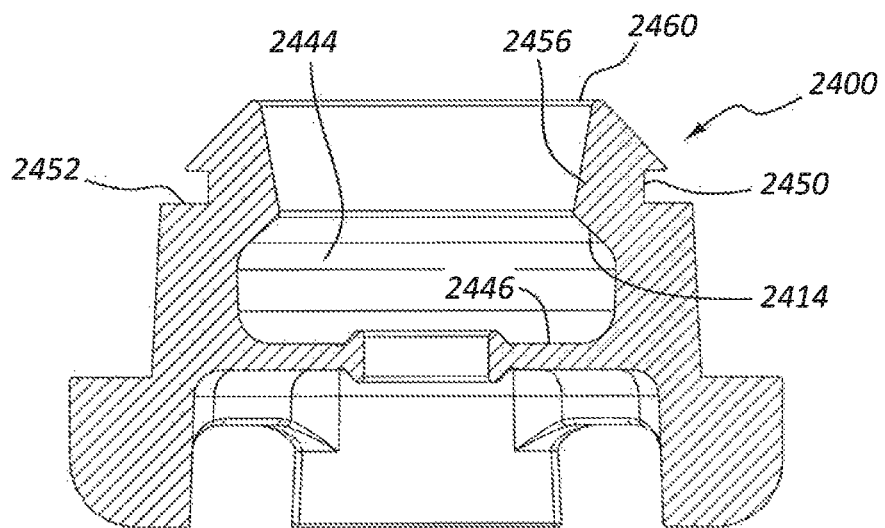

FIGS. 24A-24B show another blender adapter 2400 having similar features to blender adapter 900 but having a bottom wall 2446 that is lower relative to the top opening 2460 of the adapter 2400 than the corresponding structures in blender adapter 900. The bottom wall 2446 is also lower relative to the gasket seat 2450. The seat 2450 and resting surface 2452 are both positioned higher than the bottom surface 2414 of the shelf portion 2456, and the upper shelf portion 2456 is configured to extend into the cup. The mouth (e.g., 116) of the cup is therefore radially external to the shelf portion 2456 rather than being radially external to the sidewall 2444 of the internal chamber that is below the shelf portion 2456. This arrangement increases the amount of air in the material being blended and may therefore make blending less violent.

Figure 25A:
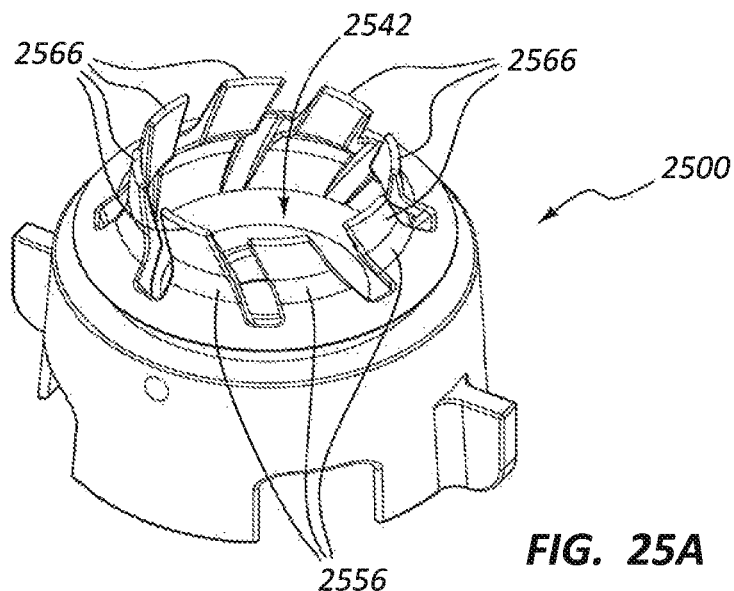
FIGS. 25A-25C show another embodiment of a blender adapter.
Figure 25B:
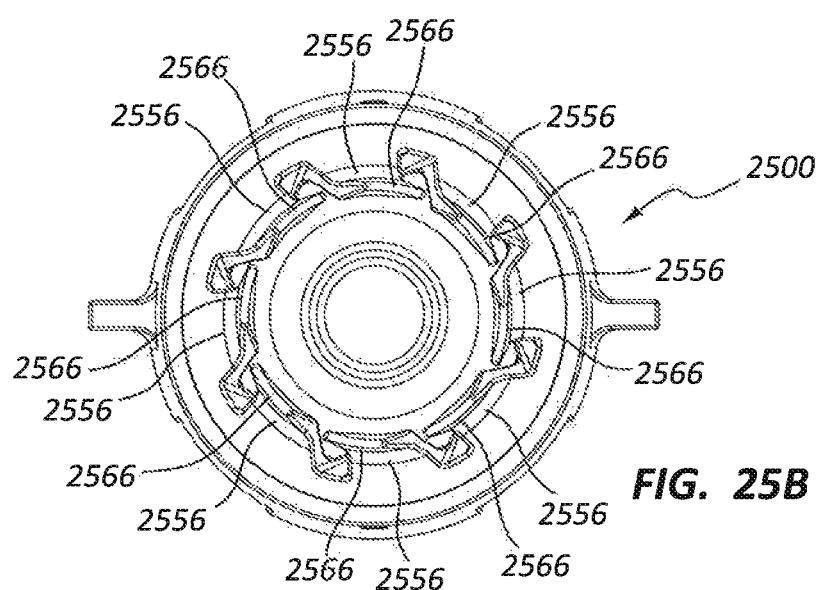
Figure 25C:
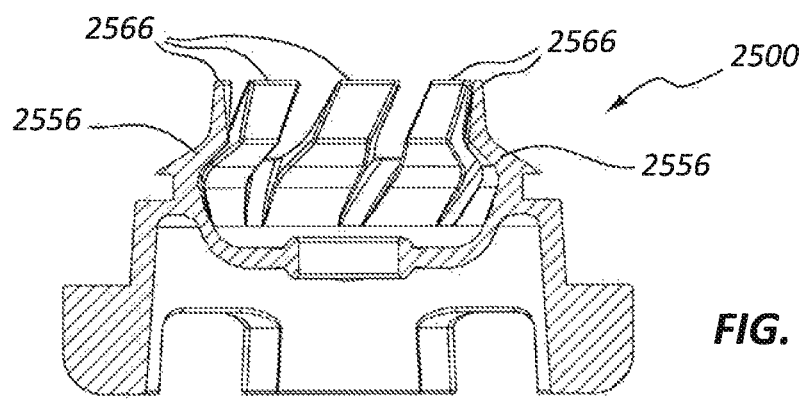

FIGS. 25A-25C depict another blender adapter 2500 having features comparable to blender adapter 700 but with the addition of a plurality of wall portions 2566 that extend helically upward from a plurality of helically-shaped shelf portions 2556. These wall portions 2566 limit the amount and size of material that is thrown laterally by a blending blade assembly within the internal chamber 2542. The restrictive internal geometry of the internal chamber 2542 and space within the wall portions 2566 also help to keep the adapter 2500 from jumping off of a blender base 102. The helical vent openings between the shelf and wall portions 2556, 2566 allow a twin circulation pattern while also allowing material into the inlet to be blended.

Figure 26A:
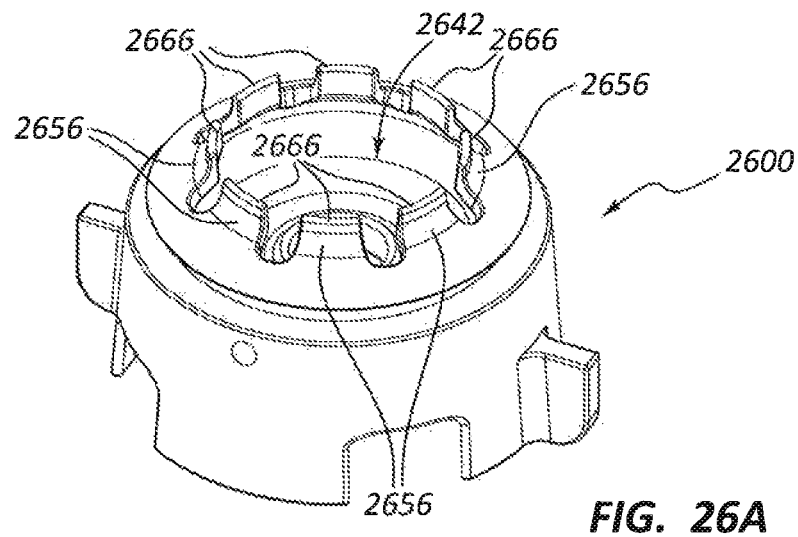
FIGS. 26A-26C show another embodiment of a blender adapter.
Figure 26B:
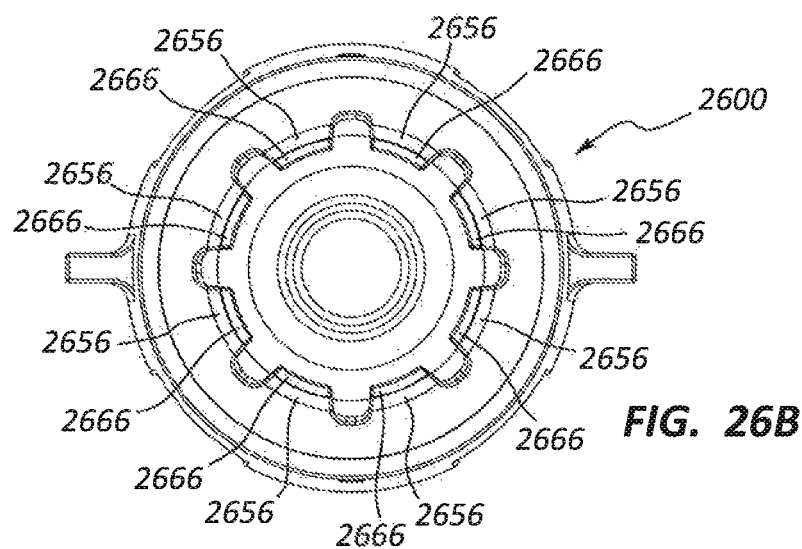
Figure 26C:
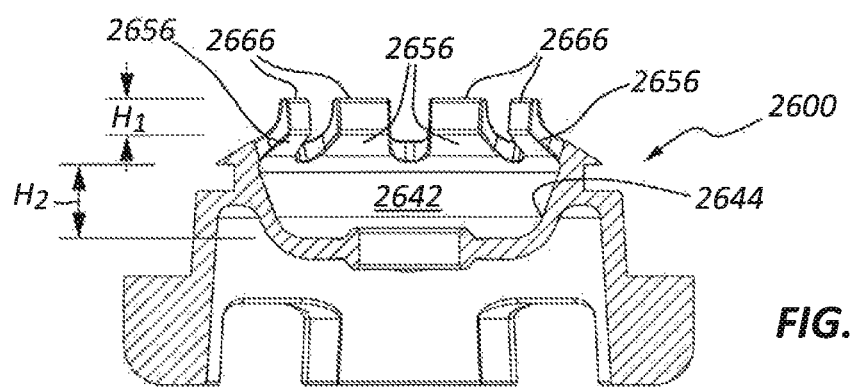

FIG. 26 shows another blender adapter 2600 that is similar to adapter 104 but that has wall portions 2666 with a decreased height H1 as compared to the wall portions 166 of adapter 104. The decreased wall portion height increases flow into and out of the internal chamber. Thus, larger particles may move into and out of the internal chamber during blending in adapter 2600 as compared to adapter 104. In this adapter 2600, the height H1 of the wall portions 2666 is less than half of the height H2 of the sidewall 2644 of the internal chamber 2642. In adapter 104, the height of the wall portions 166 is greater than half of the height of the sidewall 144, as measured between the bottom wall 146 and the bottom surface 160 of the shelf portion 156. Thus, the wall portions 2666 may provide less resistance to movement of material into and out of the internal chamber 2642 of the adapter 2600 than adapter 104.

FIGS. 27A-29C illustrate additional embodiments of blender adapters 2700, 2900 according to the present disclosure. These adapters 2700, 2900 each comprise an internal chamber 2742, 2942 having a plurality of shelf portions 2756, 2956 that extend over the walls (e.g., sidewalls 2744, 2944) or bottom of the chamber 2742, 2942. These shelf portions 2756, 2956 may alternatively be described as overhanging connection strips. An upper wall portion 2766, 2966 and a lower wall portion 2776, 2976 extend from the innermost parts of the shelf portions 2756, 2956. The upper wall portion 2766, 2966 extends vertically upward from the shelf portions 2756, 2956, and the lower wall portion 2776, 2976 extends vertically downward therefrom.

Figure 27A:
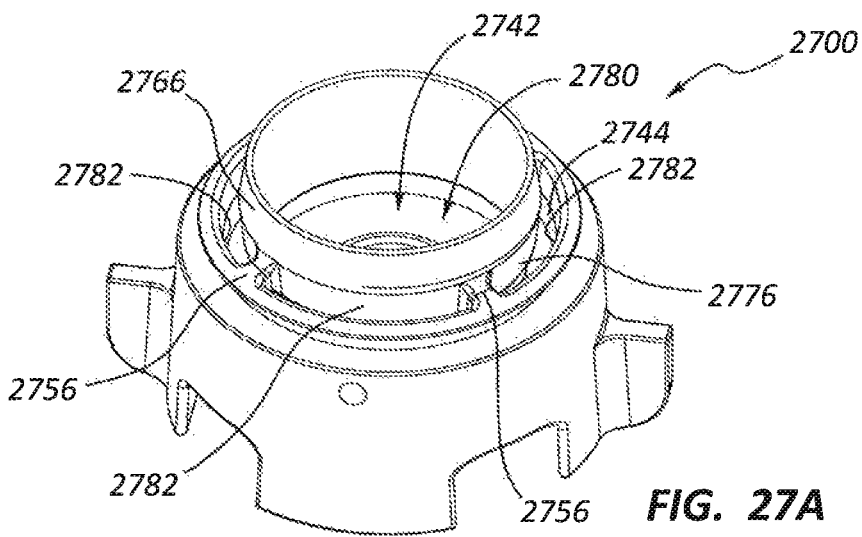
FIGS. 27A-27C show another embodiment of a blender adapter.
Figure 27B:
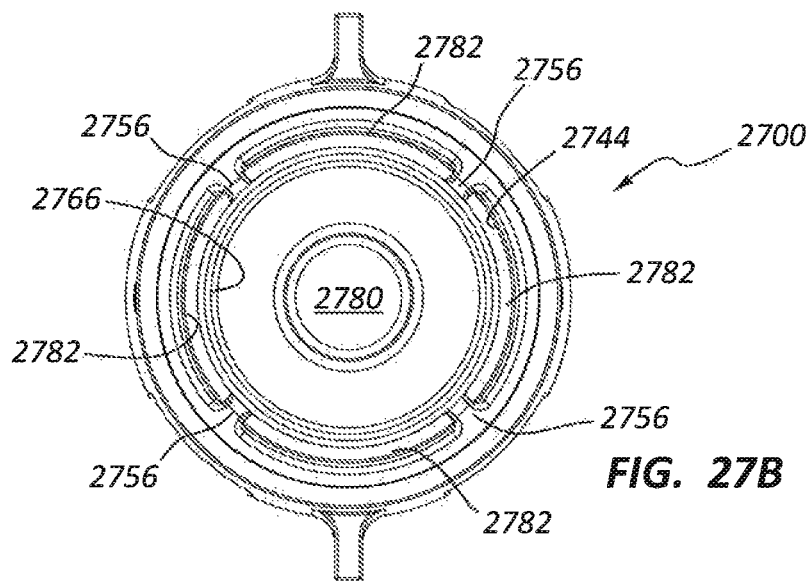
Figure 27C:
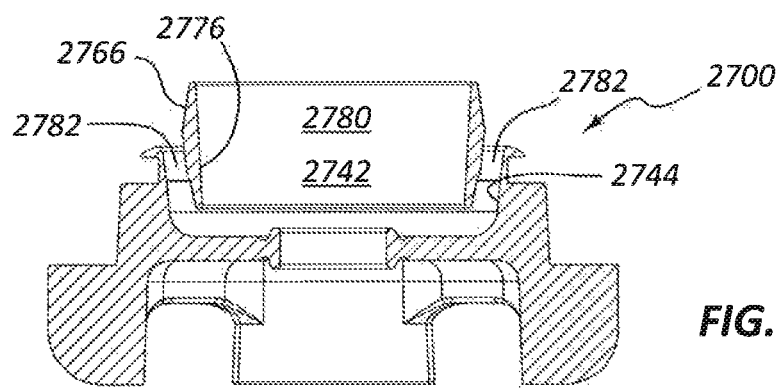

The upper wall portion 2766, 2966 may perform the functions of the wall portions described in connection with other embodiments herein. The lower wall portion 2776, 2966 may at least partially internally overlap with the sidewall 2744, 2944 of the internal chamber 2742, 2942. Thus, the internal chambers 2742, 2942 are divided by the wall portions 2776, 2976 (and/or 2766, 2966) into a central chamber 2780, 2980 and a plurality of vent passages 2782, 2982 that are radially external to the central chamber 2780, 2980. FIGS. 27C and 29C show these areas in cross-section. The vent passages 2782, 2982 are connected at their bottom ends to the central chamber 2780, 2980 and open vertically upward and outward relative to the base of the adapter 2700 at their top ends. The vent passages 2782, 2982 are configured to have their top openings open into the space (e.g., 180) within a disposable container placed over the adapter 2700, 2900. Thus, particles and material being blended may travel through the central chamber 2780, 2980 (e.g., along path F5 of FIG. 28) to the bottom of the chamber 2780, 2980 and then circulate back upward through the vent passages 2782, 2982 (e.g., along path F6 of FIG. 28) and return to the central chamber 2780, 2980. The vent passages 2782, 2982 may have an arc shape or circumferentially-extending shape.

Figure 28:
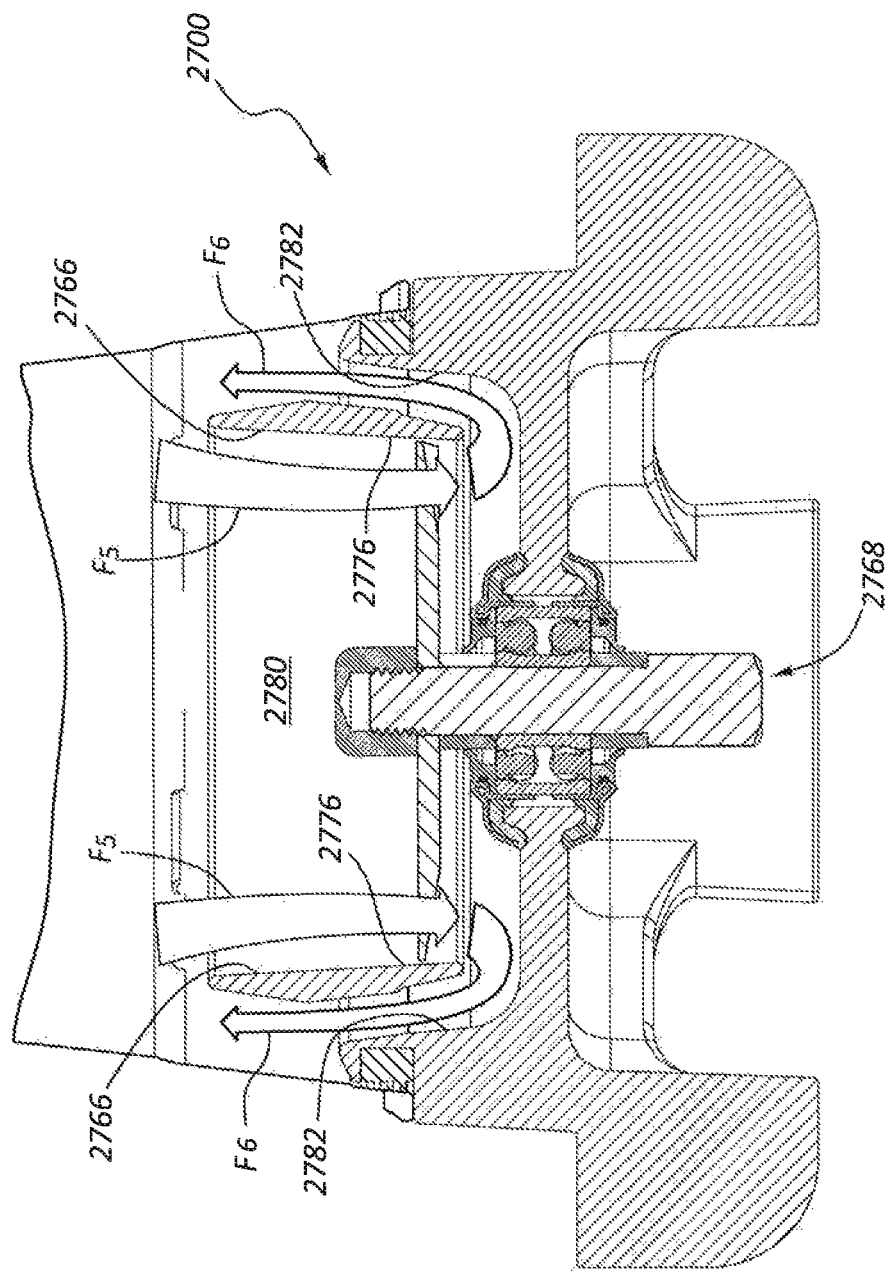
FIG. 28 shows a flow diagram of the embodiment of FIGS. 27A-27C.
Figure 29A:
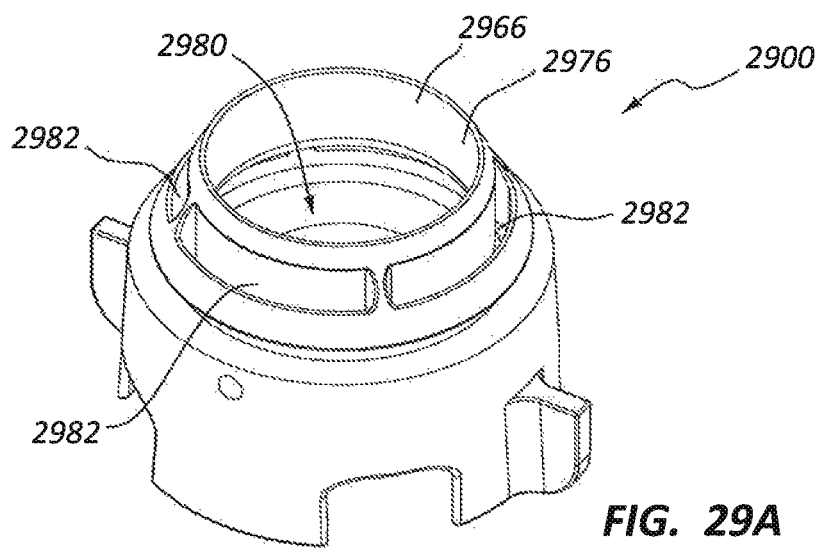
FIGS. 29A-29C show another embodiment of a blender adapter.
Figure 29B:
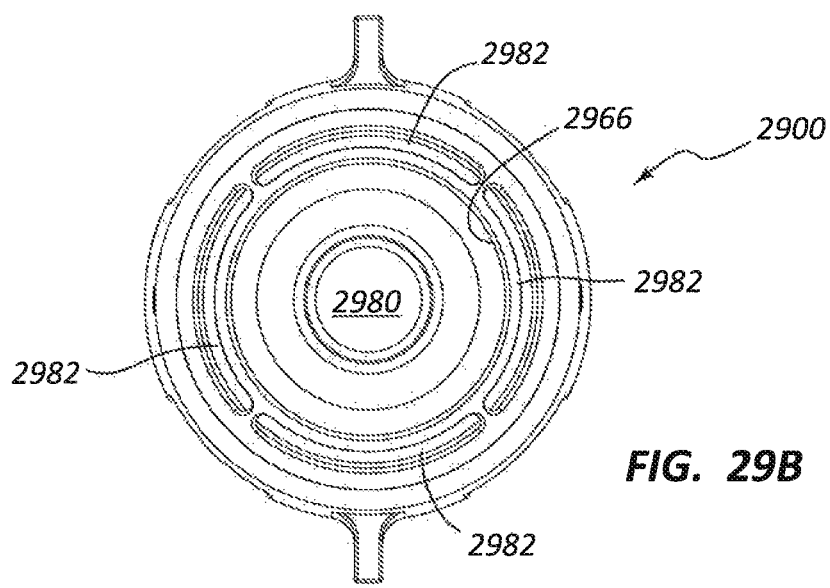
Figure 29C:
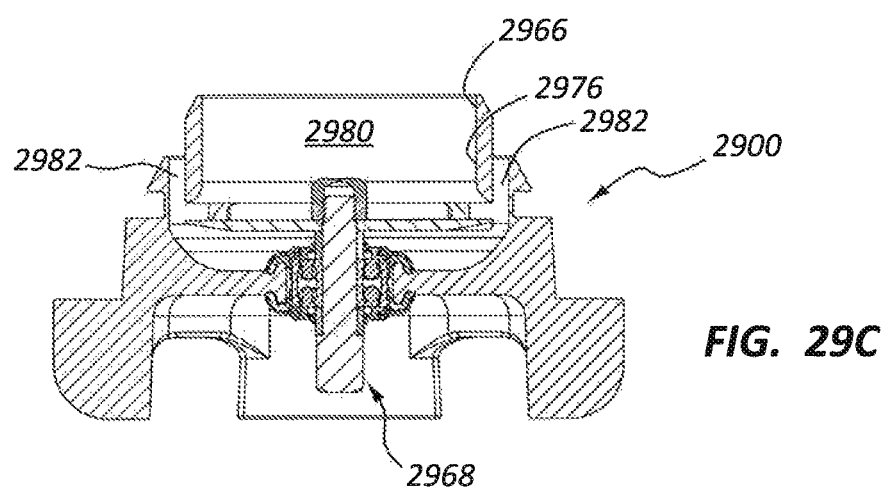

As shown in FIG. 28, a blending blade assembly 2768 may be positioned within the internal chamber 2742. The blade of the assembly 2768 may be positioned within the central chamber 2780 at a position radially internal to the lower wall portion 2776. Thus, the lower wall portion 2776 may form a "duct" around the blade similar to a duct used to direct flow into or away from a fan. The outer ends of the blade are adjacent to the wall portion 2776 so that material is inhibited from spilling off of the tips of the blade laterally outward. The blade is therefore separated from the internal sidewall 2744 of the chamber 2742 by the wall portion 2776. As the blade turns, the wall portion 2776 facilitates creation of a high pressure zone above the blade and a low pressure zone beneath the blade. This pressure differential helps to urge material past the blade along path F5. The accumulation of material underneath the blade, along with the pressure differential, helps to push material along path F6 out of the internal chamber 2742 and back into circulation in the disposable container. This feature may be useful when viscous mixtures are blended since the duct design and pressure zones may help to overcome the slurry's resistance to flow.

Adapter 2900 is configured to have a blending blade assembly 2968 that has a blade positioned beneath the lower wall portion 2976. See FIG. 29C. The blade may therefore rotate with the lower wall portion 2976 immediately adjacent to and above the blade. The lower wall portion 2976 may therefore also prevent material from spilling laterally off of the tips of the blade (e.g., by blocking flow in that direction just above the tips) and may create the high pressure zone and separate that zone from a low pressure zone passing through the vent passages 2982. The increased blade size and positioning of the blade near the vent passages 2982 may help break up material in the vent passages 2982 and inhibit accumulation of chunks or unblended material in the passages 2982.

Figure 30A:
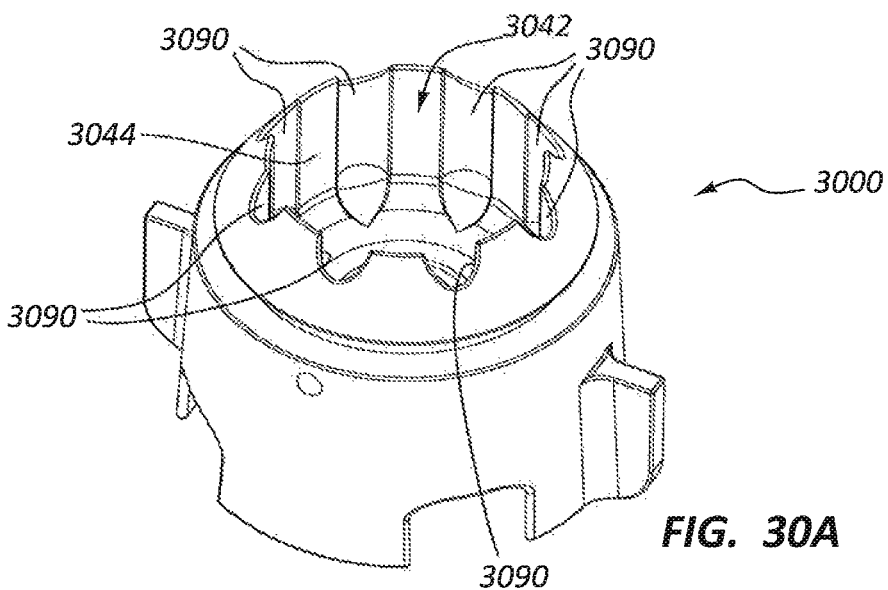
FIGS. 30A-30C show another embodiment of a blender adapter.
Figure 30B:
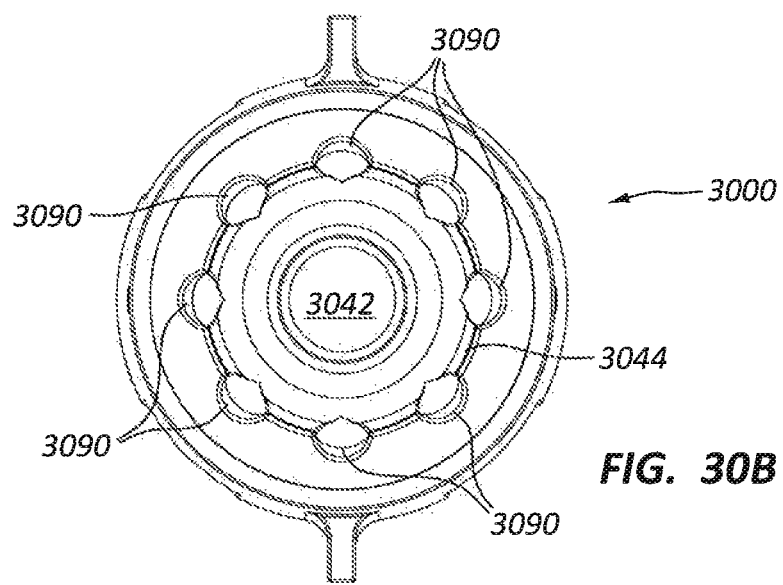
Figure 30C:
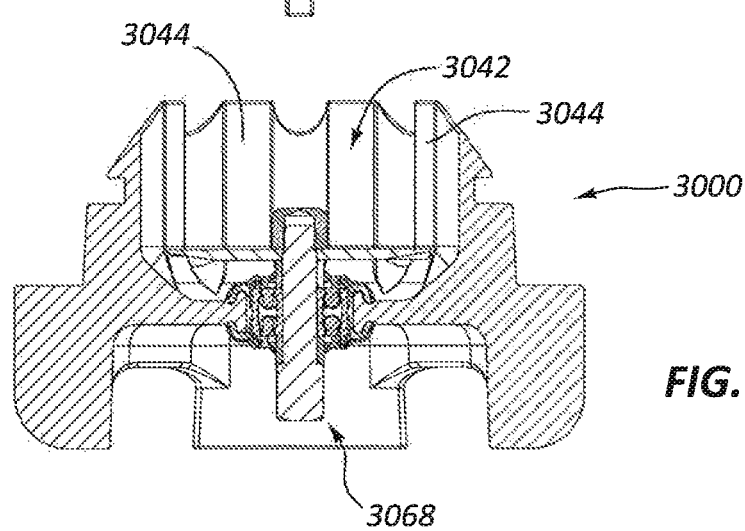
Figure 31A:
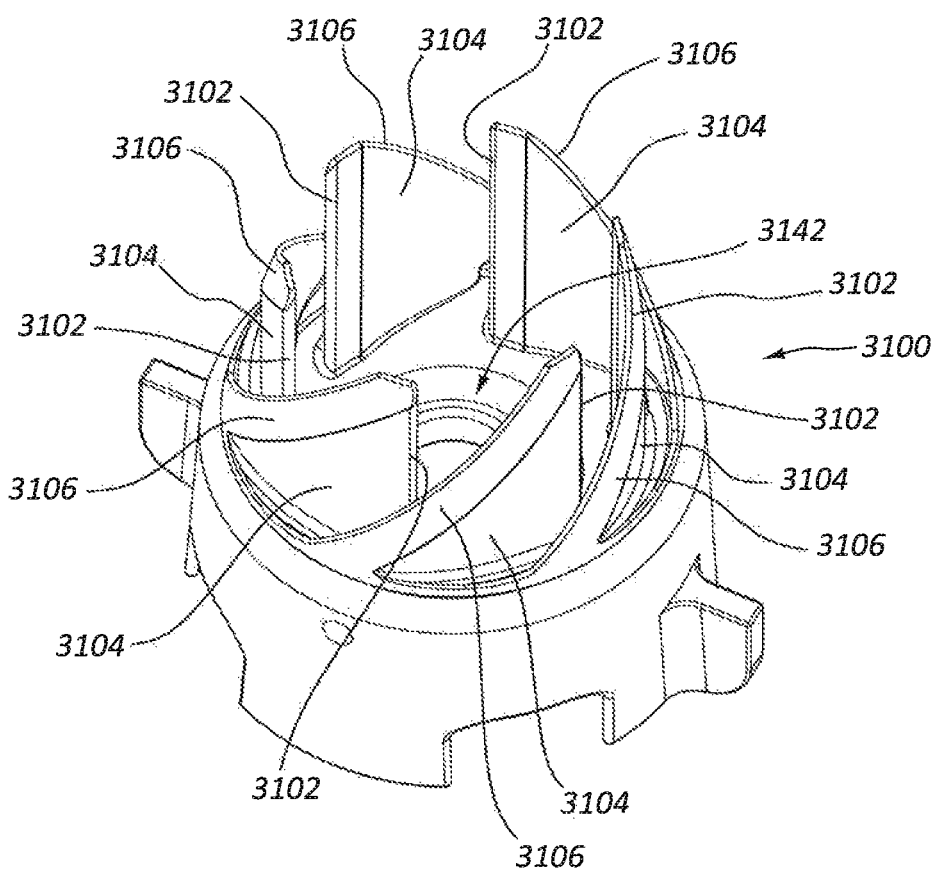
FIGS. 31A-31C show another embodiment of a blender adapter.
Figure 31B:
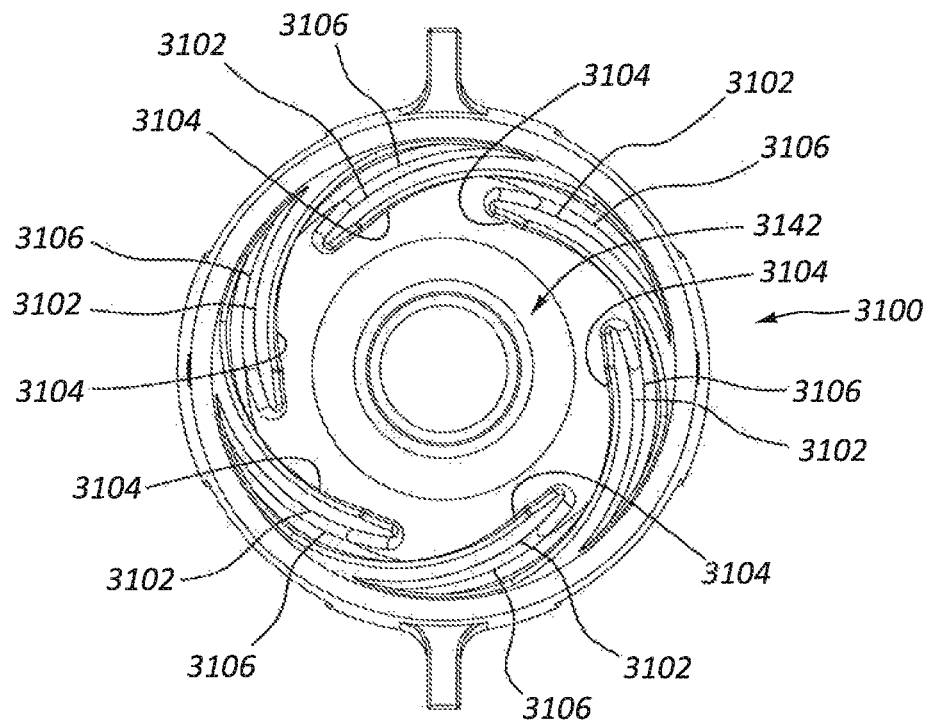
Figure 31C:
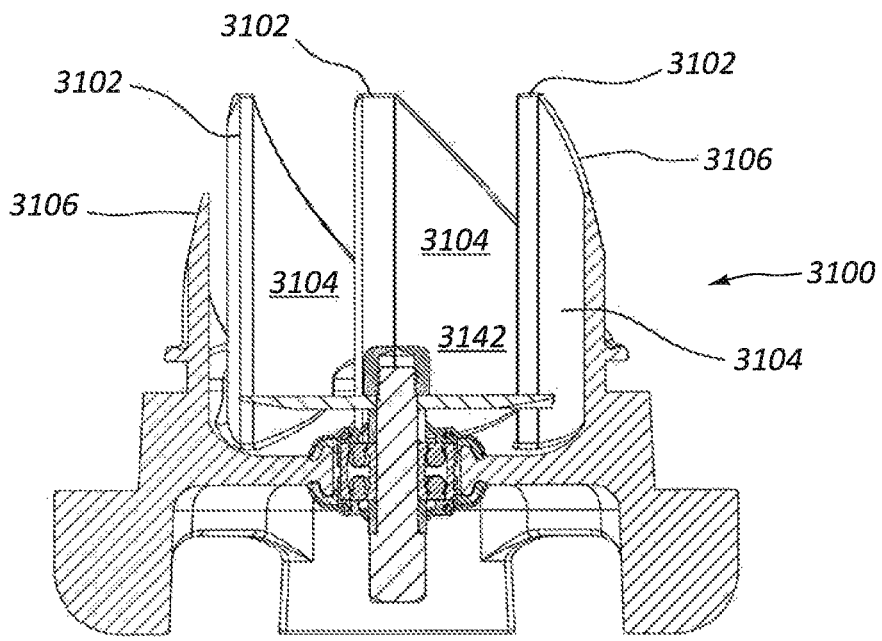
Figure 32A:
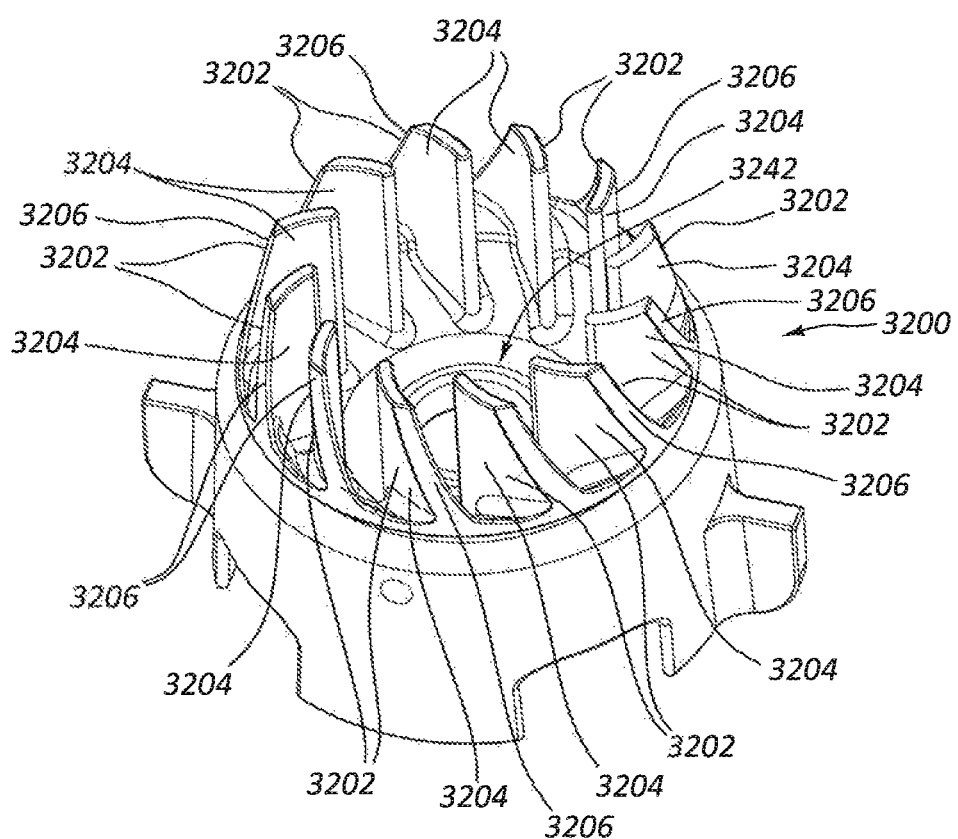
FIGS. 32A-32C show another embodiment of a blender adapter.
Figure 32B:
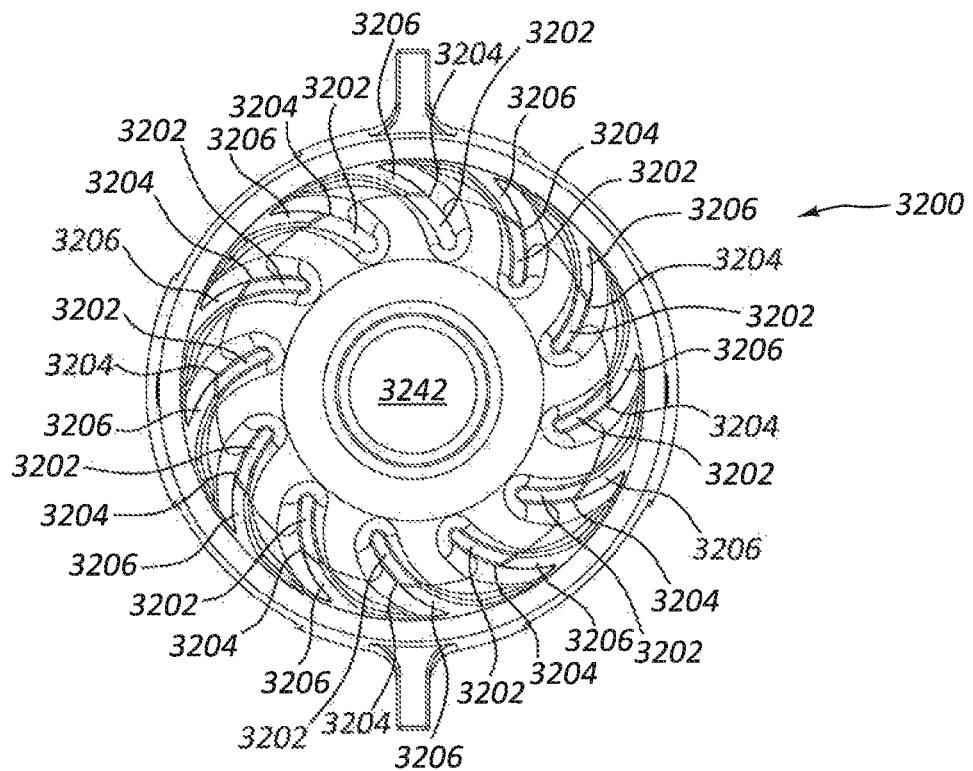
Figure 32C:
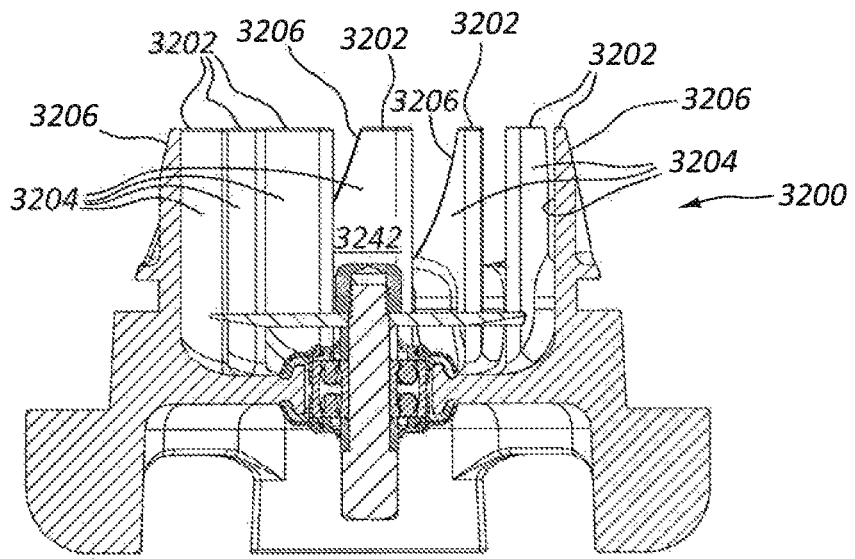

FIGS. 30A-30C show another blender adapter 3000 that may be used to blend material within a disposable container. A blending blade assembly 3068 may be positioned within an internal chamber 3042 of the adapter 3000 and may have a blade that turns internal to a sidewall 3044 of the adapter 3000. A plurality of channels 3090 are formed connected to the internal chamber 3042 and extend radially outward relative to the sidewall 3044. The channels 3090 are also radially internal to a gasket seat around the exterior of the adapter 3000. These channels 3090 may facilitate a flow of material that is drawn below the blade in a path that travels from below the blade laterally outward, upward, and back above and over the blade.

FIGS. 31A through 32C show additional embodiments of blender adapters 3100, 3200 for blending in a disposable container. The adapters 3100, 3200 comprise a central chamber 3142, 3242 in which a blending blade assembly may be positioned. A plurality of helical baffles 3102, 3202 surround the central chamber 3142, 3242 and extend vertically upward from the base of the adapters 3100, 3200. The baffles 3102, 3202 have vertical surfaces 3104, 3204 and contoured surfaces 3106, 3206. The contoured surfaces 3106, 3206 may be positioned at an outer periphery of each of the baffles 3102, 3202 and may be configured and shaped to contact the inner surface of the disposable container at spaced apart locations. Thus, the contoured surfaces 3106, 3206 are at least partially parallel to the inner surfaces of the disposable container. The spaces between the baffles 3102, 3202 are helical in shape as well. In this manner, material deflected from the blending blade assembly in a lateral and radially outward direction cannot directly impact the inner surface of the disposable container unless it passes in a circumferential direction through the baffles 3102, 3202 as well. There are no "shelf" portions or other elements overhanging over the spaces between the baffles 3102, 3202, so the spaces may be easier to clean, construct, and maintain.

The baffles 3102 of adapter 3100 are taller, less numerous, and further spaced apart than the baffles 3202 of adapter 3200. Thus, adapter 3100 may therefore be better suited for blending thicker or chunkier material than adapter 3200. Adapter 3100 may also provide improved protection of the midsection of the sidewall of the disposable container as compared to adapter 3200.

Figure 33A:
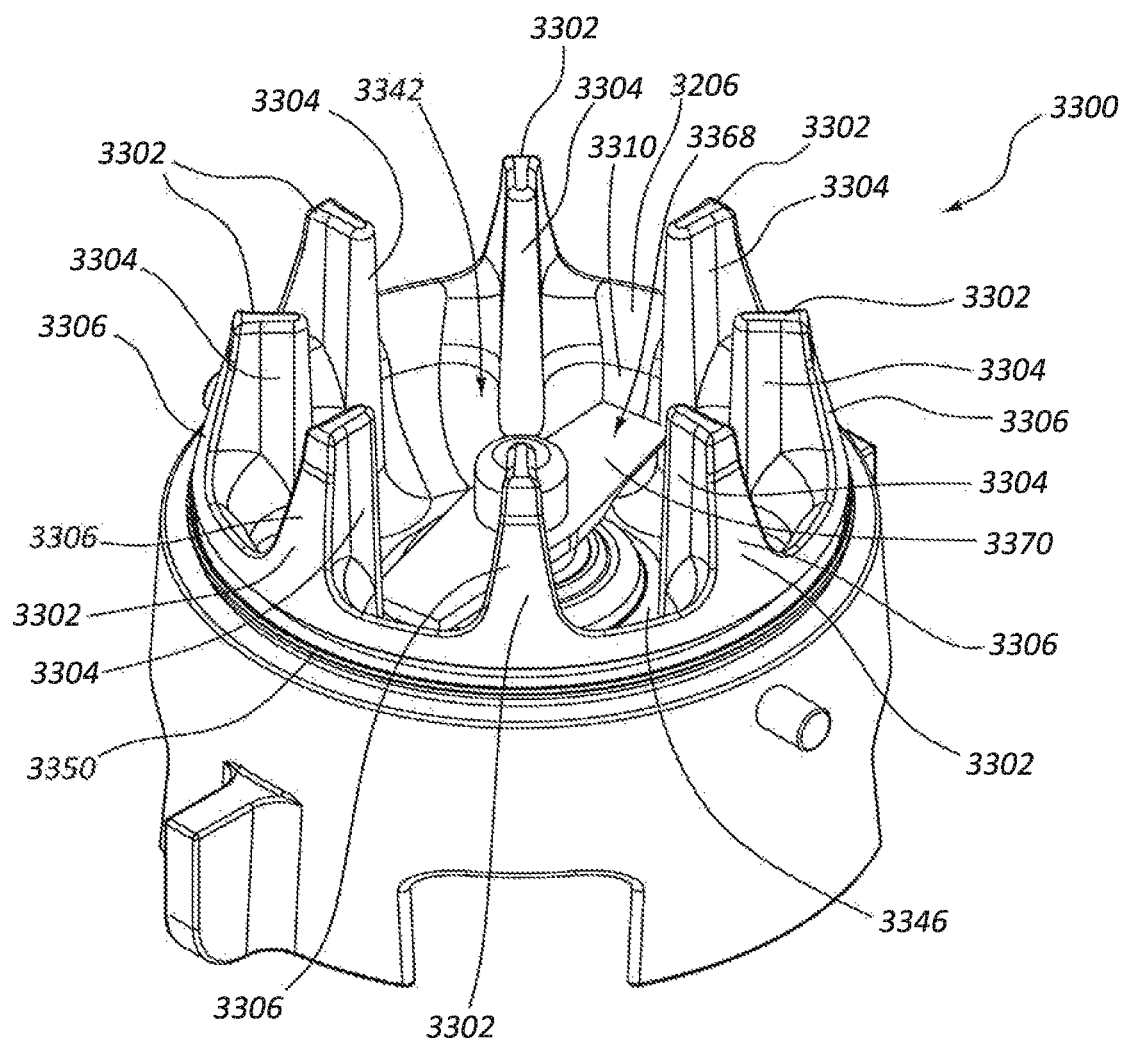
FIGS. 33A-33C show another embodiment of a blender adapter.
Figure 33B:
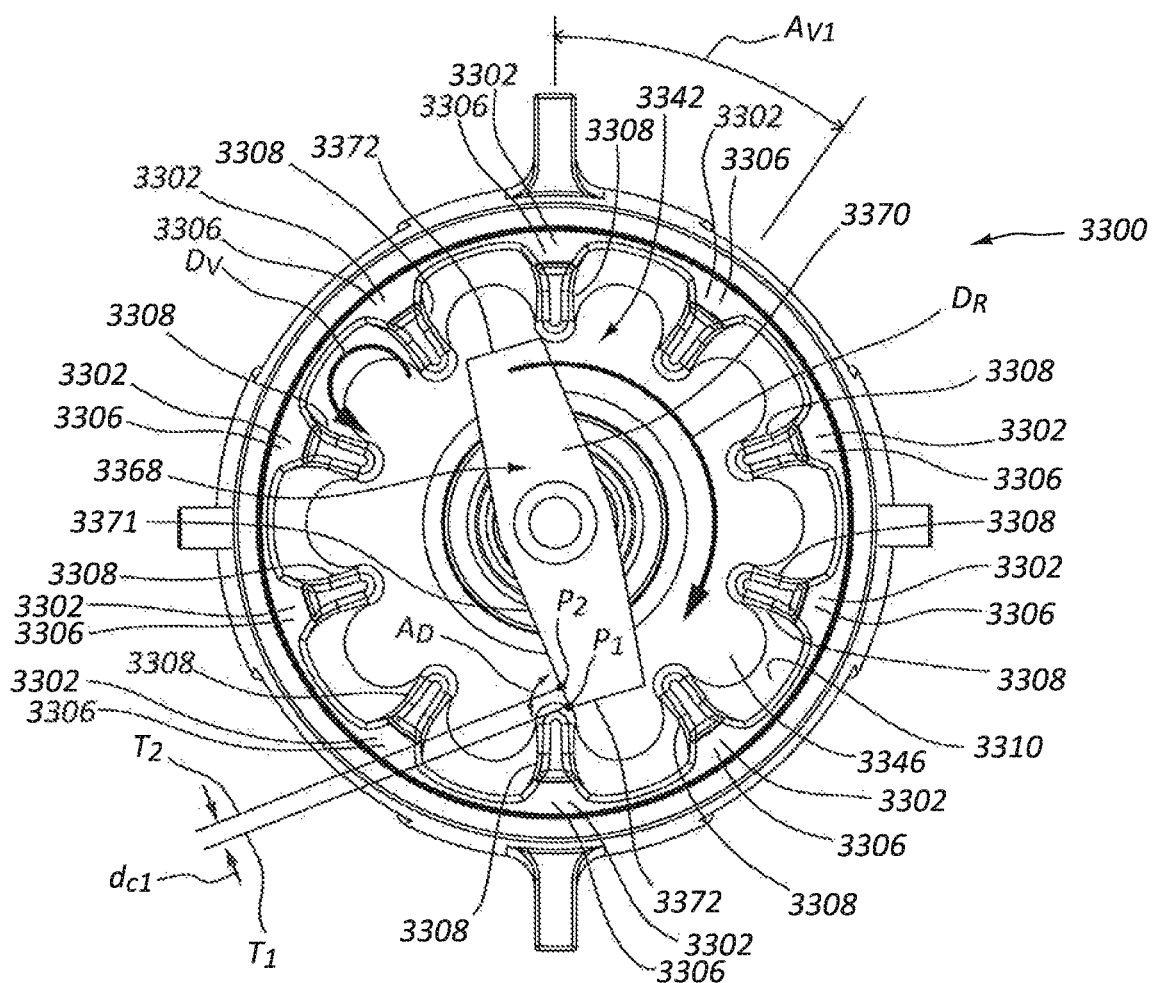
Figure 33C:
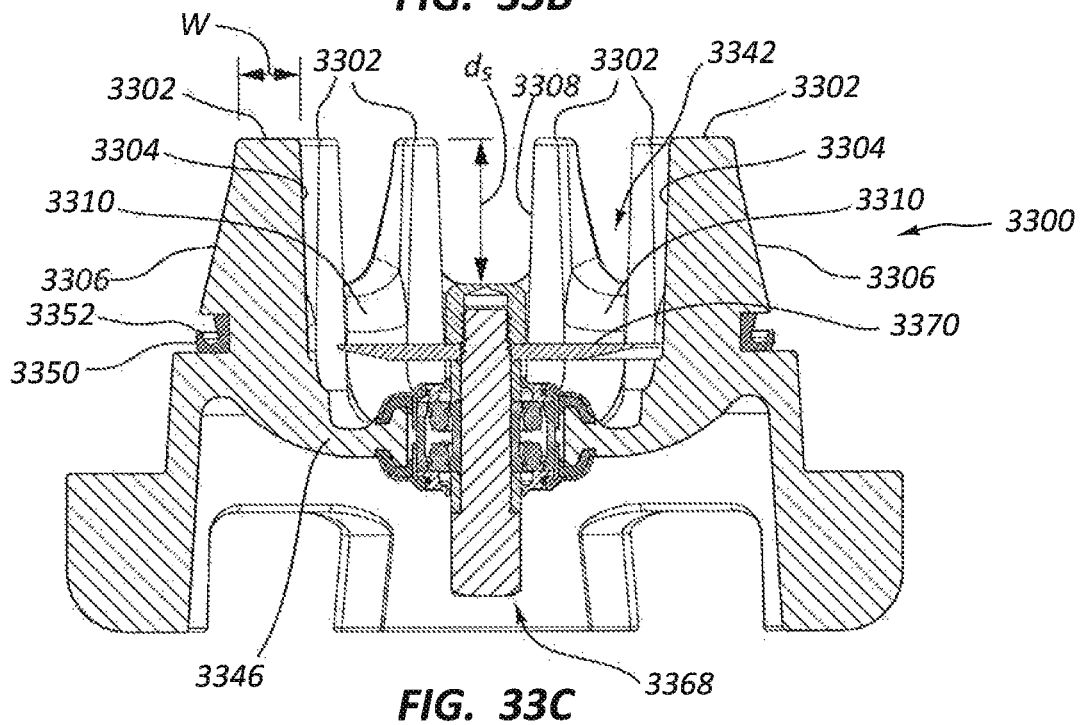
Figure 34:
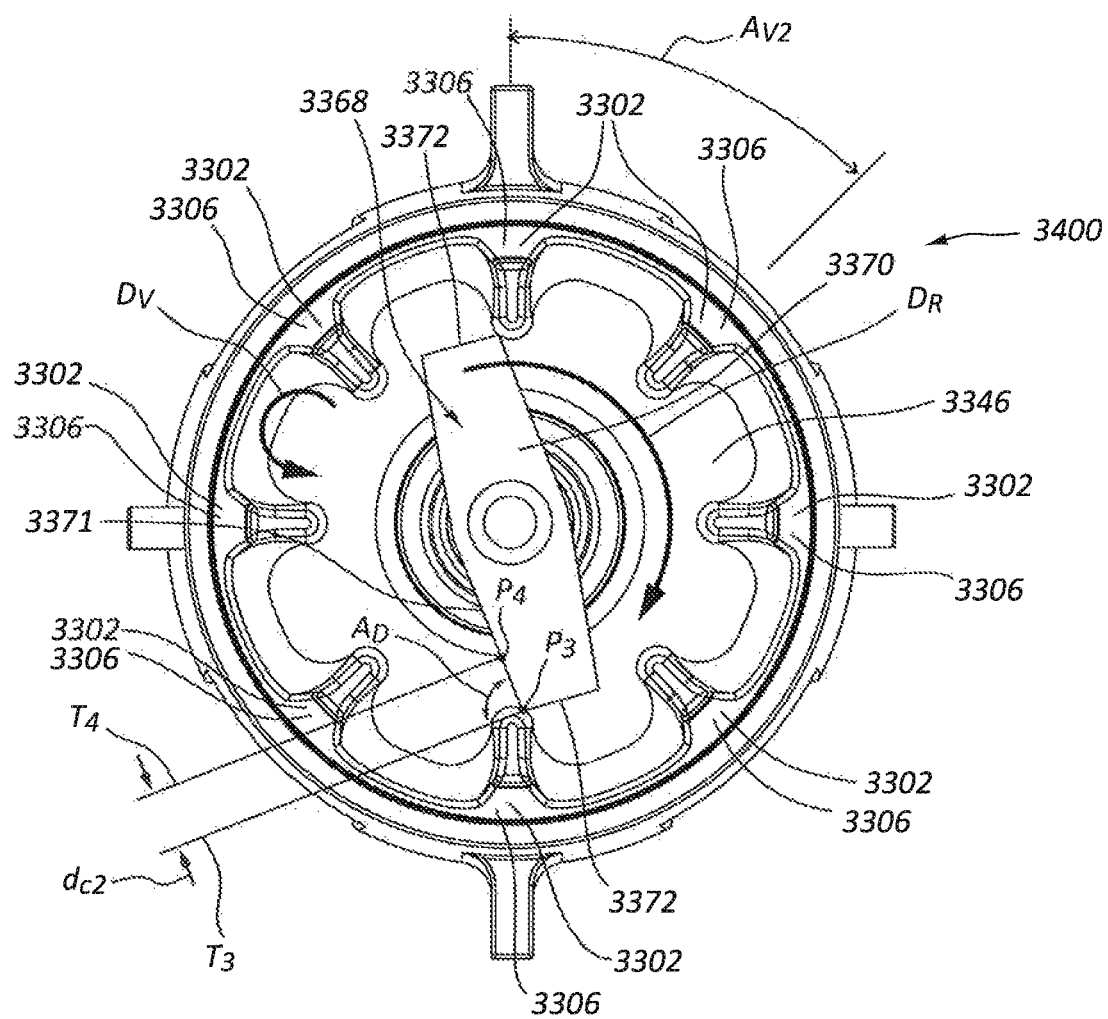
FIG. 34 shows a top view of another embodiment of a blender adapter.

FIGS. 33A-34 show additional embodiments of blender adapters 3300, 3400. The adapters 3300, 3400 comprise a plurality of vertical vanes 3302 extending upward relative to the bottom wall 3346 of the adapters 3300, 3400. The vanes 3302 have free upper ends. The vanes 3302 have internal surfaces 3304 and external surfaces 3306. The external surfaces 3306 are configured to contact the inside surface of a disposable container and to have a shape that follows the shape of the inside surface so that the cup is stabilized when placed over the external surfaces 3306. The internal surfaces 3304 are generally vertically oriented and configured to be evenly spaced apart in a circle around a blade assembly 3368. Thus, a generally cylindrical internal space 3342 is formed within the vanes 3302 that extends vertically upward from the blade assembly 3368.

A gasket 3350 extends circumferentially around the exterior of the adapters 3300, 3400. The gasket 3350 may have a lip 3352 configured to flex inward when a disposable container is mounted to the adapter 3300, 3400. Thus, the gasket 3350 may curl inward toward itself when sealing the container.

The bottom end of the internal space 3342 holds the blade assembly 3368. The vanes 3302 are spaced apart from each other, and the spaces 3308 between the vanes 3302 may have a vertical depth dS that does not extend to the plane of the blade. As shown in FIG. 33C, one of the spaces 3308 has a depth dS that terminates at the top of the blade assembly 3368 and above the surface of the blade 3370. A sidewall 3310 of the lower end of the internal space 3342 may be positioned between the cup and the blade 3370 (or between the exterior of the adapter 3300 and the blade 3370). The lower portions of the internal surfaces 3304 may jut inward from the sidewall 3310 and form part of the internal surface around the blade assembly 3368. See FIGS. 33A, 33B.

As the blade 3370 turns in the adapter 3300, 3400, as shown in FIGS. 33B and 34, the tips 3372 of the blade 3370 may spin adjacent and internal to the innermost surfaces of the lower portions of the vanes 3302. Movement of the blade 3370 may induce flow of material in the adapters 3300, 3400 in the direction of rotation DR of the blade. This also incidentally may induce vortices between the vanes 3302 which turn in the opposite direction (e.g., DV). The movement of material thus causes turbulence throughout the internal space 3342 and the spaces between the vanes 3302. The turbulence and vortices accelerate material in the adapter 3300, 3400 and thereby help circulate the material around the interior of the adapter 3300, 3400 for thorough mixing and shearing by the blade 3370.

As the blade 3370 turns, material being blended may be deflected outward at high velocity. Because there are spaces 3308 between the vanes 3302, some of this material may be deflected outward directly from the blade 3370 and into contact with the inner surface of the disposable container without contacting a vane 3302 or the sidewall 3310. The sidewall 3310 and vanes 3302 absorb impacts of many particles, but material is still deflected upward and over the sidewall 3310 to positions where the disposable container is exposed. When these "escaping particles" have a certain size, shape, and mass, they may put enough strain on the disposable container to cause breakages of the container, leading to a failed blend. Accordingly, the vanes 3302 may be configured with dimensions and positions that minimize the size of the escaping particles. In some embodiments, the dimensions and positions of the vanes 3302 may be defined as a function of the radial width W of the vanes 3302 (see FIG. 33C), the depth dS of the spaces 3308 (see FIG. 33C), and the angle AV1, AV2 between the vanes 3302 (see FIGS. 33B, 34). These dimensions and positions may be preferably made to cause interference with moving particles that are larger than a predetermined size when those particles are deflected from the blade 3370 at a predetermined range of angles. The angle at which the particle is deflected may be defined as a deflection angle AD, examples of which are shown in FIGS. 33B and 34. In one embodiment, the range of angles may comprise a 90-degree angle since the particles have the highest velocity when deflected from that angle.

With reference to FIGS. 33B and 34, particle trajectory T1 illustrates an example of a trajectory of a particle that is accelerated away from the blade 3370 from point P1. Particle trajectories T2, T3, and T4 are similar trajectories starting at points P2, P3, and P4, respectively. Points P1 and P2 are separated by a clearance distance dc1, and points P3 and P4 are spaced apart by clearance distance dc2. As the blade 3370 rotates, these trajectories T1, T2, T3, and T4 each remain defined at angle AD relative to the leading surface 3371 of the blade 3370. Thus, the trajectories may turn with the blade around the axis of the blending blade assembly 3368.

When the blade 3370 reaches certain rotated positions, including the positions shown in FIGS. 33B and 34, each pair of trajectories T1, T2 and T3, T4 extend in parallel away from their respective points P1, P2, P3, and P4 on the blade 3370 and into contact with the inner surface of the disposable container without contacting the vanes 3302. The clearance distances dc1, dc2 are the maximum distances that the pairs of points P1/P2 and P3/P4 can be separated from each other on the leading edge 3371 while still being able to simultaneously extend into contact with the inner surface of the disposable container. Therefore, at the above-mentioned rotated positions, if the blade 3370 is rotated slightly counterclockwise, trajectory T1 or T3 would impact an inner surface of a first adjacent vane 3302, and if the blade 3370 is rotated slightly clockwise at those rotated positions, trajectory T2 or T4 would impact the side of a second adjacent vane 3302 that is positioned clockwise relative to the first adjacent vane.

Because dc1 and dc2 are the maximum distances between which two trajectories can impinge on the disposable container when deflected from the blade 3370 at angle AD, the vanes 3302 may be positioned and dimensioned to provide a specific maximum clearance distance that limits particles of a certain size from impinging the inside of the disposable container. For example, the adapter 3300 may be designed with a clearance distance dc1 that is equal to the maximum diameter of a spherical chunk of ice (or other blended material) allowed to hit the inside of a cup after being deflected directly from the blade 3370 (i.e., not being deflected into contact with a vane 3302 or sidewall 3310).

The material may, however, pass through other material being blended. Any chunk of ice having a diameter larger than that clearance distance will hit one of the adjacent vanes 3302 when deflected from the blade 3370, and any chunk of ice having a diameter equal to the clearance distance would only hit the disposable container without hitting one of the adjacent vanes if it is deflected by the blade 3370 from the exact midpoint between points P1 and P2. Otherwise, its diameter would cause it to hit a vane 3302.

By limiting the size of material can clear and pass through the vanes 3302 from the blade 3370 unhindered, the adapter 3300 may prevent container breakages that correlate with certain material sizes being blended. In one embodiment, the clearance distance is about 10 millimeters or less, and in another embodiment the clearance distance is about 3 millimeters or less. A 10-millimeter clearance distance correlates with distance dc2, and a 3-millimeter clearance distance correlates with distance dc1. The 3-millimeter distance has been empirically shown to prevent breakages of a common 16-ounce plastic SOLO® cup when used with adapter 3300 when ice and other frozen materials are blended in the adapter 3300. Clearance distances dc1 and dc2 have different lengths due to the spacing of angles AV1 and AV2, and not because of differences between the widths W of the vanes 3302 in each adapter 3300, 3400. However, in some arrangements, the widths W of the vanes 3302 may also be designed to provide a predetermined clearance distance.

Figure 35:
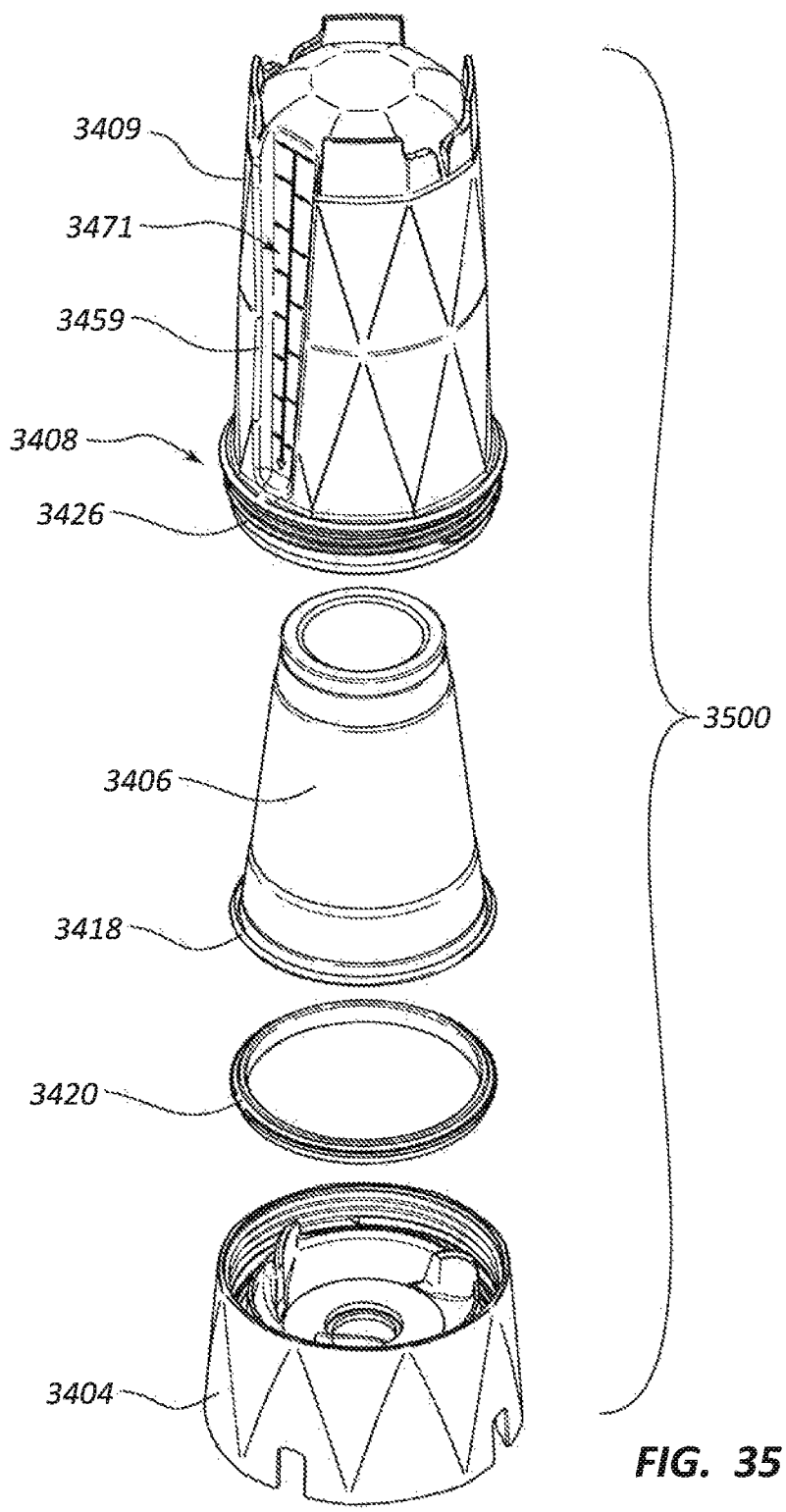
FIG. 35 is an exploded perspective view of another embodiment of a blending apparatus.

FIG. 35 depicts an embodiment of a blending system or blending apparatus 3500. The blending apparatus 3500 is configured for use with a blending base, such as the blending base 102 discussed above. The blending apparatus 3500 includes a blender adapter 3404 that interfaces with the blending base, a sealing member 3420, and a locking collar 3408. A reusable container 3409 includes the locking collar 3408 at an end thereof. In some instances, the blending apparatus 3500 includes a disposable liner 3406, such as a disposable cup, as described above. As further discussed hereafter, the blending apparatus 3500 can have multiple operational states. In one operational state, which may be referred to as a direct blending mode, the blending apparatus 3500 can blend a product, such as a food product, directly in the reusable container 3409, in the absence of any liner. In another operational state, which may be referred to as a lined blending mode, the blending apparatus 3500 can blend the product in the disposable liner 3406. In some instances, in this state, the liner 3406 can prevent the blended product from dirtying the reusable container 3409.

The blending apparatus 3500 and individual features thereof can function in the same manner, or much the same manner, as the apparatuses discussed previously. Any suitable combination of the features described above with respect to such apparatuses may be used with the blending apparatus 3500, and vice versa. The present discussion is directed features of the blending apparatus 3500 that may differ from certain of the foregoing embodiments, or that may have been described in different terms.

Figure 36A:
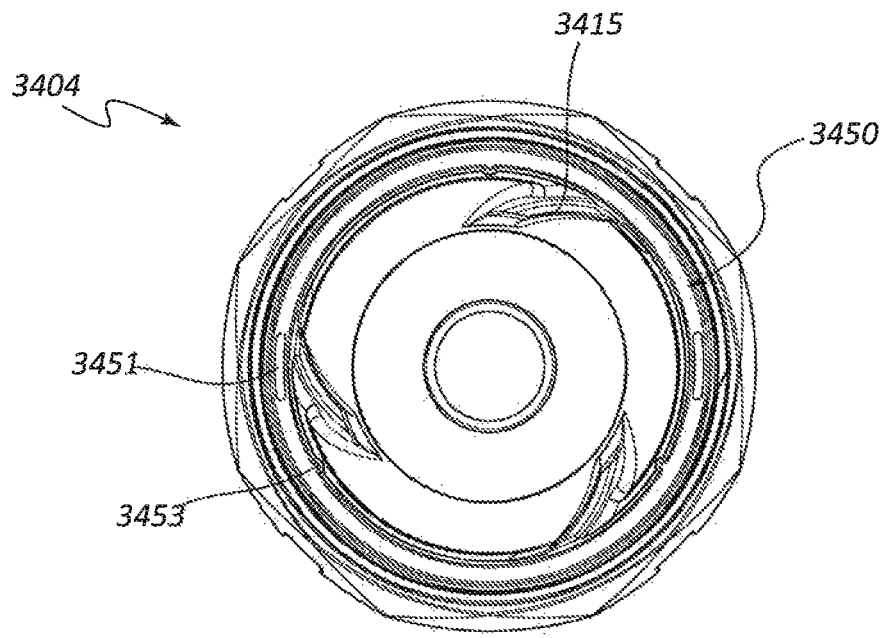
FIG. 36A is a top plan view of an embodiment of a blender adapter that is compatible with the blending apparatuses disclosed herein, including the blending apparatus of FIG. 35.
Figure 36B:
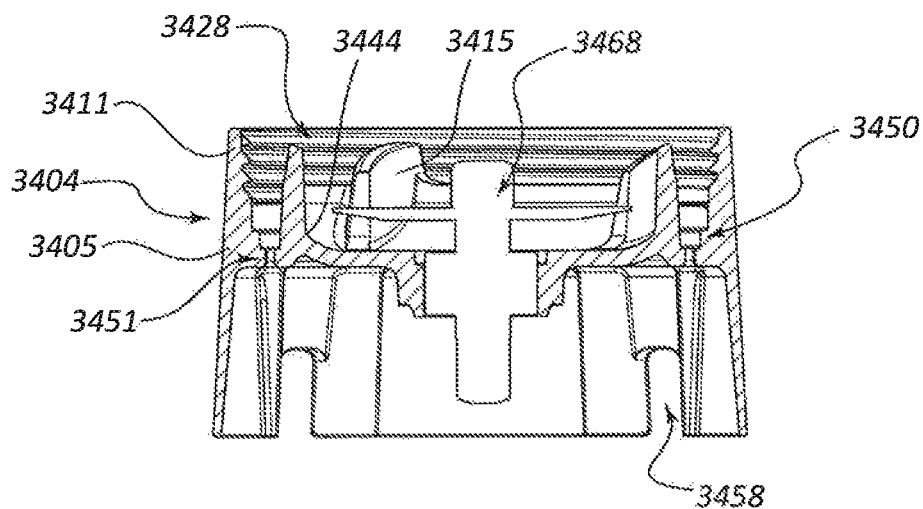
FIG. 36B is a cross-sectional view of the blender adapter of FIG. 36A taken along the view line 36B-36B in FIG. 36A.
Figure 36C:
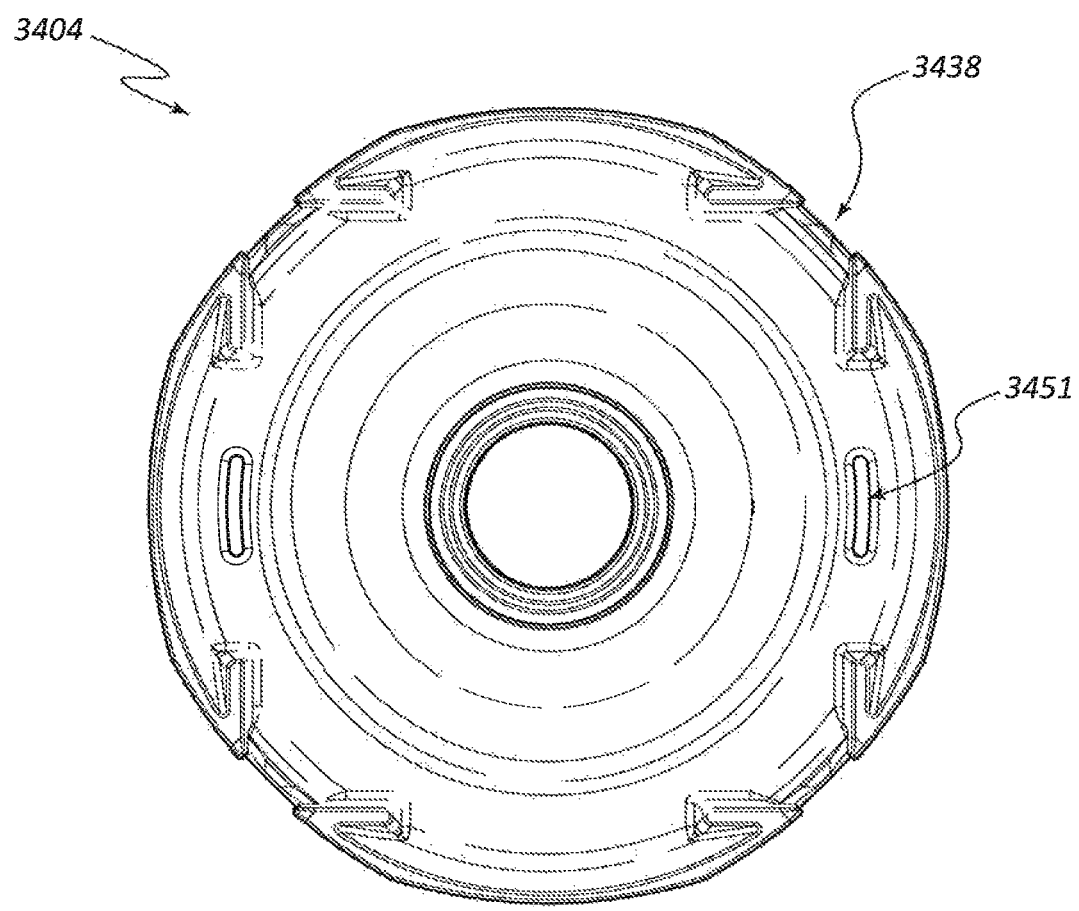
FIG. 36C is a bottom plan view of the blender adapter of FIG. 36A.

With reference to FIGS. 36B, and 36C, the blender adapter 3404 defines a plurality of mounting features 3438 that can be advantageous in mounting the blender adapter 3404 to the blender base (e.g., such as the blender base 102). For example, in some embodiments, the blender base may have a square configuration, and the corners of the squares can extend through the mounting features 3438, which in the illustrated embodiment, are windows or openings. Interaction of these windows with the corners of the square base can resist rotation of the blender adapter 3404 relative to the blender base.

With reference to FIG. 36B, the blender adapter 3404 can be formed of a housing element 3405, which can be a unitary piece of material, as illustrated, or may comprise any suitable number of connected components. The blender adapter 3404 can include an outer or external sidewall 3411 that defines a connection interface 3428 for coupling the blender adapter 3404 to the container 3409. In the illustrated embodiment, the connection interface 3428 comprises internal threading.

The blender adapter 3404 can include an inner or internal sidewall 3444 that is configured to direct a flow of blended material in the vicinity of a blending blade assembly 3468 (such as the blending blade assembly 168). The blending blade assembly 3468 is shown in minimal detail in FIG. 36B for reference, and is omitted from other views to avoid obstructing other features. The sidewall can include an upward slope, in a radially outward direction. This slope can serve to redirect portions of a product that is undergoing blending, such as a food product, that travel radially outwardly from the blade assembly 3468. This redirection can reduce an angle of impingement of the redirected product on a sidewall of either the liner 3406 or the container 3409, depending on the operational state of the blending apparatus 3500. For example, high velocity particles slung from the blending blade assembly 3468 in a primarily radially outward direction can be deflected upward, such that an angle of impact against the sidewall of the liner 3406 or the container 3409 is less direct and more glancing. This may contribute to the ability of the blending apparatus 3500 to effect efficient blending in a relatively flimsy liner 3406, or stated otherwise, can assist in preserving the integrity of the liner 3406 during blending.

With reference to FIGS. 36A and 36B, the blender adapter 3404 can include one or more stators 3415. In the illustrated embodiment, the stators 3415 are positioned between a blade portion of the blade assembly 3468 and the container 3409 when the container 3409 is coupled with the adapter 3404. The stators 3415 can direct flow of the product during blending thereof. A wide variety of configurations are contemplated for the stators 3415. For example, an orientation, size (e.g., height, width, length) spacing, number, and/or other property of the stators 3415 can be selected to achieve a desired flow pattern within the container 3409 or the liner 3406, depending on the operational mode of the apparatus 3500. Such properties can be adjusted as desired to effect efficient blending and/or preservation of the integrity of the liner 3406. In the illustrated embodiment, the blender adapter 3404 includes three substantially helical or curved stators 3415 that are disposed at equiangular intervals about an axis of rotation of the blade assembly 3468. As can be seen in FIGS. 36A and 36B, the illustrated embodiment, moving radially outwardly, each stator 3415 commences at a wedge-shaped end and increases in height and thickness. The wedge-shaped inner end is slightly taller than the inner sidewall 3444. The outer end of each stator 3415 extends above inner sidewall 3444 by a distance of about ½ the height of the sidewall. Other suitable configurations are contemplated.

Figure 38A:
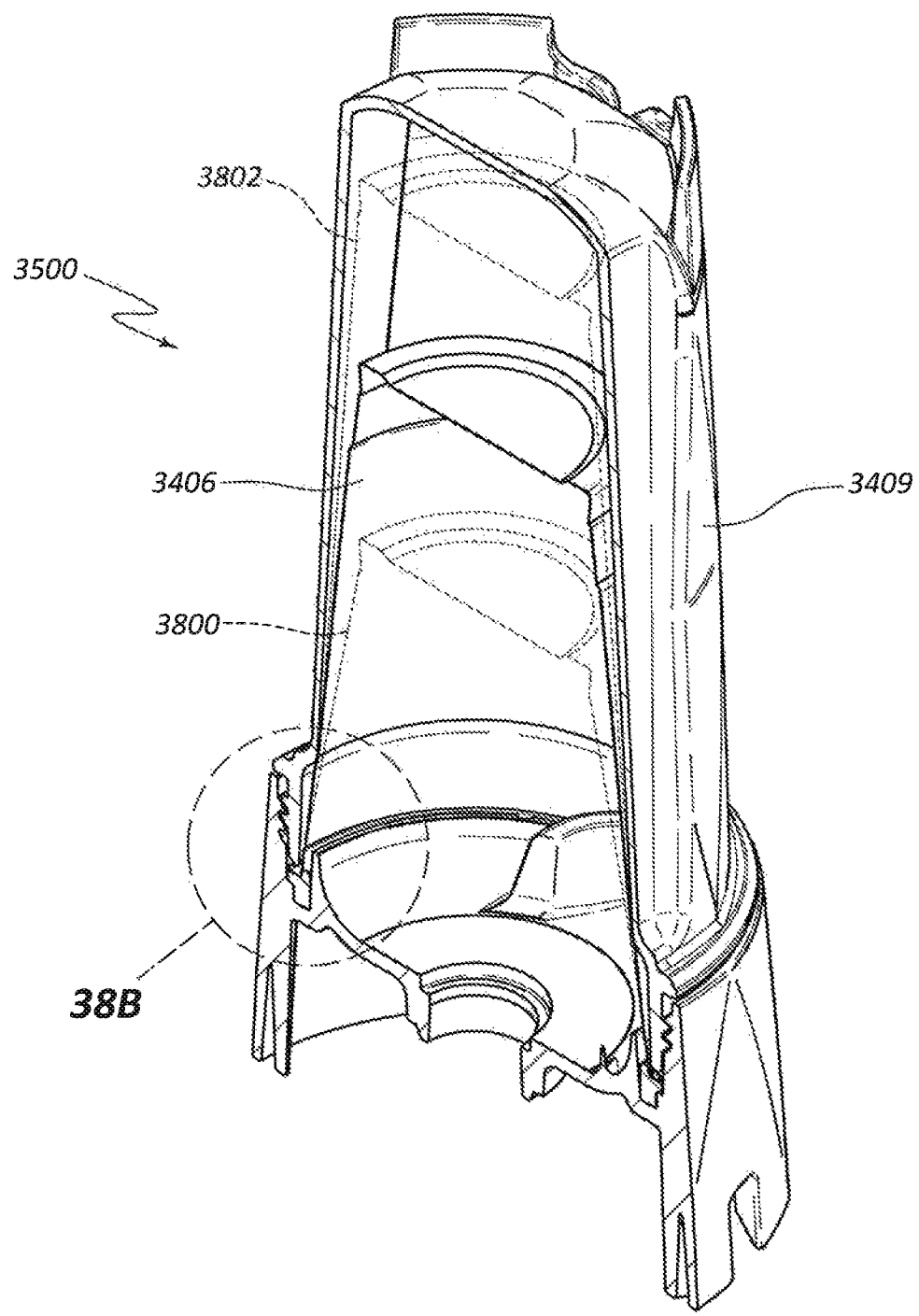
FIG. 38A is a cross-sectional perspective view of the blending apparatus of FIG. 35 in an operational state in which a container and a liner are coupled with the blender adapter.
Figure 38B:
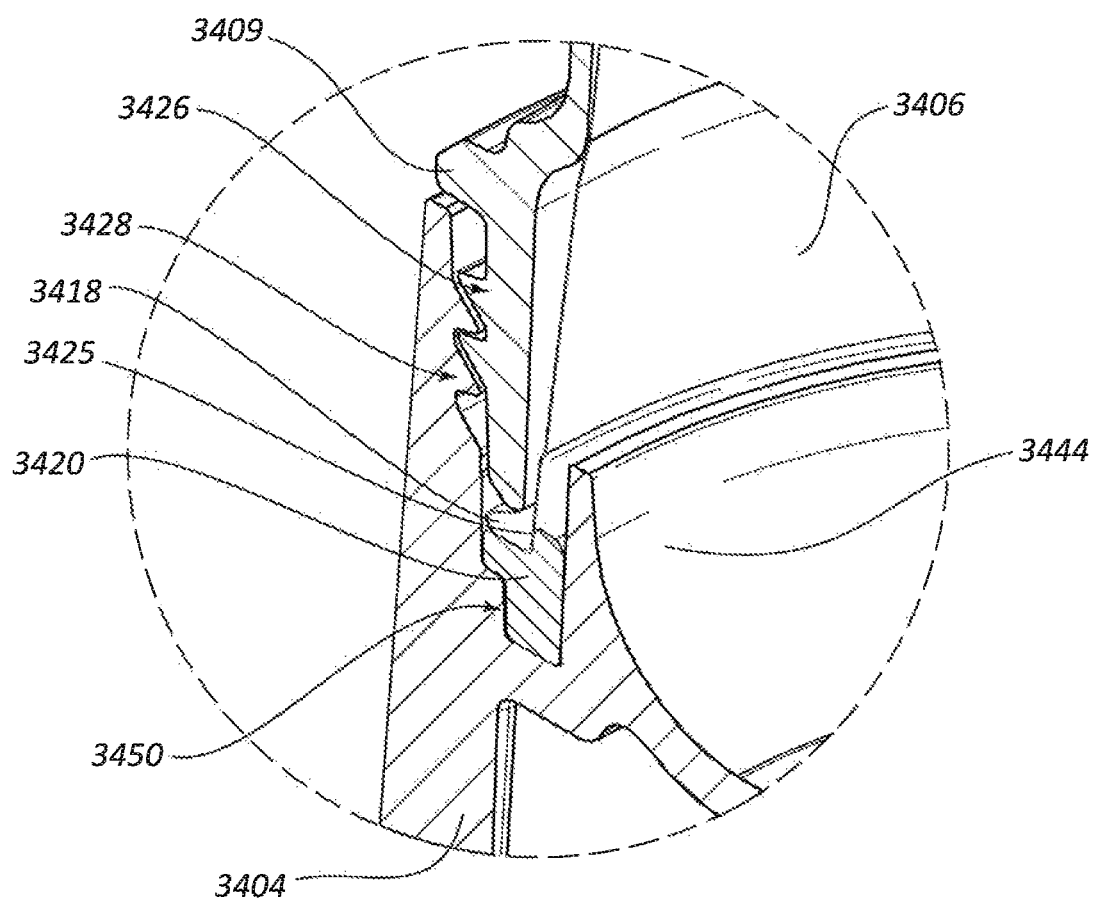
FIG. 38B is an enlarged cross-sectional perspective view such as that of FIG. 38A of the region within the view line 38B in FIG. 38A.

With reference to FIGS. 36A, 36B, and 38B, the blender adapter 3404 can define a seat 3450 for receiving the sealing member 3420. In the illustrated embodiment, the seat 3450 is a upwardly directed, substantially U-shaped channel that fully encompasses the sidewall 3444. As shown in FIGS. 36A and 36B, in the illustrated embodiment, the seat 3450 includes a pair of disengagement ports 3451, which are elongated openings through which an object (e.g., a knife) can be inserted into contact with the sealing member 3420 to force the sealing member 3420 away from the housing element 3405. For example, it may be desirable to clean the sealing member 3420 and/or the seat 3450. The sealing member 3420 may become firmly lodged or otherwise stuck within the seat 3450, and thus disengagement ports 3451 can facilitate removal of the sealing member 3420 without inadvertent damage to the sidewalls of the seat 3450 (such as via prying or otherwise attempting to engage the sealing member 3420 from above).

With reference to FIG. 36A, the blender adapter 3404 can include one or more pressure-relief vents 3453. The illustrated vents 3453 are formed as notches or channels in the external surface of the sidewall 3444 and extend downwardly to a base of the seat 3450. The vents 3453 permit air to move past the sealing member 3420 when the container 3409 and/or the liner 3406 are removed from the blender adapter 3404 after a blending event. This can release a vacuum that might otherwise tightly hold the container 3409 and/or the liner 3406 against the sealing member 3420. Stated otherwise, the vents 3453 can permit ready release of the container 3409 and/or the liner 3406 from the sealing member 3420.

Figure 37:
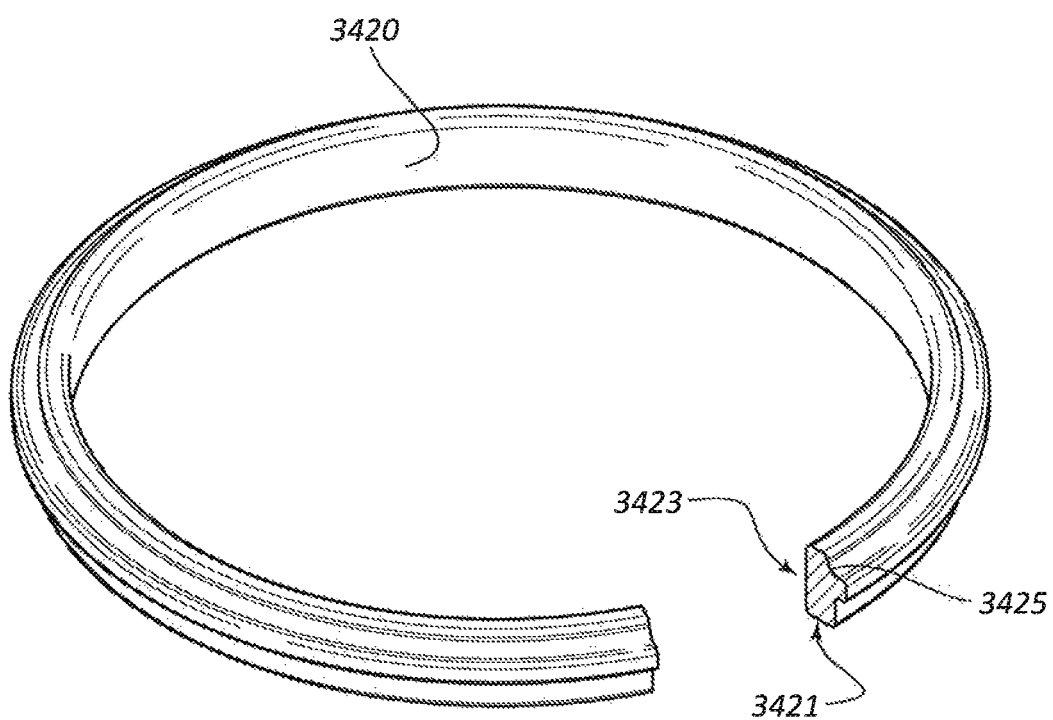
FIG. 37 is a perspective view of an embodiment of a sealing member that is compatible with the blending apparatuses disclosed herein, including the blending apparatus of FIG. 35.

With reference to FIG. 37, in the illustrated embodiment, the sealing member 3420 includes a base portion 3421 that is sized to fit snugly within the seat 3450. An upper portion 3423 of the sealing member 3420 is configured to interface with the liner 3406 and/or the container 3409 to form fluid-tight (e.g., liquid-tight) seals. In the illustrated embodiment, the sealing member 3420 includes an angled surface, or a substantially conically shaped face 3425. The angled surface 3425 can exert an outwardly directed radial force to establish the liquid tight seals, such as at an interior surface of one or more of the liner 3406 and/or the container 3409. The radial seals can function in manners such as the radial seals disclosed previously. These seals are also discussed further below with respect to FIGS. 38B and 39. In certain instances, the conical shape of the sealing member 3420 causes the outwardly directed radial force against one or more of the liner 3406 and the container 3409 to increase as the container 3409 is advanced into increasingly closer proximity to the blender adapter 3404. Stated otherwise, in the illustrated embodiment, the outwardly directed radial force increases with increasing amounts of engagement between the connection interface 3428 (threading) of the blender adapter 3404 with a connection interface 3426 (threading) of the container 3409.

With reference again to FIG. 35, the collar 3408 portion of the container 3409 can include the connection interface 3426. In the illustrated embodiment, the connection interface 3426 is external threading at an open end of the container 3409. The collar 3408 can circumscribe an open end of the liner 3406 and press a rim of the liner 3406 against the sealing member 3420, as further discussed below.

In the illustrated embodiment, the container 3409 includes a pair of stators 3459 that are configured to direct flow of a product during blending. In particular, the stators 3459 of the illustrated embodiment define inwardly directed indentations that extend in the longitudinal direction. The stators 3459 can be configured to slow and/or disrupt fluid flow about a rotational axis of the blending blade assembly 3468. This can advantageously increase the relative velocity between the material being blended and the blending blade assembly 3468, which can increase blending efficiency. In the illustrated embodiment, the stators 3459 are substantially identical indentations at opposite sides of the container 3409. In some embodiments, a set of graduated markings 3471 can be provided on one or more of the stators 3459, or elsewhere on the container 3409.

FIGS. 38A and 38B depict the blending apparatus 3500 in the lined blending mode. As can be seen in FIG. 38B, the connection interfaces 3426, 3428 cooperate to connect the container 3409 to the blender adapter 3404. The open end of the container 3409 presses against a lip 3418 at the open end of the liner 3406. This forces an inner surface of the liner 3406 against the angled surface 3425 of the sealing member 3420. In the illustrated arrangement, both the interior surface and an end face of the liner 3406 sealingly engage the sealing member 3420. This forms a fluid-tight seal between the liner 3406 and the sealing member 3420. The seal prevents blended material from passing into contact with the container 3409, thus keeping the container 3409 clean throughout the blending operation. For example, none of the blended material enters into an interior of the container 3409, or stated otherwise, enters into a chamber defined by an interior surface of the container 3409.

Figure 39:
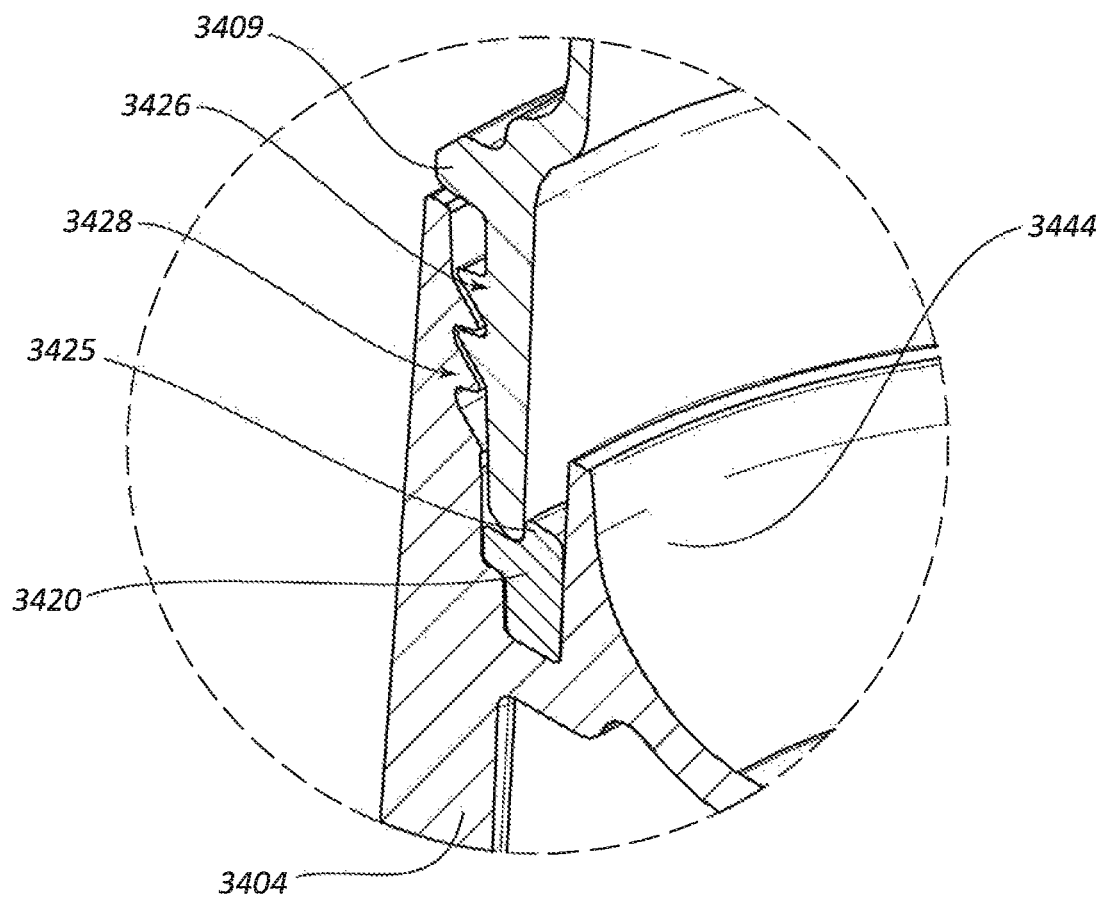
FIG. 39 is an enlarged cross-sectional perspective view such as that of FIG. 38B that depicts the blending apparatus of FIG. 35 in another operational state in which the container is coupled with the blender adapter in the absence of the liner.

FIG. 39 depicts the blending apparatus 3500 in the direct blending mode. Again, the connection interfaces 3426, 3428 cooperate to connect the container 3409 to the blender adapter 3404. The open end of the container 3409 presses directly against the angled surface 3425 of the sealing member 3420. In the illustrated arrangement, both the interior surface and an end face of the container 3409 sealingly engage the sealing member 3420. This forms a fluid-tight seal between the container 3409 and the sealing member 3420. The seal prevents blended material from leaking to an exterior of the container 3409.

As can be appreciated from FIGS. 38B and 39, the internal sidewall 3444 of the blender adapter 3404 is configured to redirect portions of a product that is undergoing blending, such as a food product, that travel radially outwardly from the blade assembly 3468. This redirection can direct the product away from either the liquid-tight seal between the liner 3406 and the sealing member 3420 or the liquid-tight seal between the container 3409 and the sealing member 3420.

Figure 40:
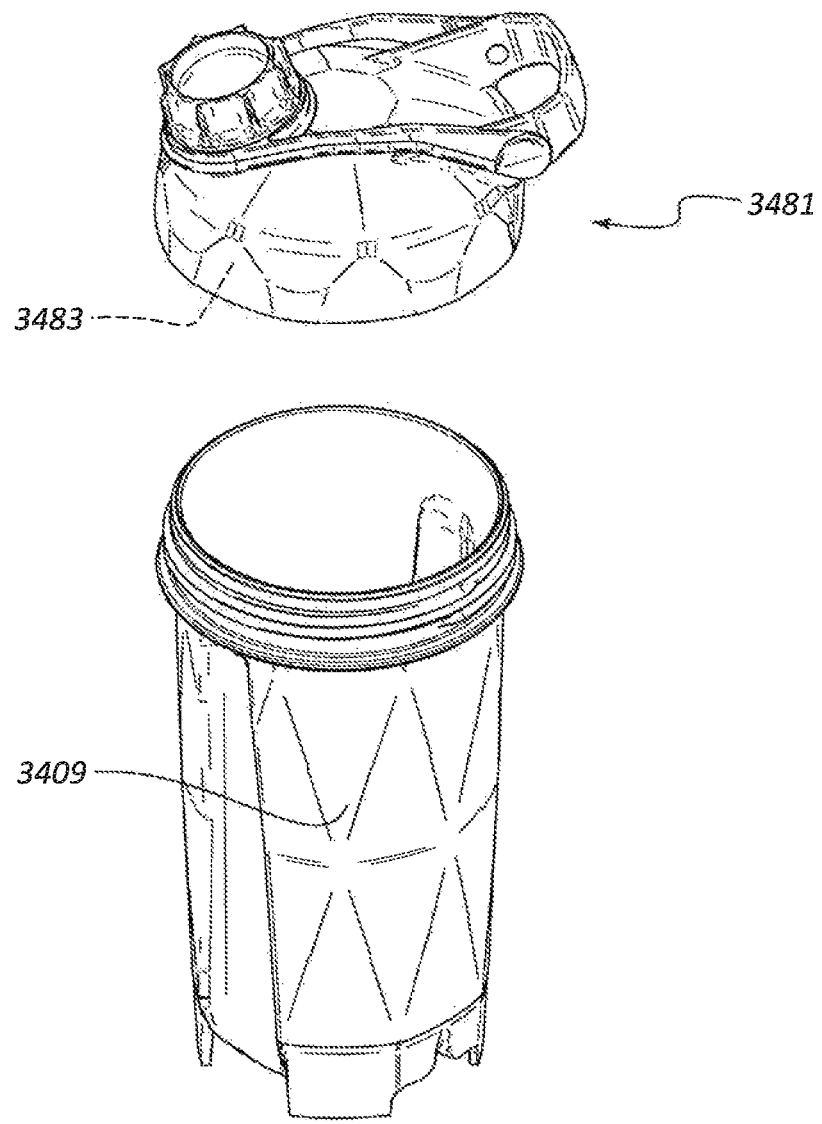
FIG. 40 is an exploded perspective view of an embodiment of a lid that is compatible with the container.

With reference to FIG. 40, in certain embodiments, a lid 3481 may be used to cover an open end of the container 3409. Any suitable lid configuration is contemplated. In the illustrated embodiment, the lid 3481 includes a connection interface 3483 that engages the connection interface 3426 of the container 3409.

Figure 41:
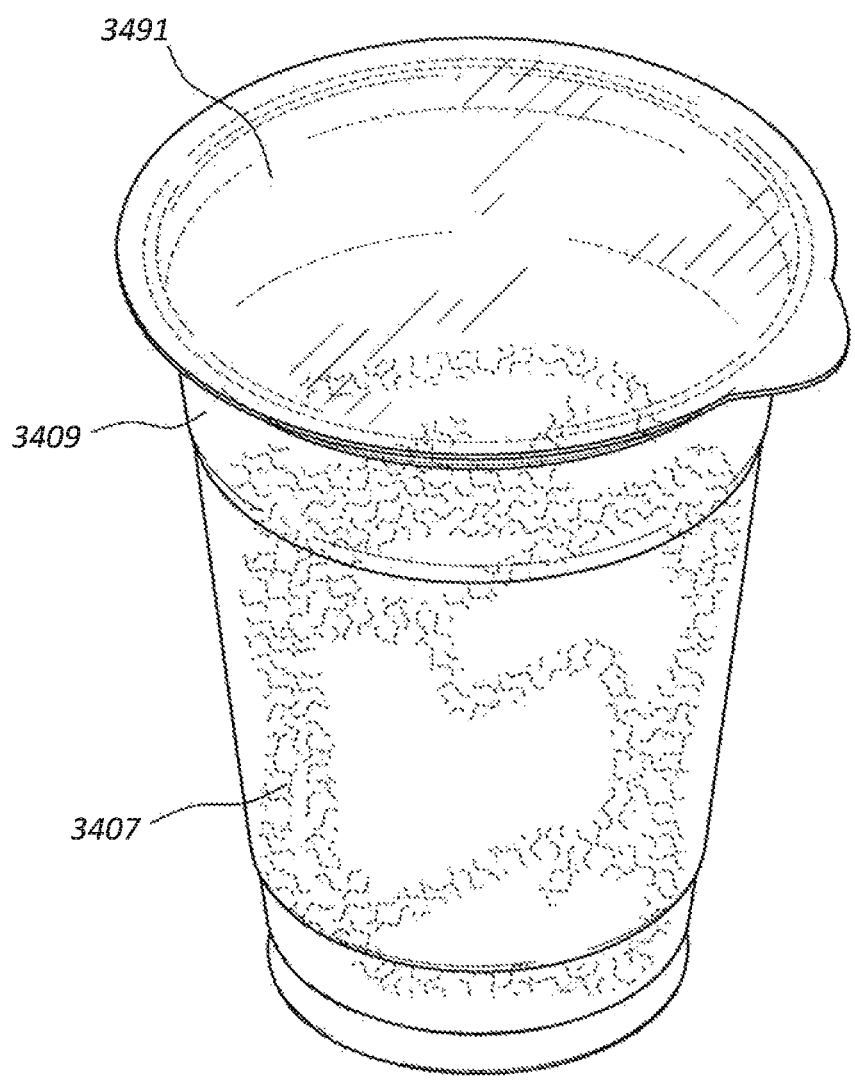
FIG. 41 is a perspective view of an embodiment of a pre-filled liner.

In some instances, a user places a food product into the liner 3406 prior to blending. In other instances, the liner 3406 may be pre-filled. For example, FIG. 41 depicts an embodiment of a liner 3406 that is pre-filled with a food product 3407. The liner 3406 includes a closure 3491 that seals the food product within the disposable liner 3406. A user can remove the closure 3491 prior to coupling the disposable liner 3406 with the blender adapter 3404.

Figure 42:
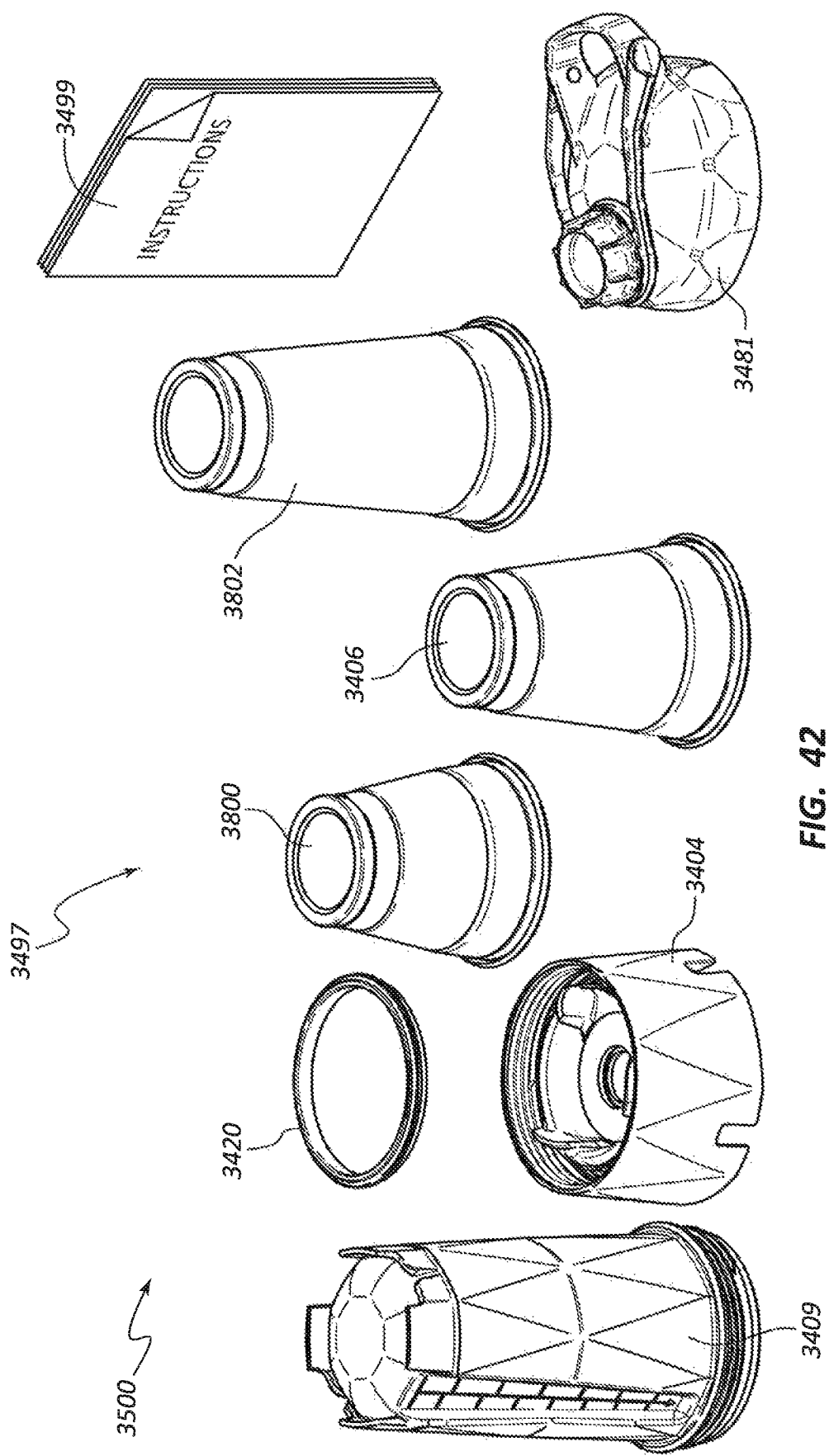
FIG. 42 is a perspective view of an embodiment of a kit.

FIG. 42 illustrates an embodiment of a kit 3497 that can include any suitable number of the components of the blending apparatus 3500 or any other blending apparatuses or components thereof discussed above. The kit 3497 can further include instructions 3499. The instructions 3499 can include directions for performing any and/or all of the steps of a method for blending a food item or for using any of the apparatuses or components thereof discussed herein. The method steps include any specifically described above, implied from the disclosure herein, or specifically recited in the appended claims. In other or further embodiments, the instructions 3499 may provide directions for accessing such directions. For example, the instructions may list a web address, a mailing address, and/or a telephone number that can be used to locate instructions for blending or for using a blending apparatus. For example, in some embodiments, the bag of multiple liners 3406 may include instructions for using the liners 3406 with a blending apparatus 3406.

When using a large blending jar that is not full of ingredients, puree and materials in the jar are splattered around the empty volume and extra surface area of the jar during blending. Because the material does not stay within the main body of material as it is being blended, it is not as reliably blended into a homogeneous particle size. Also, when the puree is transferred to a separate serving container after blending (e.g., when it is poured into the separate container), excess blended material sticks to the blending jar and is wasted when the blending jar is cleaned. This is especially the case for thicker and more viscous blended materials.

Accordingly, in some embodiments, it may be beneficial to use a blending base with a plurality of different-sized liners or other disposable containers. The different-sized liners may each have lips 3418 compatible with a single blending base (e.g., they all fit on and seal with the same blending base connection portion). However, the different-sized liners may have different internal volumes which correspond to different serving sizes or different thicknesses of blended material. The different-sized liners may be referred to as being alternate disposable liners. An alternate disposable liner may have an internal volume different from the internal volume of another disposable liner that could be used with the blending apparatus.

For example, smaller serving sizes or thicker materials may be blended in smaller liners that fit a smaller volume of ingredients and that have less room for the material to splatter or otherwise become removed from the main body of blended ingredients. Larger liners may be used for larger quantities of ingredients and may be used to make larger servings blended with the same air-to-ingredient ratio as the smaller serving size. Because the internal volume of the liner more closely correspond to the volumes of the material being blended, there is less splash and dispersion of the material when it is blended. Larger chunks of material may also more easily circulate back into the blade for a more consistent particle size in the blended material, and all of the material may be delivered to the customer in the liner, eliminating wasteful pouring and excessive jar cleaning steps. The end product may also have more consistent flavor since the proportions of ingredients in the final product may be more consistent rather than some of it being lost by being left behind in the mixing container.

The size of the container may also dictate the amount of air in the blending chamber, allowing the user to control the liquid-to-air ratio in the liner and therefore better control the hydraulic forces at work on the blended material. Using properly-sized liners may reduce or eliminate traditional cavitation issues by hydraulically forcing puree back into the spinning blade rather than allowing the material to expand into empty space within the blending jar. Also, the more rapid cycling of material within the more enclosed space of a properly-sized liner may shorten blending time due to the material being forced into the blade more frequently than would otherwise occur in an oversized container.

Each of the plurality of liners may be fitted to a blending base for blending based on the quantity of ingredients that needs to be blended. The differently sized liners may also each fit within one or more universal blending container (e.g., 3409) that can contain a plurality of differently-sized liners. For example, a single blending container may be configured to fit a small, medium, or large sized liner, wherein the small liner takes up less of the internal space within the container than a medium or large liner. FIG. 38A illustrates an embodiment wherein the container 3409 may selectively be configured with a disposable liner 3406, a small-sized disposable liner 3800, or a large-sized disposable liner 3802, wherein the small-sized disposable liner 3800 may have a smaller internal volume than the disposable liner 3406 and the large-sized disposable liner 3802 may have a larger internal volume than the disposable liner 3406. The largest liner 3802 may have an internal volume substantially similar to the entire internal volume of the container 3409.

FIG. 42 shows these disposable liners 3406, 3800, 3802 separated from each other and from the container 3409. The disposable liners 3406, 3800, 3802 may be provided in the kit 3497. The instructions 3499 may include directions for performing any and/or all of the steps of a method for blending a food item or for using any of the apparatuses or components thereof discussed herein, including steps of selecting a disposable liner from a plurality of disposable liners having different sizes (e.g., 3406, 3800, 3802) based on a predetermined serving size, material thickness, or liquid-to-air ratio and blending material within the selected disposable liner, wherein the material has properties (e.g., viscosity, volume, and/or rigidity) corresponding to the predetermined serving size, material thickness, or liquid-to-air ratio. The selected liner may be positioned within the container 3409 with the open end of the liner at the open end of the container 3409 and with the material positioned in the liner, the blender adapter 3404 may be attached to the container 3409 and liner, and the material may be blended within the liner. In some embodiments, the predetermined serving size of material may be provided to a customer directly in the liner since the liner is preconfigured to hold the appropriate amount of material to match the predetermined serving size.

The disposable liners 3406, 3800, 3802 may all comprise an end opening or open end (e.g., at lip 3418) that is configured to engage with the connection interface 3426 and seal against the sealing member 3420. Thus, while their internal volumes and heights may differ, their end shapes may be substantially similar or equivalent so that they may all be used with the same blender adapter 3404 and container 3409. In some embodiments, the liners 3406, 3800, 3802 may each have different open end sizes to be coupled with different blender adapters (e.g., 3404). The liners 3406, 3800, 3802 may be used with a single container 3409 or may be configured to be attached to a blender adapter 3404 without the container 3409 (e.g., in the manner disclosed in association with FIGS. 1-4 herein).

In this manner, a small amount of ingredients may be efficiently blended and served in the small-sized disposable liner 3800, a larger amount of ingredients may be efficiently blended and served in the medium-sized disposable liner 3406, and a still larger amount of ingredients may be blended and served in the large-sized disposable liner 3802. In each case, the liquid-to-air ratio in the differently-sized disposable liners 3406, 3800, 3802 may be held to be within a narrow range of values, even if the quantity of ingredients varies based on the recipe used or the target serving size being prepared. For instance, about a 1:1 ratio or about a 10:1 ratio of liquid to air (or another ratio therebetween) can be provided for small, medium, or large serving sizes since the size of the blending chamber is adjusted according to the size of the internal volume of the disposable liner 3406, 3800, 3802 used.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including" and "having" come as used in the specification and claims shall have the same meaning as the term "comprising."

The invention claimed is:

1. A blending apparatus comprising:
   a container comprising an interior surface that defines a chamber;
   a blender base comprising a motor;
   an adapter configured to be releasably coupled with the container and the blender base, the adapter comprising:
     a blade assembly configured to interface with and be actuated by the motor when the adapter is coupled with the blender base; and
     a connection interface configured to cooperate with a connection interface of the container to couple the adapter with the container; and
   a sealing member;
   wherein the blending apparatus is configured to operate in either a direct blending mode or a lined blending mode;
   wherein, in the direct blending mode, a food product is positioned within the chamber of the container, the container is pressed against the sealing member to form a liquid-tight seal, and the food product comes into contact with the interior surface of the container as the food product is blended via the blade assembly;
   wherein, in the lined blending mode, a disposable liner is positioned within the chamber of the container, the container presses the liner into contact with the sealing member to form a liquid-tight seal, and the liquid-tight seal prevents the food product from coming into contact with the interior surface of the container; and
   wherein, the adapter comprises a sidewall that is positioned between an open end of the container and a blade portion of the blade assembly when the container is coupled with the adapter, the sidewall being configured to shield the liquid-tight seal.

2. The blending apparatus of claim 1, wherein the sealing member is configured to exert an outwardly directed radial force to establish either the liquid-tight seal between the container and the sealing member or the liquid-tight seal between the liner and the sealing member.

3. The blending apparatus of claim 2, wherein the sealing member comprises an angled surface that exerts the outwardly directed radial force.

4. The blending apparatus of claim 2, wherein a strength of the outwardly directed radial force is increased as the container is advanced into increasingly closer proximity to the adapter.

5. The blending apparatus of claim 1, wherein the adapter comprises a housing element that defines a seat into which the sealing member is received.

6. The blending apparatus of claim 1, wherein the sidewall is configured to redirect portions of the food product that travel radially outwardly from the blade assembly either away from the liquid-tight seal between the container and the sealing member during blending in the direct blending mode or away from the liquid-tight seal between the liner and the sealing member during blending in the lined blending mode.

7. The blending apparatus of claim 1, wherein the sidewall is configured to redirect portions of the food product that travel radially outwardly from the blade assembly to reduce an angle of impingement of the portions of the food product either on a sidewall of the container during blending in the direct blending mode or on a sidewall of the liner during blending in the lined blending mode.

8. The blending apparatus of claim 1, wherein the adapter comprises a plurality of stators that are positioned between a blade portion of the blade assembly and the container when the container is coupled with the adapter, wherein the plurality of stators are configured to direct flow of the food product during blending.

9. The blending apparatus of claim 8, wherein the plurality of stators are substantially helical.

10. The blending apparatus of claim 8, wherein the plurality of stators are disposed at equiangular intervals about an axis of rotation of the blade assembly.

11. The blending apparatus of claim 1, wherein the container comprises a stator configured to direct flow of the food product during blending in the direct blending mode.

12. The blending apparatus of claim 11, wherein the stator comprises a longitudinally directed indentation.

13. The blending apparatus of claim 11, wherein the container comprises an additional stator configured to direct flow of the food product during blending, wherein the stators comprise indentations at opposite sides of the container.

14. The blending apparatus of claim 1, further comprising a lid that comprises a connection interface configured to couple with the connection interface of the container to selectively cover the open end of the container when the container is decoupled from the adapter.

15. The blending apparatus of claim 1, wherein the adapter comprises a pressure-relief vent in close proximity to the sealing member that is configured to permit air to move past the sealing member to facilitate removal of the container from the adapter after a blending event.

16. The blending apparatus of claim 1, wherein the adapter comprises a housing element that defines a disengagement port, wherein an object can be inserted through the disengagement port and into contact with the sealing member to force the sealing member away from the housing element.

17. A blending system comprising the blending apparatus of claim 1, and further comprising the blender base.

18. The blending system of claim 17, further comprising the disposable liner.

19. A blending system comprising the blending apparatus of claim 1, and further comprising the disposable liner.

20. The blending system of claim 19, further comprising an alternate disposable liner, the alternate disposable liner having a different internal volume than the disposable liner.

21. The blending apparatus of claim 1, wherein the sealing member is positioned between the sidewall and the connection interface of the adapter.

22. The blending apparatus of claim 1, wherein the liner is configured to be positioned between the sidewall and the connection interface of the adapter.

23. A kit comprising the blending system of claim 19, and further comprising one or more of instructions for positioning the liner in the container or directions for accessing instructions for positioning the liner in the container.

24. A method of blending a food product, the method comprising:

providing a blending apparatus configured to operate in either a direct blending mode or a lined blending mode, the lined blending mode comprising:
  inserting a liner into a chamber defined by an interior surface of a container, the liner comprising an exterior surface and the container comprising an interior surface;
  coupling the container and the liner to an adapter that comprises a blade assembly, wherein the liner includes the food product therein when coupled with the adapter;
  coupling the adapter to a blender base comprising a motor, the adapter comprising a connection interface configured to cooperate with a connection interface of the container to couple the adapter with the container;
  pressing the liner into contact with a sealing member via the container to form a fluid-tight seal to prevent fluid communication between a region between the exterior surface of the liner and the interior surface of the container; and
  actuating the blade assembly via the motor of the blender base to blend the food product without introducing any portion of the food product into the region between the exterior surface of the liner and the interior surface of the container;
wherein the adapter comprises a sidewall that is positioned between an open end of the container and a blade portion of the blade assembly when the container is coupled with the adapter, the sidewall being configured to shield the fluid-tight seal;
wherein, in the direct blending mode, a food product is positioned within the chamber of the container, the container is pressed against the sealing member to form a liquid-tight seal, and the food product comes into contact with the interior surface of the container as the food product is blended via the blade assembly.

25. The method of claim 24, further comprising introducing the food product into the liner.

26. The method of claim 24, wherein the liner is pre-packaged with the food product and comprises a closure via which the food product is sealed within the disposable liner, the method further comprising removing the closure.

27. The method of claim 24, further comprising:
  removing the liner from the container;
  inserting an additional food product into the container;
  coupling the container to the adapter; and
  actuating the blade assembly to blend the food product such that the food product contacts the interior surface of the container.

28. The method of claim 27, further comprising forcing the container against the sealing member to form a liquid-tight seal.

* * * * *